United States Patent [19]
Koizumi et al.

[11] Patent Number: 5,544,147
[45] Date of Patent: Aug. 6, 1996

[54] DISK REPRODUCING APPARATUS

[75] Inventors: Satoru Koizumi; Susumu Chono; Yoshihiro Abe; Kazuki Matsuzaki, all of Higashihiroshima, Japan

[73] Assignee: Sharp Kabushiki Kaisha, Osaka, Japan

[21] Appl. No.: 353,261

[22] Filed: Dec. 2, 1994

[30] Foreign Application Priority Data

Aug. 17, 1994 [JP] Japan .................................. 6-193349

[51] Int. Cl.⁶ .......................... G11B 17/06; G11B 17/08; G11B 33/02; G11B 17/22
[52] U.S. Cl. ........................................ 369/191; 369/75.2
[58] Field of Search .......................... 369/191, 36, 75.2, 369/77.1, 34

[56] References Cited

U.S. PATENT DOCUMENTS

| 5,228,016 | 7/1993 | Menke ..................................... 369/36 |
| 5,245,602 | 9/1993 | Ikedo et al. ........................... 369/75.2 |
| 5,327,412 | 7/1994 | Lee ........................................ 369/75.2 |

FOREIGN PATENT DOCUMENTS

| 0367370 | 5/1989 | European Pat. Off. . |
| 521217A2 | 1/1993 | European Pat. Off. . |
| 64-60856 | 3/1989 | Japan . |

*Primary Examiner*—John H. Wolff
*Assistant Examiner*—Adriana Giordana

[57] ABSTRACT

A disk reproducing apparatus is provided with first and second trays which can reciprocate between a reproducing area for storing therein a reproducing unit and a stand-by area adjacent to the reproducing area. The first and second trays are interchangeable by moving the second tray in an opposite direction to the first tray along a path formed at a higher position than that for the first tray. In this interchanging operation, the second tray being moved from said stand-by area to said reproducing area is lowered from a height position of the path situated above the first tray preferably to the same height position as the first tray set in said reproducing area. Since the described arrangement offers a smaller height difference between the first and second trays in the reproducing area, a stroke of the up-and-down movement of the reproducing unit can be made smaller, thereby achieving a reduction in size of the apparatus.

26 Claims, 50 Drawing Sheets

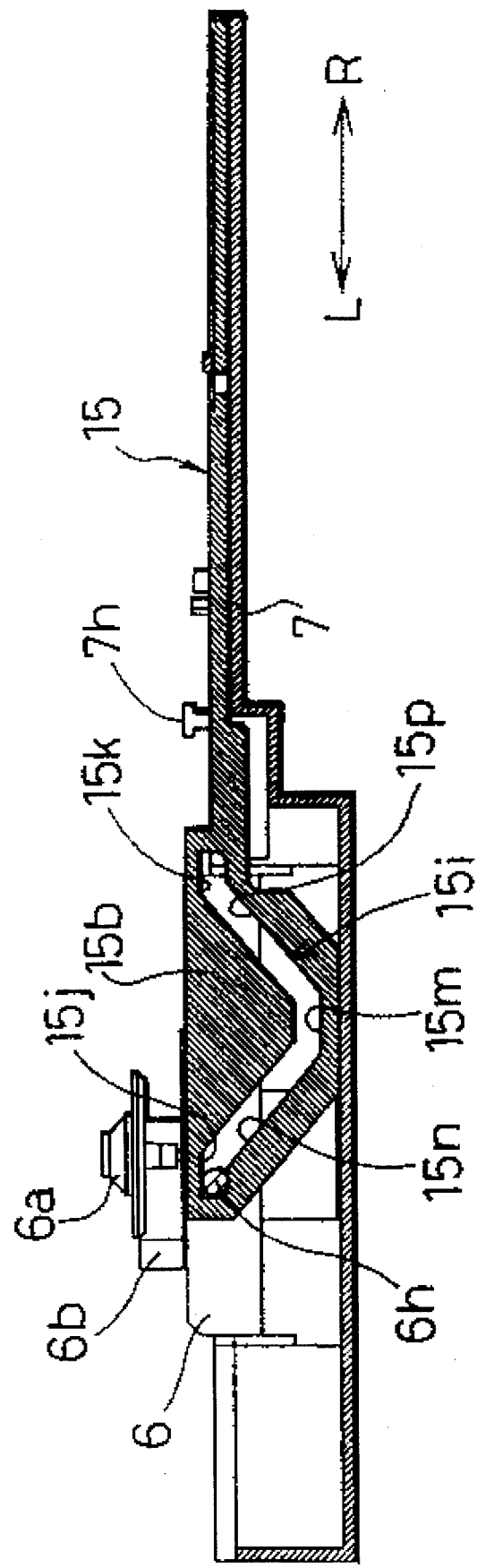

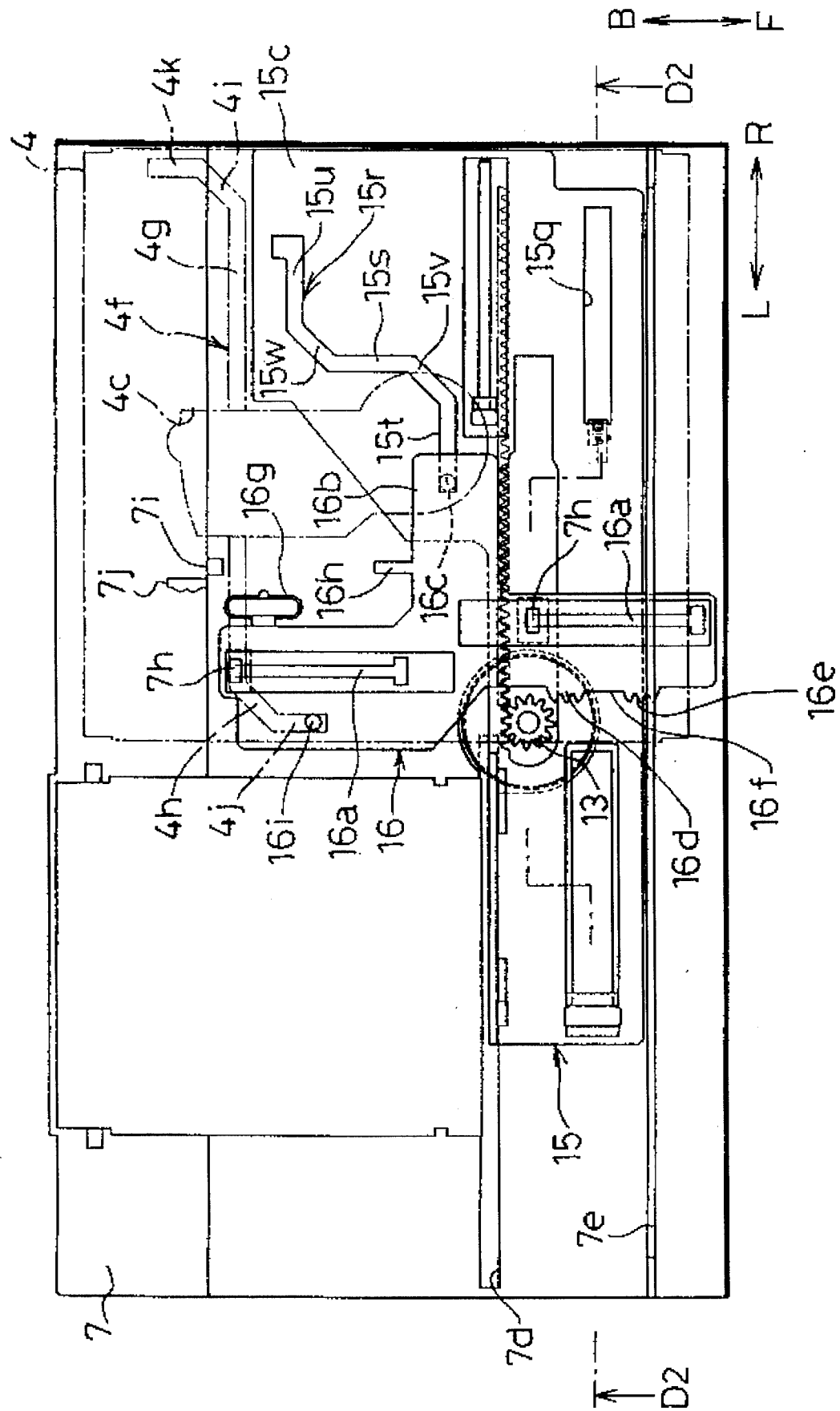

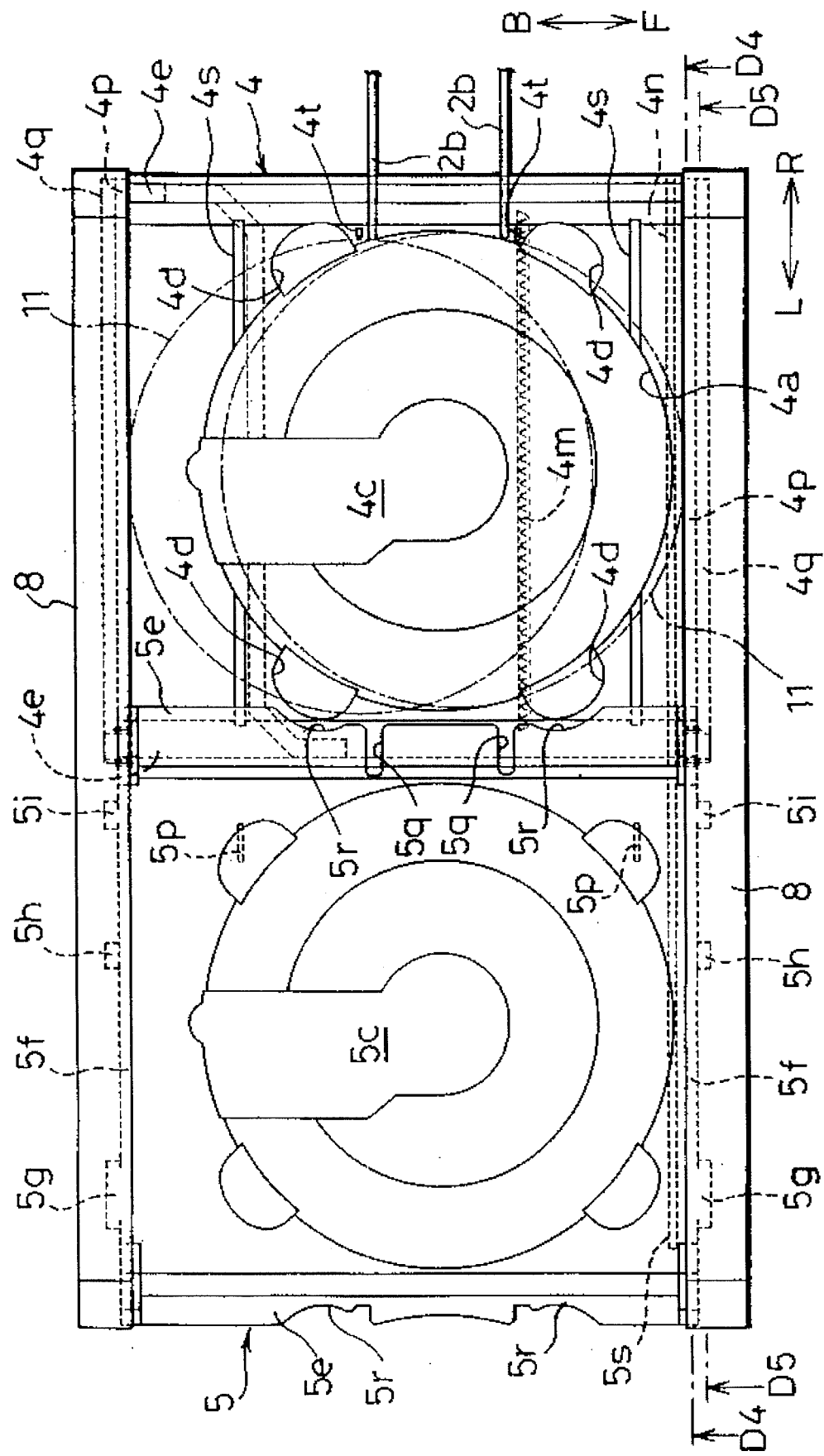

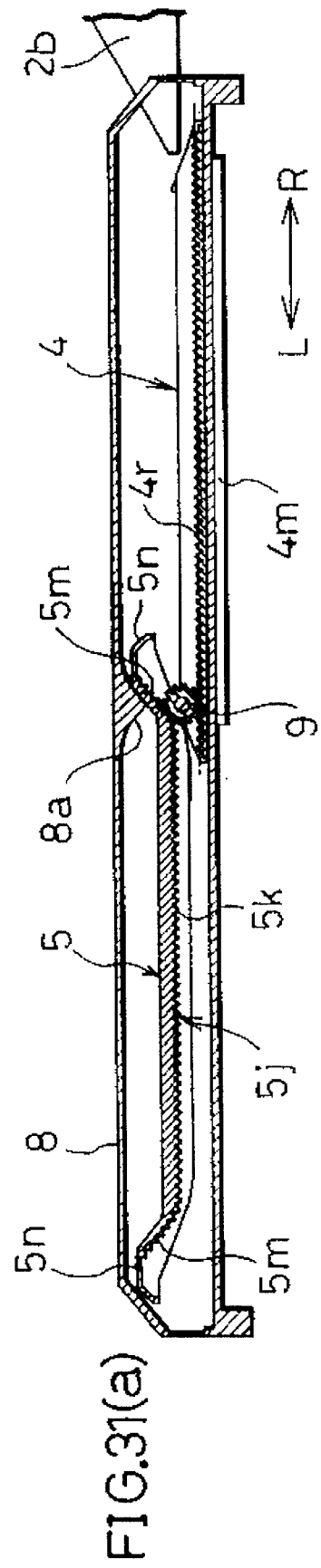
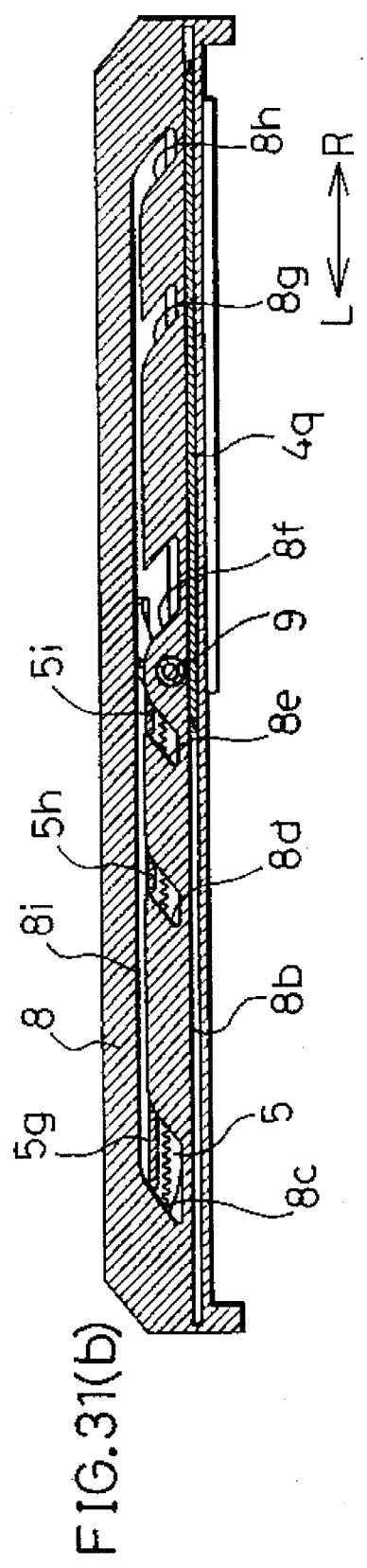
FIG.31(a)
FIG.31(b)

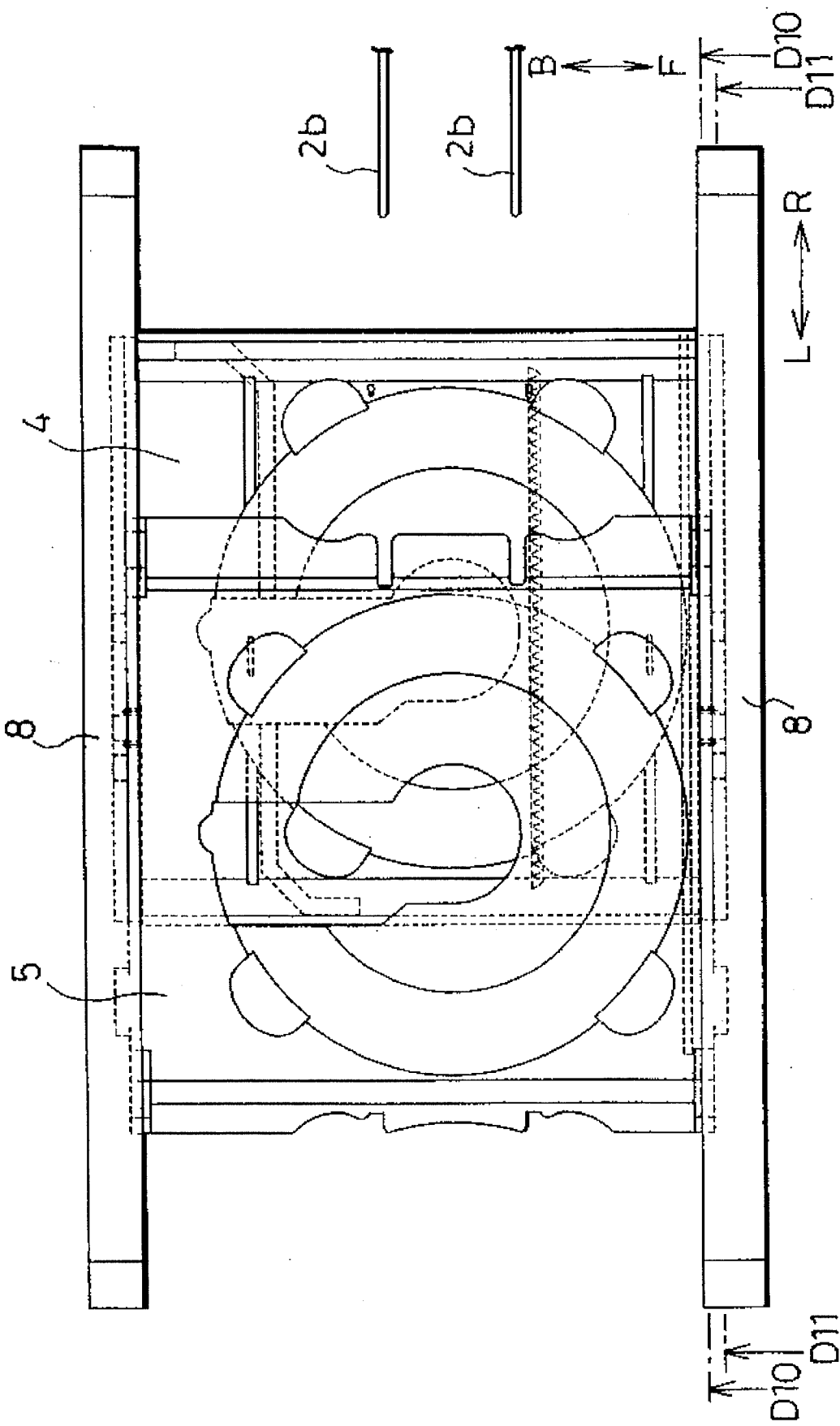

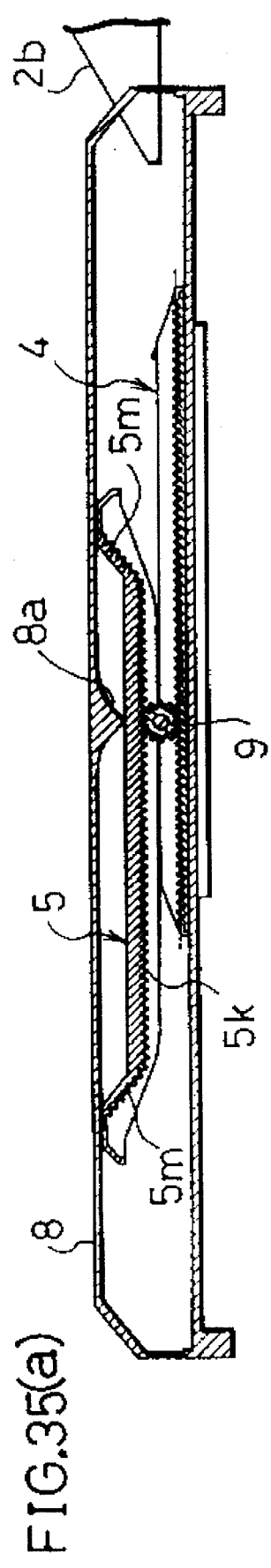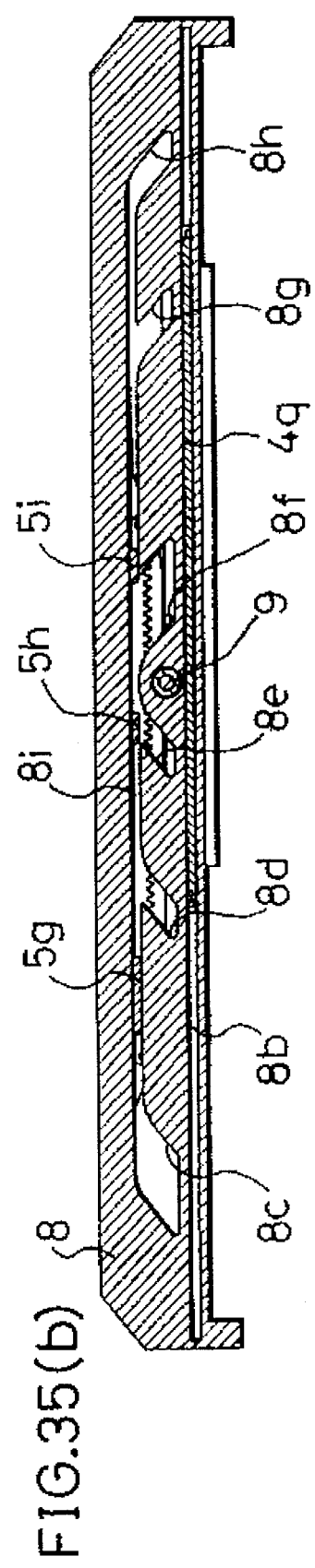

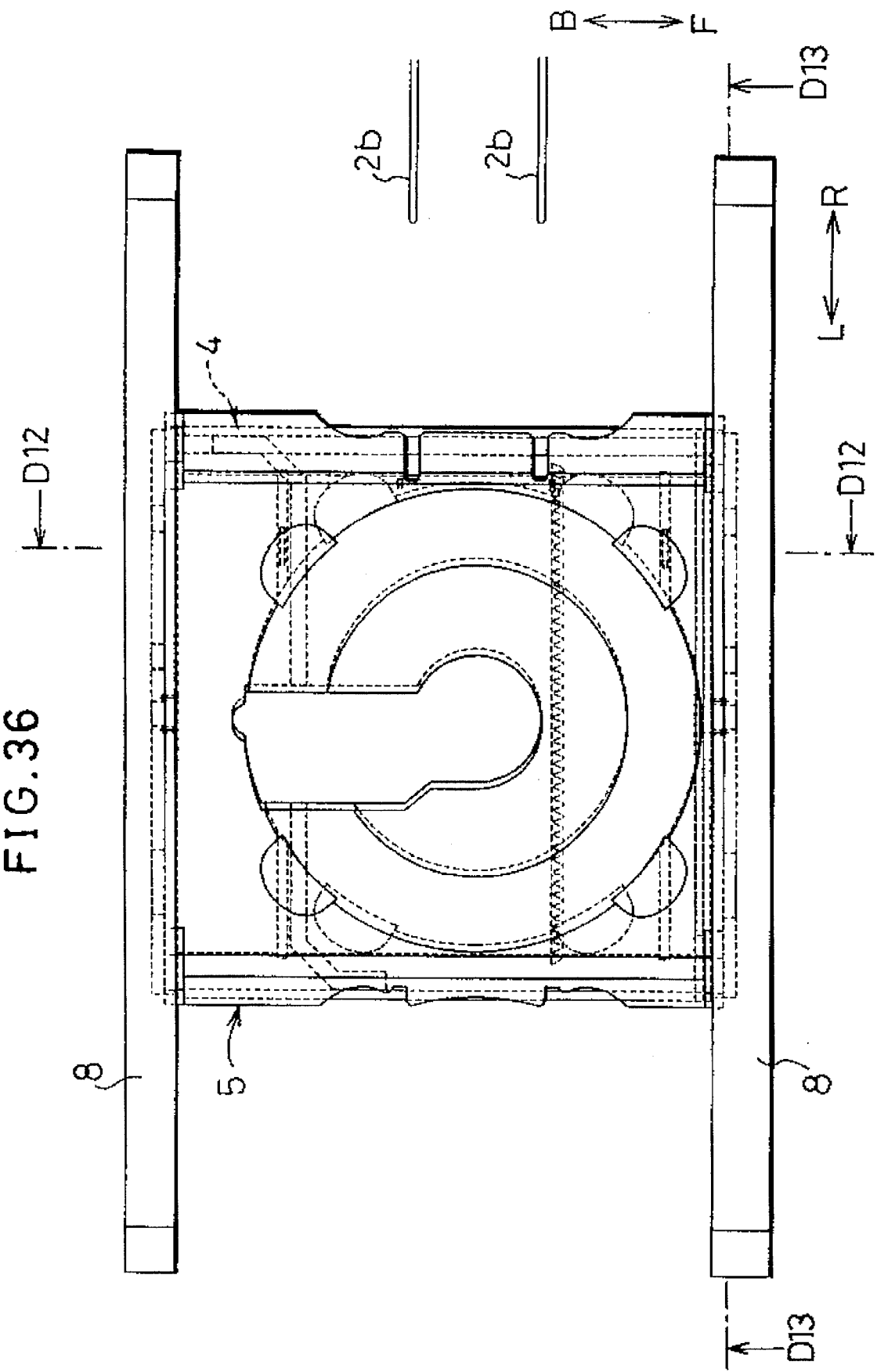

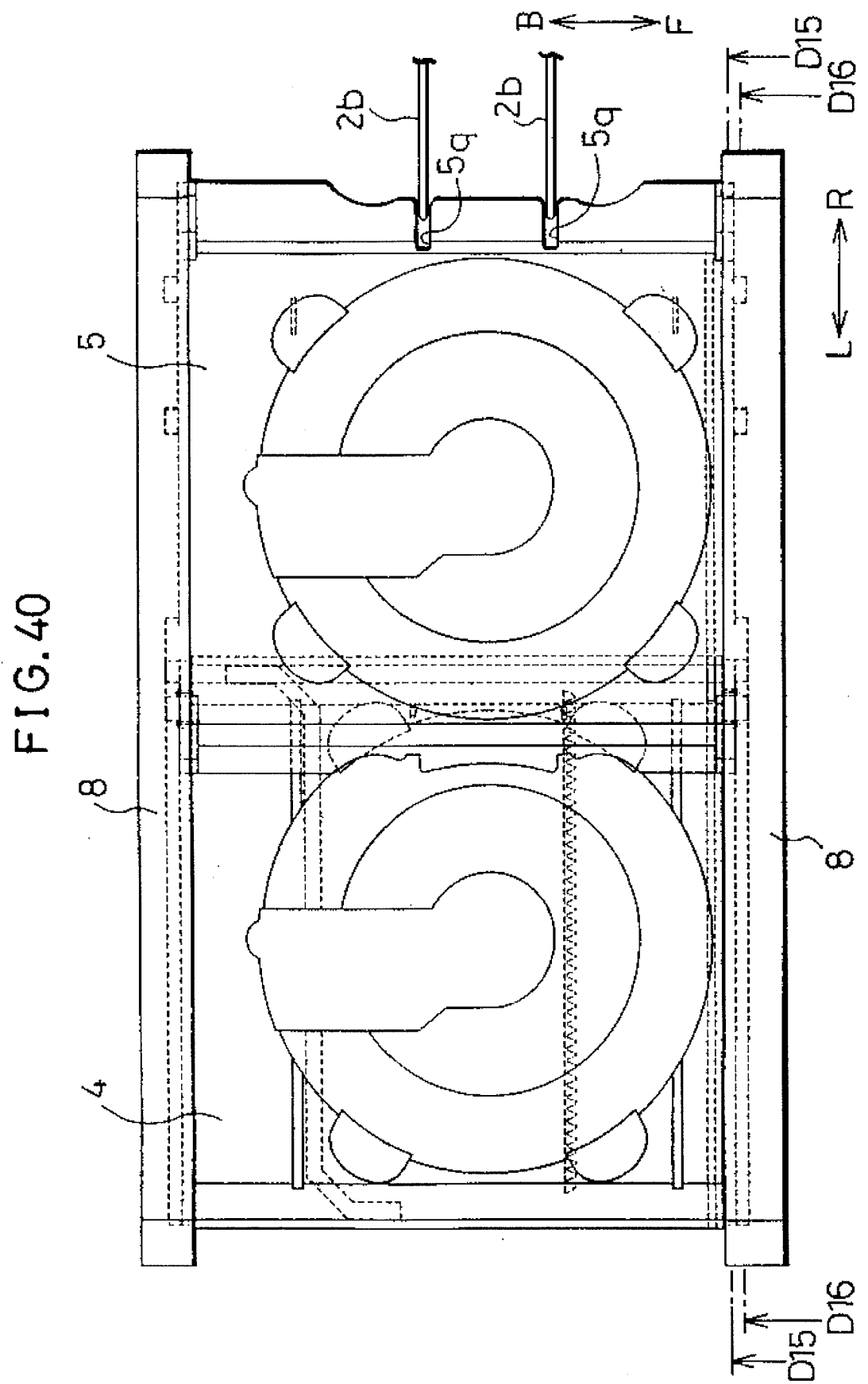

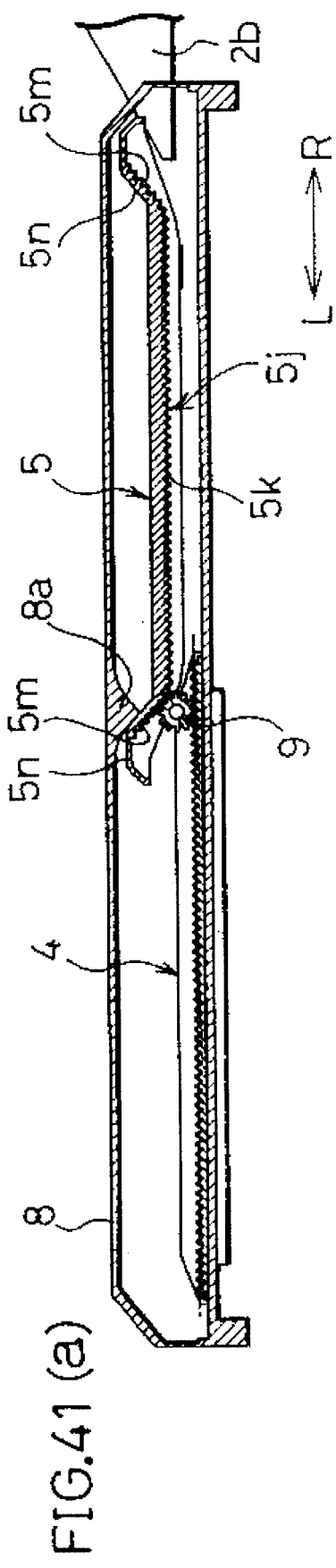
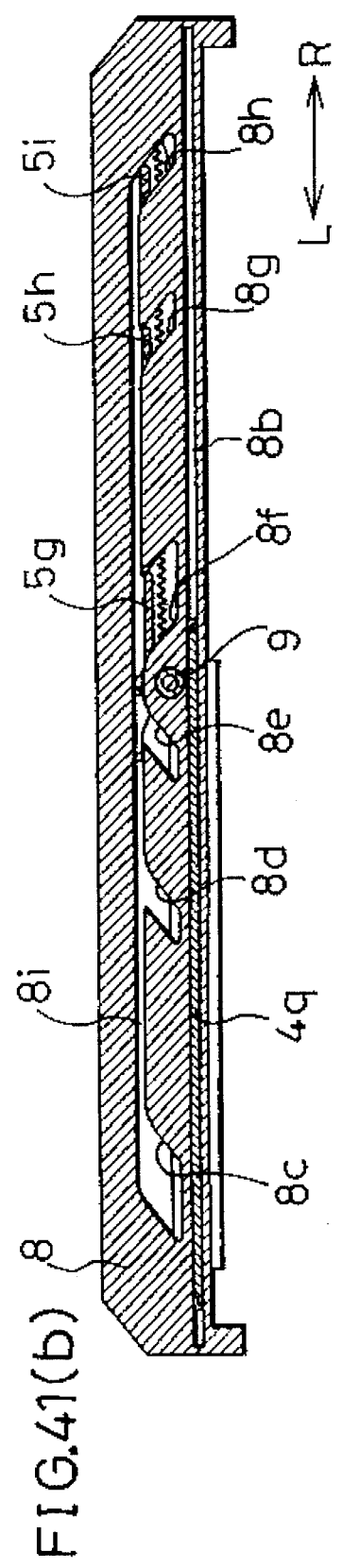
FIG.41(a)
FIG.41(b)

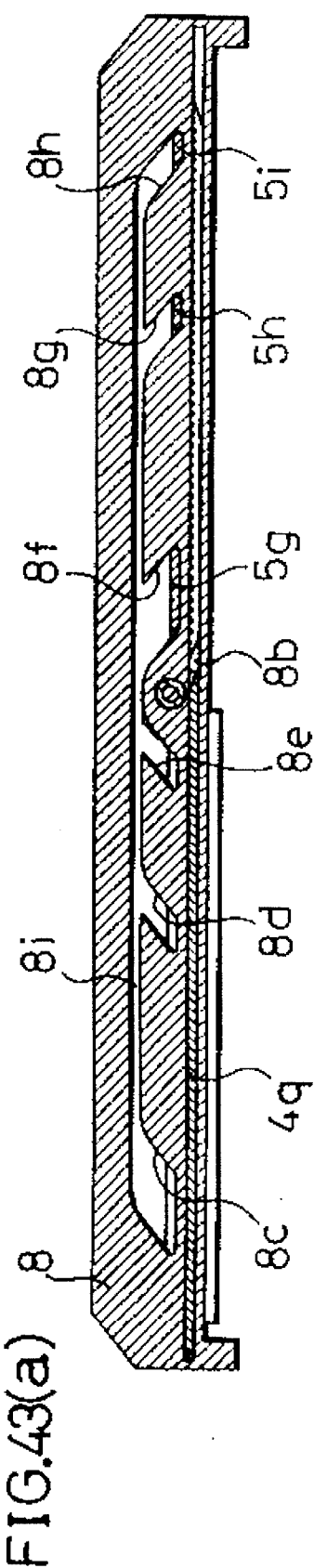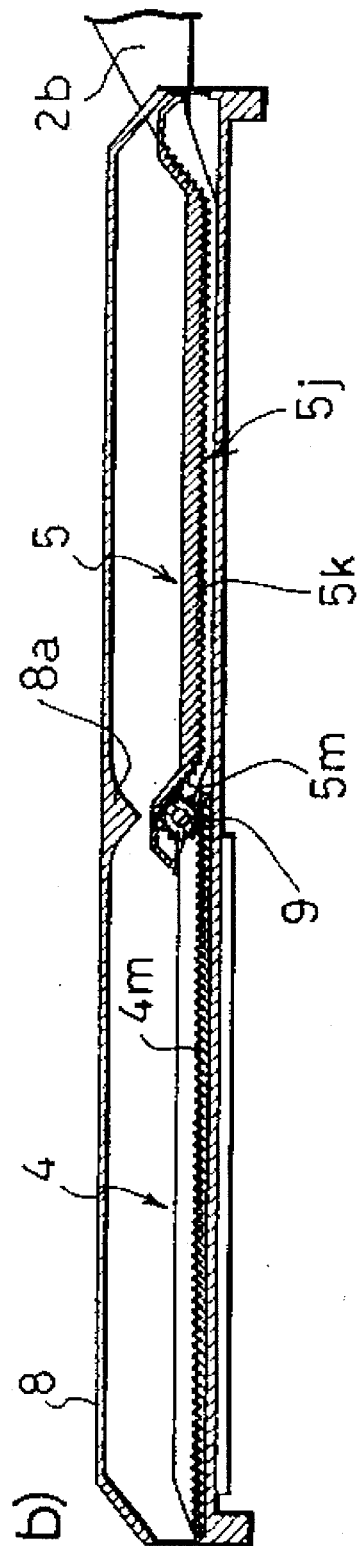
FIG.43(a)
FIG.43(b)

DISK REPRODUCING APPARATUS

FIELD OF THE INVENTION

The present invention relates to a disk reproducing apparatus wherein two disks such as optical disks, etc., can be stored so as to be interchangeable between a stand-by area and a reproducing area.

BACKGROUND OF THE INVENTION

The above disk reproducing apparatus is known, for example, from Japanese Laid Open Patent Application No. 60856/1989 (Tokukaisho 64-60856). As shown in FIG. 47, the disk reproducing device includes two disk trays 52 and 53 (hereinafter referred to as first and second trays) inside a cabinet 51 which forms a housing for the apparatus. The first and second trays 52 and 53 can reciprocate from side to side (in directions shown by arrows L and R in FIG. 47).

In FIG. 47, the left half of the apparatus is formed as a reproducing area wherein a turn table 54 and an optical pickup 55 are mounted, while the right half of the apparatus is formed as a stand-by area. In the stand-by area, the disk can be set on and removed from the disk tray 52 or 53 as desired. The first and second trays 52 and 53 are placed so as to be vertically aligned with a predetermined space between them. The first tray 52 and the second tray 53 are interchangeable between the reproducing area and the stand-by area as they move respectively along the lower horizontal movement guide rail and the upper horizontal movement guide rail.

On the underside of the first and second trays 52 and 53, a sliding plate 56 and a cam disc 57 are mounted. On the cam disc 57, a first cam groove 57a is formed for inserting a follower pin 56a of the sliding plate 56 so as to be fit therein. The sliding plate 56 has racks 56b respectively formed on both side faces in the front-and-back direction (in directions shown by arrows F and B in FIG. 48). Further, a pair of small pinions 58a are mounted to the racks 56b so as to be respectively in mesh therewith. Around each small pinion 58a, a large pinion 58b is coaxially and integrally formed.

As shown in FIG. 49, on the underside of the first tray 52 and on both side faces of the second tray 53 in the front-and-back direction, a pair of racks 52a and a pair of racks 53a are respectively formed side to side. The apparatus is assembled such that each large pinion 58b is provided between the rack 52a and the rack 53a in the front-and-back direction so as to be in mesh therewith.

As shown in FIG. 50, on the underside of the cam disk 57, a second cam groove 57b is formed. Further, a connecting plate 59 with a follower pin 59a which makes a possible mating with the second cam groove 57b is provided. The front and back ends of the connecting plate 59 are respectively connected to actuating plates 60 placed vertically to both sides of the reproducing area. A reproducing unit 61, in which a turn table 54 and an optical pickup 55 are mounted, holds support pins 61a respectively projected outward from the front and rear sides of the reproducing unit 61 by inserting them into guide grooves 60a formed on the actuating plate 60 as shown in FIG. 51.

In the described arrangement, when reproducing from the disk on the second tray 53 set in the stand-by position, the second tray 53 in this position and the first tray 52 in the reproducing area are switched by rotating the cam disc 57.

With the rotations of the cam disk 57, first, the follower pin 59a of the connecting plate 59 is pressed by the second cam groove 57b. This, in turn, moves the actuating plates 60 side to side. As a result, along the sloping guide groove 60a of the actuating plate 60, the support pin 61a is pressed downward, and the reproducing unit 61 is lowered, thereby holding the turn table 54 and the optical pickup 55 in respective retreated positions, i.e., in positions lower than the position of the first tray 52.

Subsequently, with the rotations of the cam disc 57, the follower pin 56a of the sliding plate 56 which makes a possible mating with the first cam groove 57a is pushed. This, in turn, moves the sliding plate 56 side to side. In accordance with this movement, the small and large pinions 58a and 58b are rotated. In this state, as the large pinion 58a is in mesh with the racks 52a and 53a, the first and second trays 52 and 53 are moved horizontally in directions opposite one another.

After the respective positions of the trays 52 and 53 are switched by moving them side to side in the described manner, the reproducing unit 61 is raised again in synchronism with the movement of the actuating plates 60 so as to enable a reproducing operation from the disk on the second tray 53 set in the reproducing area, thereby completing the tray interchanging operation.

However, in such a conventional disk reproducing apparatus, since the trays are interchanged only by moving the first and second trays 52 and 53 horizontally along paths formed at different height positions, the problem is presented in that a long stroke of the up-and-down movement of the reproducing unit 61 is required. More specifically, in the tray interchanging operation, the reproducing unit 61 is lowered to the retreated position, i.e., the position lower than the first tray 52, while in reproducing, the turn table 54 is raised to the reproducing position, i.e., the position higher than the second tray 53 in the upper position so that the disk can rotate. Therefore, the stroke of the movement between the retreated position and the reproducing position becomes longer in accordance with the respective height difference of the first and second trays 52 and 53. Since this makes the apparatus thicker, the size of the apparatus cannot be made any smaller.

SUMMARY OF THE INVENTION

An object of the present invention is to provide a disk reproducing apparatus with a disk interchanging function, of a reduced size by making shorter the stroke of an up-and-down movement of a reproducing unit required when interchanging trays.

In order to achieve the above objective, the disk reproducing apparatus in accordance with the present invention is characterized by including a cabinet having formed therein a reproducing area for storing a reproducing unit for reading recorded information from a disk and a stand-by area, the reproducing area and the stand-by area being horizontally aligned; first and second trays for placing thereon disks respectively, the first and second trays being interchangeable through reciprocation between the reproducing area and the stand-by area by moving the second tray above the first tray in mutually opposite directions; and reproducing position guide means for lowering the second tray from a position at which the second tray and the first tray are vertically aligned to be set in the reproducing area when interchanging the second tray with the first tray.

According to the above arrangement, the second tray having been moved from the stand-by area over the first tray is lowered by the reproducing position guide means and is set in the reproducing area. The described arrangement offers a significantly smaller difference between the height position of the first tray in the reproducing area and the height position of the second tray in the reproducing area compared with a conventional model where the trays are interchanged only by horizontally moving them in mutually opposite directions. Therefore, the stroke of the up-and-down movement of the reproducing unit for reading recorded information from the disk between the retreated position and the reproducing position can be made shorter. Since the described arrangement offers a thinner apparatus, the size of the entire apparatus can be reduced.

In addition, the second tray set in the reproducing area is preferably set so as to have the same height position as the first tray set in the reproducing area. In this way, an up-and-down movement of the reproducing unit required for compensating the height difference between the trays can be eliminated from the up-and-down movement of the reproducing unit between the reproducing position and the retreated position. Since the above arrangement enables a smaller up-and-down movement of the reproducing unit, a still reduced size of the apparatus can be achieved.

For a fuller understanding of the nature and advantages of the invention, reference should be made to the ensuing detailed description taken in conjunction with the accompanying drawings.

BRIEF DESCRIPTION OF THE DRAWINGS

FIG. 3 is a cross-sectional view taken on line D1—D1 of FIG. 2.

FIG. 5 is a plan view showing the relative position between the unit actuating lever and the tray lock lever in the first fixed position of the disk reproducing apparatus.

FIG. 9 is a plan view showing the relative positions of the first tray and the second tray in the first fixed position of the disk reproducing apparatus.

FIG. 31(a) is a cross-sectional view taken on line D6—D6 of FIG. 30.

FIG. 31(b) is a cross-sectional view taken on line D7—D7 of FIG. 30.

FIG. 34 is a plan view showing the state where the first tray has been moved to the left from the state shown in FIG. 32.

FIG. 35(a) is a cross-sectional view taken on line D10—D10 of FIG. 34.

FIG. 35(b) is a cross-sectional view taken on line D11—D11 of FIG. 34.

FIG. 36 is a plan view showing the state where the first tray has been further moved to the left from the state shown in FIG. 34.

FIG. 40 is a plan view showing the state where the first tray has been further moved to the left from the state shown in FIG. 38.

FIG. 41(a) is a cross-sectional view taken on line D15—D15 of FIG. 40 and is held in the stoppage position.

FIG. 41(b) is a cross-sectional view taken on line D16—D16 of FIG. 40.

FIG. 43(a) is a cross-sectional view taken on line D17—D17 of FIG. 42.

FIG. 43(b) is a cross-sectional view taken on line D18—D18 of FIG. 42.

[EMBODIMENT]

The following description will discuss one embodiment of the present invention in reference to FIGS. 1 through 46.

Figure 46:
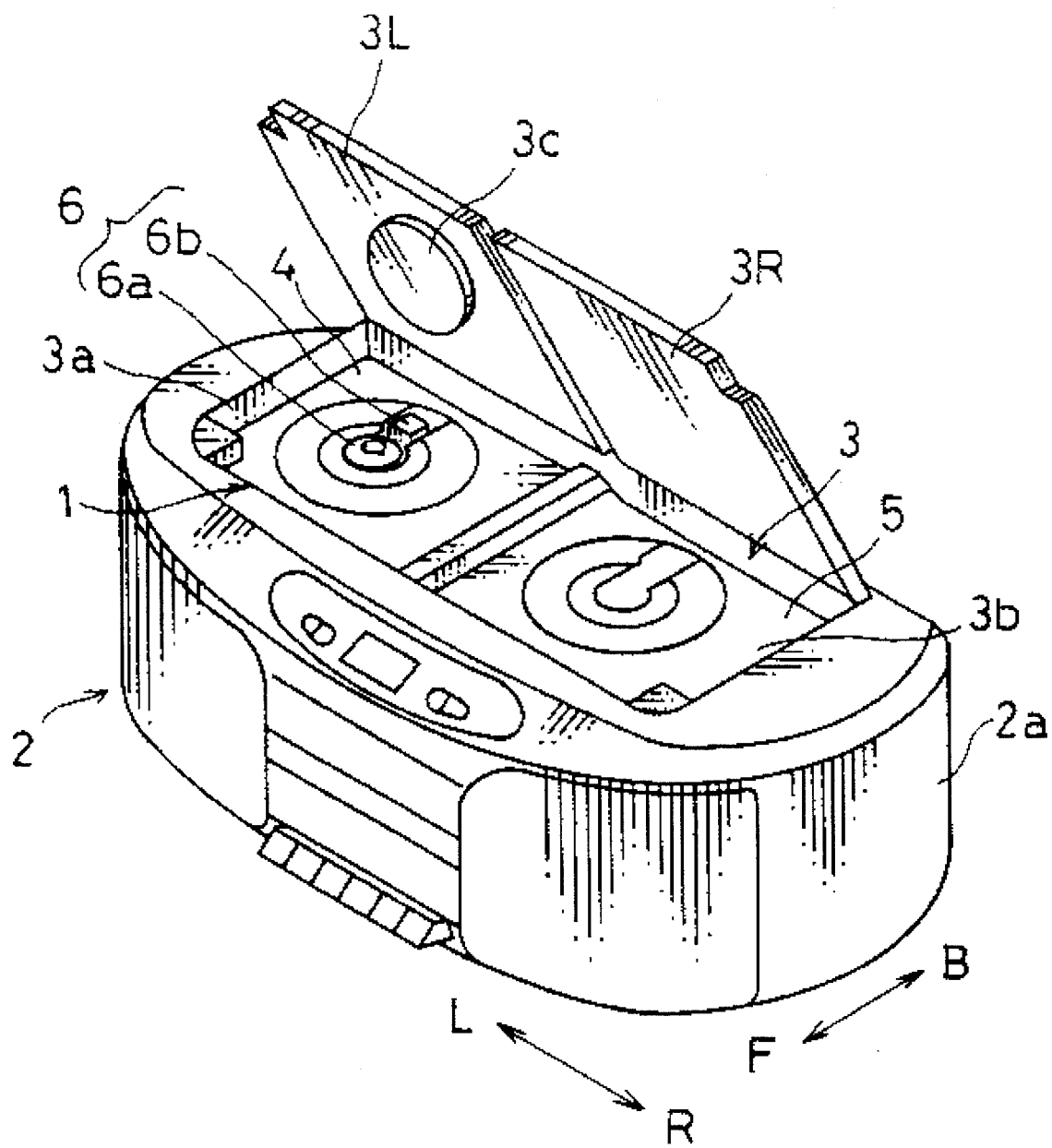
FIG. 46 is a view showing a CD and radio cassette apparatus wherein the disk reproducing apparatus is integrated.
Figure 47:
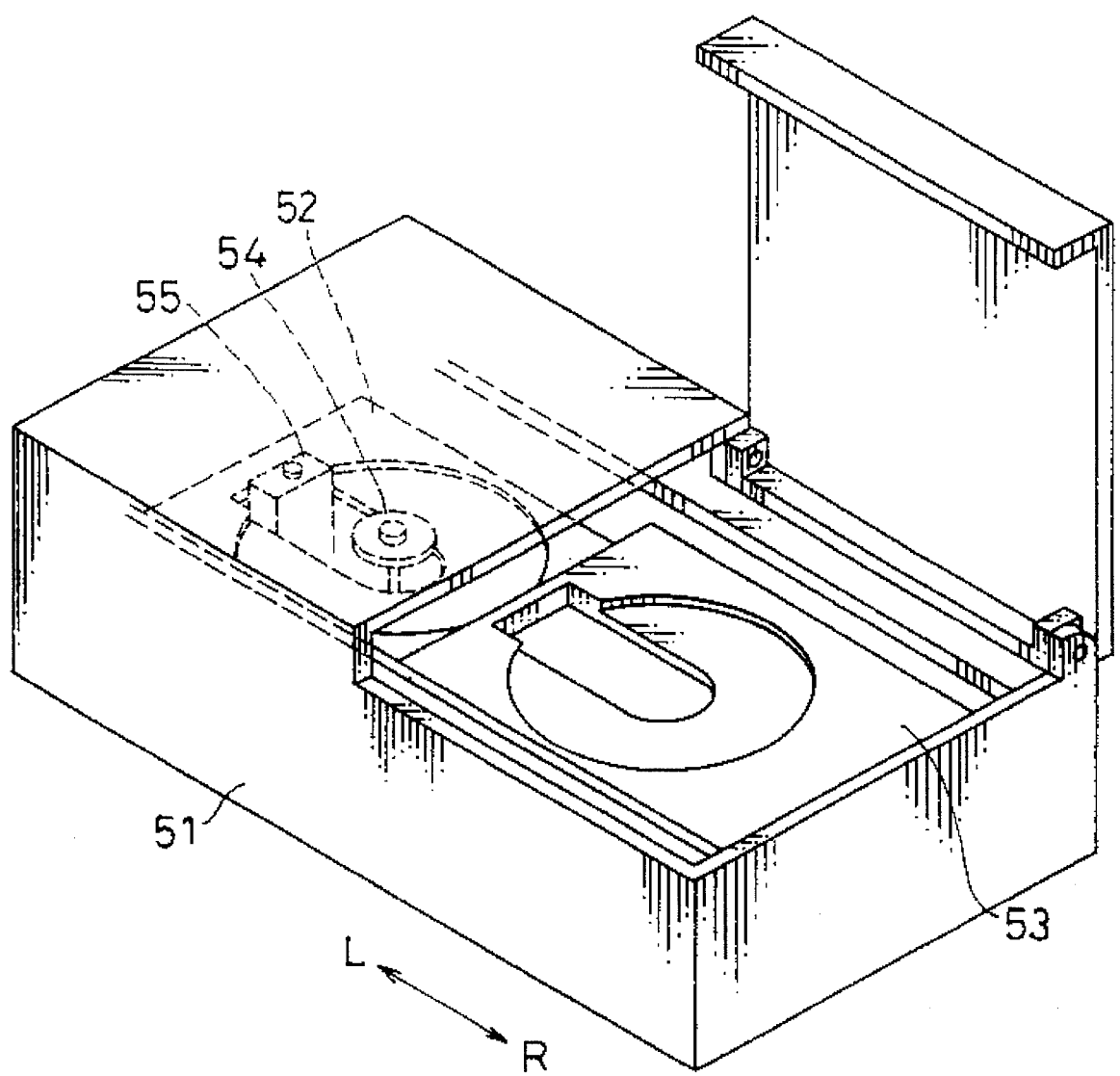
FIG. 47 is a view showing a conventional disk reproducing apparatus.
Figure 48:
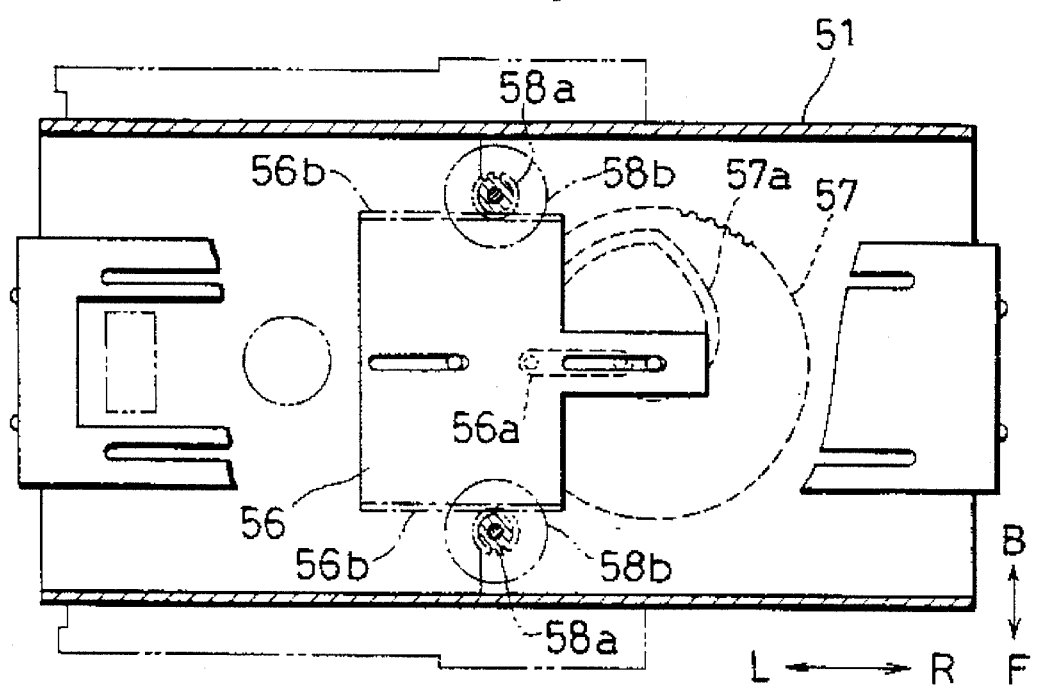
FIG. 48 is a cross-sectional plan view showing the configurations of the essential parts in the apparatus of FIG. 47.
Figure 49:
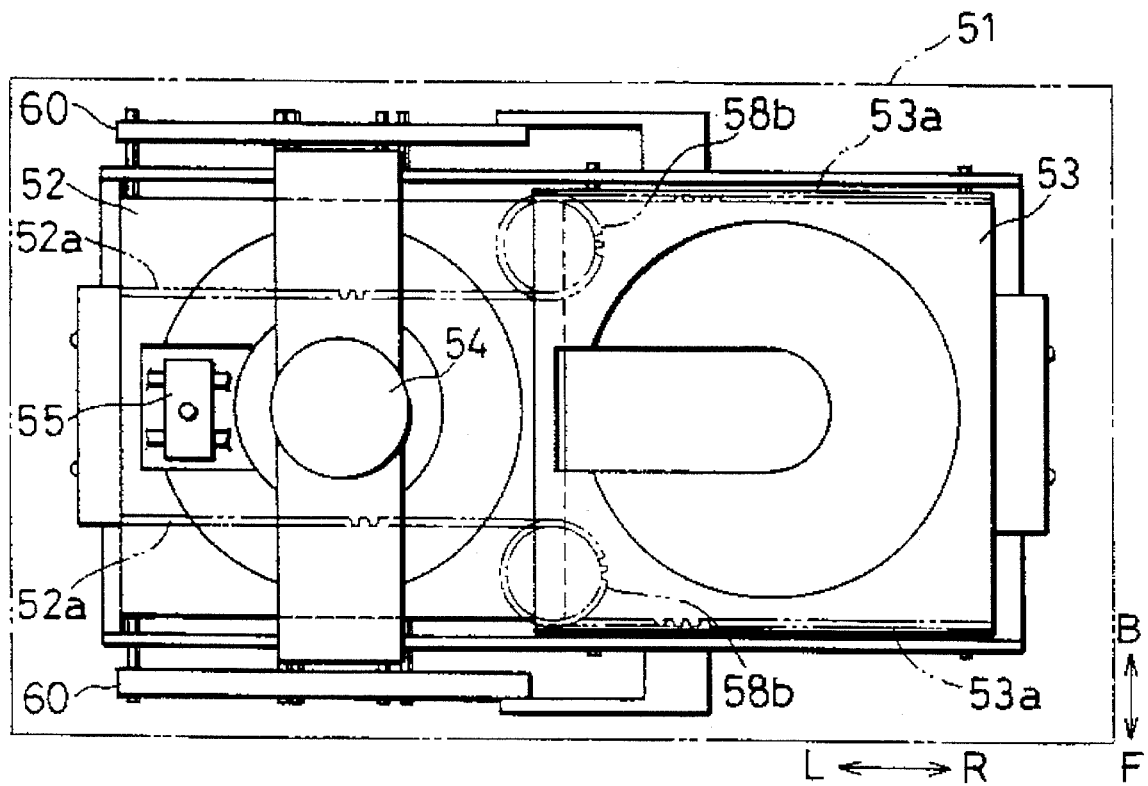
FIG. 49 is a plan view showing the relative position between the first tray and the second tray in the apparatus of FIG. 47.
Figure 50:
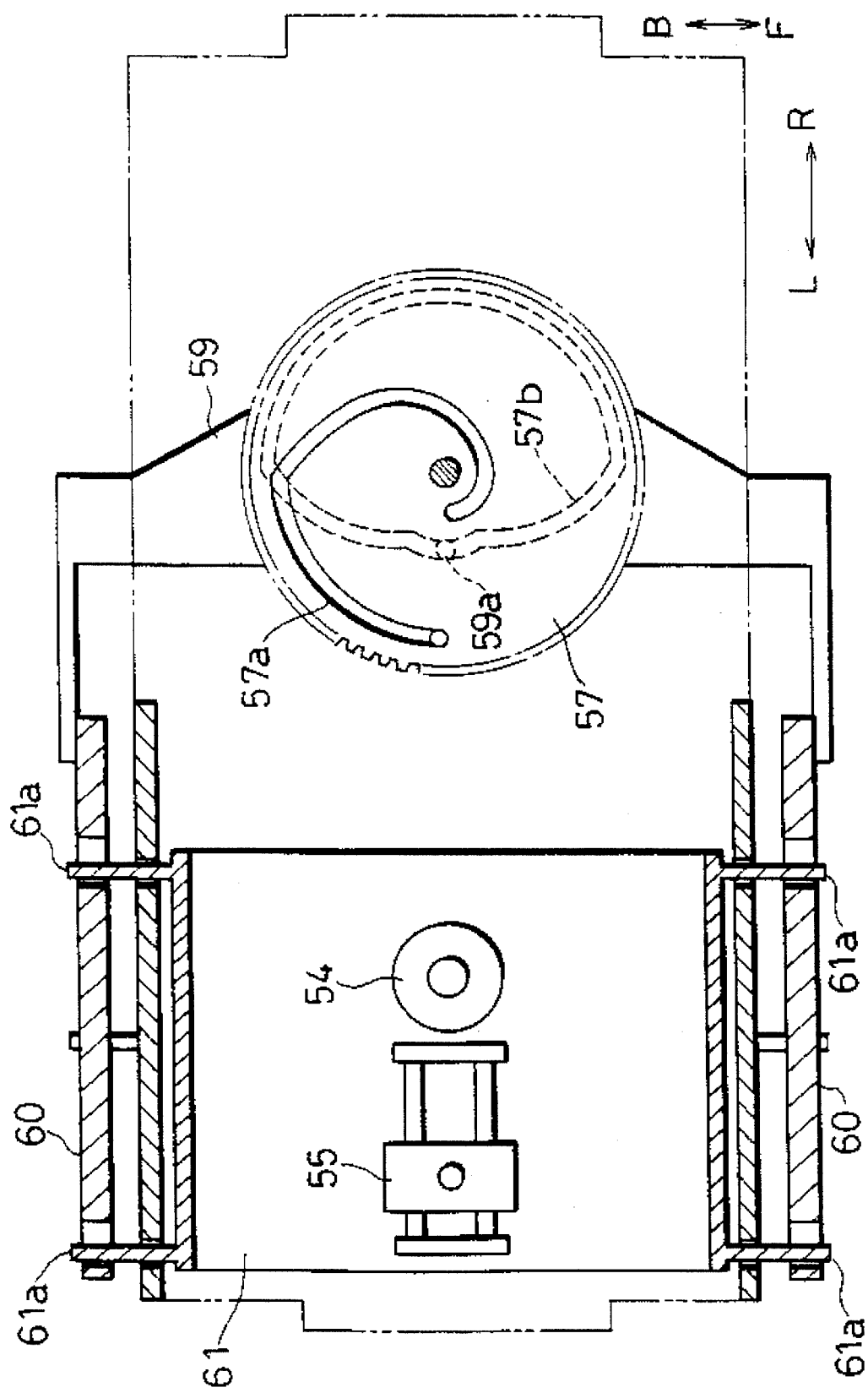
FIG. 50 is a cross-sectional plane view showing the relative position between the cam disk and the reproducing unit provided in the apparatus of FIG. 47.
Figure 51:
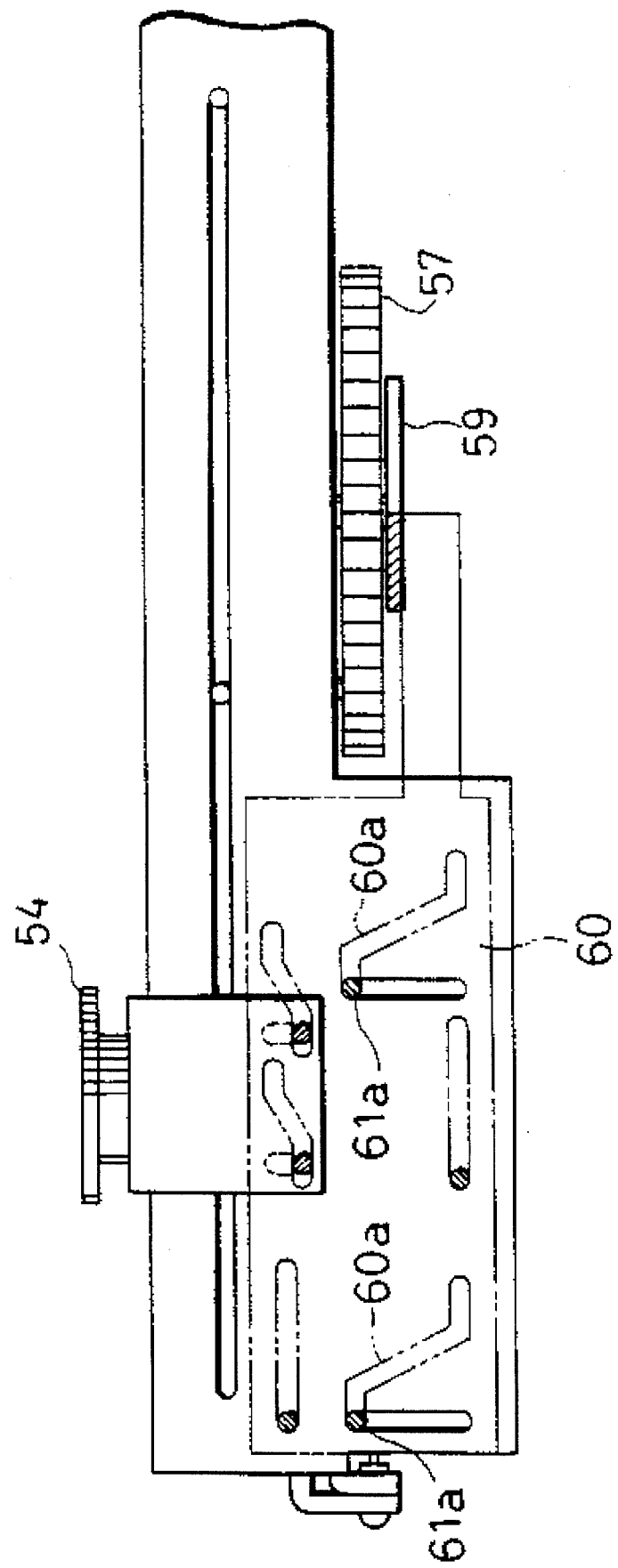
FIG. 51 is a front view showing the configuration of an actuating plate for supporting a reproducing unit in the apparatus of FIG. 47.

FIG. 46 shows a disk reproducing apparatus 1 in accordance with the present embodiment and an audio apparatus wherein a radio and a cassette tape recorder are integrally provided, i.e., a so-called CD and radio cassette device 2. The disk reproducing apparatus 1 is integrated with the CD and radio cassette device 2 on its upper portion and has a recessed disk storage space 3 with an opening on the upper surface of the cabinet 2a. In the disk storage space 3, a space for installing horizontally aligned two disk trays 4 and 5 (in directions shown by arrows L-R) is ensured. The disk trays 4 and 5 are provided for placing thereon disks respectively.

In the left half area 3a (hereinafter referred to as reproducing area) of the disk storage space 3, a reproducing unit 6 is formed. The reproducing unit 6 includes a turn table 6a positioned at the substantial center of the reproducing area 3a and an optical pickup 6b situated beside the turn table 6a. On top of the disk storage space 3, covers 3R and 3L for covering the right half area (hereinafter referred to as stand-by area) 3b and the reproducing area 3a of the disk storage space 3 are respectively formed so as to be freely opened and closed. On the bottom surface of the left cover 3L, a disk stopper 3c is attached to the substantial center of the turn table 6a.

In the described arrangement, the reproducing operation from the disk is performed by reading recorded information by the optical pickup 6b while rotating the disk (not shown) on the disk tray 4 set in the reproducing area 3a using the turn table 6a. In the reproducing operation, a disk can be set on and removed from the disk tray 5 as desired by opening and closing the right opening 3R in the stand-by area. In the reproducing area 3a, the disk can be installed and taken out only when the reproducing operation is not performed by opening and closing the left cover 3L.

As will be described later, the disk trays 4 and 5 are stored in the disk storage space 3 so as to be capable of reciprocating side to side. By simultaneously moving the disk trays 4 and 5 in mutually opposite directions, the respective positions thereof can be switched from the state shown in the figure. In the explanations of the disk interchanging operation, the directions shown by arrows L-R along the movement of the disks 4 and 5 are hereinafter referred to as the side-to-side direction, and the direction orthogonal to the side-to-side direction (the direction shown by arrows F-B) is referred to as the front-and-back direction.

Figure 1:
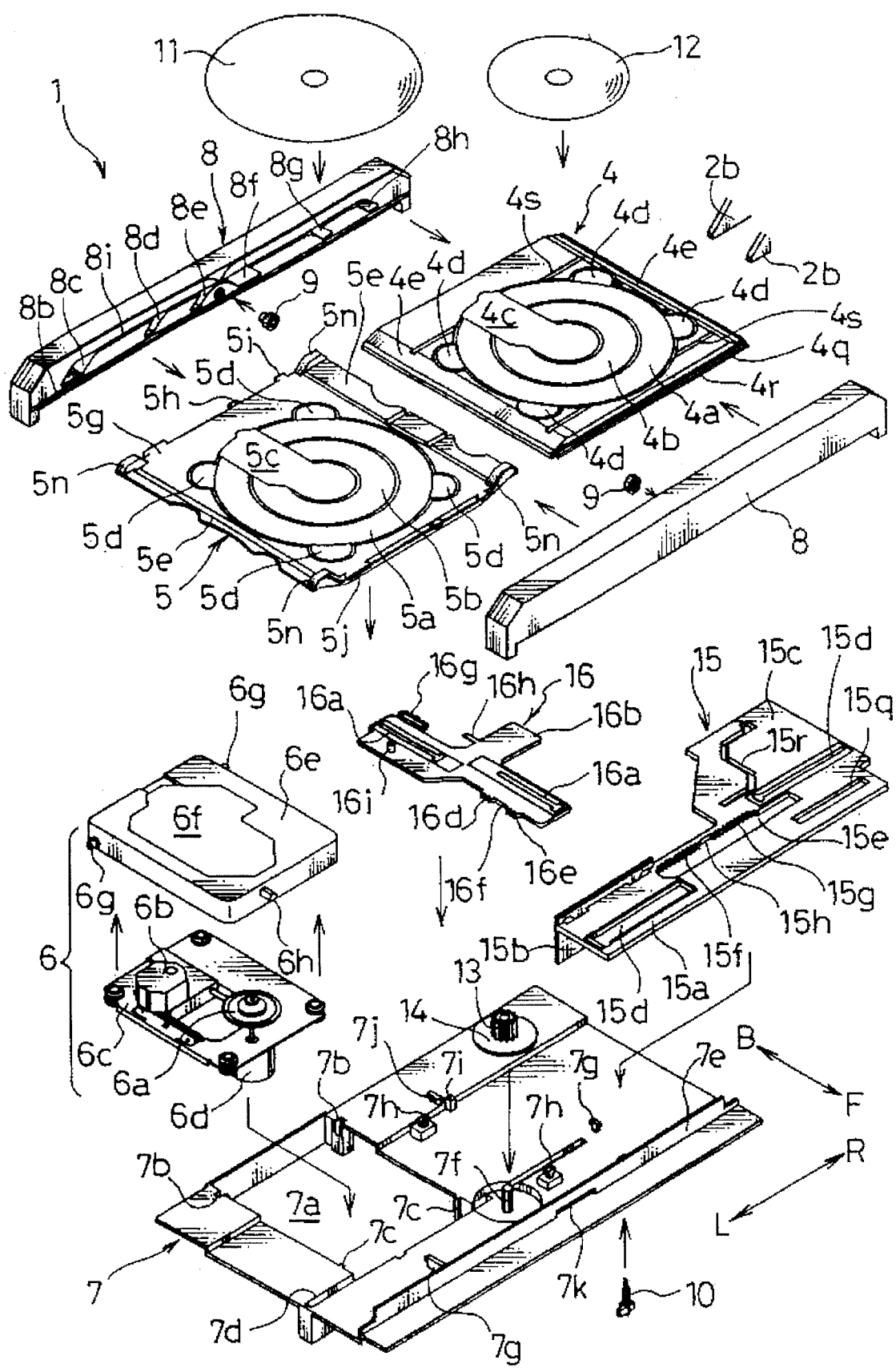
FIG. 1 is an exploded perspective view showing the configuration of a disk reproducing apparatus in accordance with one embodiment of the present invention.

As shown in FIG. 1, the disk reproducing apparatus 1 includes a base plate 7 of a substantially rectangular shape which forms the bottom face of the disk storage space 3. The base plate 7 is horizontally fixed in the cabinet 2a. Near the front and back sides of the base plate 7 in the front-and-back direction (F-B direction), tray guides 8 are formed side to side (L-R direction) to the same length of the base plate 7. Each of the tray guides 8 is secured with screws (not shown).

As will be described later, the tray guides 8 function both as the reproducing position guide means and the stand-by position guide means for the second tray 5, and further as an oblique movement guide member. Between the tray guides 8, a space is formed as the disk storage space 3, and in the figure, the left half of the apparatus 1 is formed as the reproducing area 3a, and the right half of the apparatus 1 is formed as the stand-by area 3b. The tray guides 8 support disk trays 4 and 5 with a predetermined height from the base plate 7 so as to be capable of reciprocating side to side.

On the respective top surfaces of the disk trays 4 and 5, recessed disk receiving faces 4a and 5a are formed for placing thereon a disk 11 with a diameter of 12 cm (generally known as Compact Disk (CD)). Since the disk receiving faces 4a and 5a are formed for holding thereon the disk 11 with a diameter of 12 cm, the respective circumferences of the disk receiving faces 4a and 5a are formed so as to have a slightly larger diameter than the diameter of the disk 11. In order to enable a placement also of a smaller disk 12 with a diameter of 8 cm, the central portion of the disk receiving faces 4a and is further recessed so as to coaxially form smaller disk receiving faces 4b and 5b.

In the areas where the disk receiving faces 4a and 5a are formed, releasing openings 4c and 5c are formed so as to extend backward from the respective substantial centers for allowing the turn table 6a and the optical pickup 6b of the reproducing unit 6 to penetrate therethrough. Further, along the circumferences of the disk receiving faces 4a and 5a, recessed portions 4d and 5d (four for each) which are semicircular in shape are formed so as to be extended from the respective circumferences to allow enough space for the user's fingertips in installation or removal of the disk 11. Although not shown in the figure, similar recessed sections are also formed along the small disk receiving faces.

The respective peripheral portions of the disk trays 4 and 5 are substantially rectangular in shape. Although there is no significant difference in shape of their central portions between the disk trays 4 and 5, the peripheral portions thereof are different from one another. First, in the disk tray 4 on the right hand side of the figure (hereinafter referred to as the first tray), flanking portions 4e are sloped downward toward outside, while in the disk tray 5 on the left hand side in the figure (hereinafter referred to as the second tray), flanking portions 5e are sloped upward toward the outside.

As described earlier, each of the trays 4 and 5 can reciprocate between the reproducing area 3a and the stand-by area 3b.

In the explanations of the interlocking movement of the first tray 4 (dominant tray) with the second tray 5, a position at which the first tray 4 is set in the stand-by area 3b, and the second tray 5 (recessive tray) is set in the reproducing area 3a is designated by the first fixed position, and a position at which the first tray 4 is set in the reproducing area 3a and the second tray 5 is set in the stand-by area 3b is designated by the second fixing position. Here, the explanation will be given through the case of the first fixed position.

On the base plate 7, a rectangular opening 7a is formed at the portion corresponding to the reproducing area 3b for fitting therein the reproducing unit 6. Along the circumference of the rectangular opening 7a, recessed supporting sections 7b are formed on both sides at the back portion (in the direction of B). While, on both sides at the front portion (in the direction of F), projections 7c which are projected inward are formed. Furthermore, a slit like releasing groove 7d is formed on the base plate 7 from the vicinity of the left limit position thereof so as to be connected to the front end portion of the rectangular opening 7a.

Near the front side of the base plate 7, a low plate-like rail 7e is vertically formed side to side to the same length of the base plate 7 and is situated slightly in back of and parallel to the front tray guide 8. A shaft 7f is vertically formed at the substantial center with regard to the length of the base plate 7 and is situated slightly in back of the rail 7e. A drive gear 13 (driving member) of a smaller diameter is mounted on the shaft 7f so as to be freely rotatable. The drive gear 13 is prevented from slipping off by a stopper (not shown). The drive gear 13 is integrally and coaxially formed with a large gear 14 on the lower side. A driving force exerted from a drive motor (not shown) mounted on the bottom surface of the base plate 7 is transmitted to the large gear 14, thereby rotating the drive gear 13.

On the base plate 7, a pair of T-shaped projections 7g and another pair of T-shaped projections 7h are formed. The projections 7g are formed on the left hand side and the right hand side so that the drive gear 13 is situated between them. A unit actuating lever 15 (unit actuating member), to be described later, is secured on the base plate 7 with the T-shaped projections 7g. The other pair of the T-shaped projections 7h are formed slightly to the right of the drive gear 13 so that one projection 7h is separated from the other projection 7h in the front-and-back direction with a predetermined distance between them. Further, a tray lock lever 16 (tray lock member) is secured to the base plate 7 with the projections 7h.

In the vicinity of the T-shaped projection 7h on the back end side, other projections 7i and 7j are formed. The projections 7i are provided for preventing the tray lock lever 16 from slipping off, and the projections 7j are provided for holding the tray lock lever 16 at an intermediate position. The detailed functions of the projections 7i and 7j will be described later. The rail 7e has a slit-like hole 7k for releasing therein the front end of the tray lock lever 16 at the position confronting the T-shaped projection 7h on the front end side. On the underside of the base plate 7, a switch 10 is provided for detecting the position of the unit actuating lever 15. Detailed description thereof will be given later.

As shown in the figure, the reproducing unit 6 has a plate-like unit base 6c. On the unit base 6c, the turn table 6a and the optical pickup 6b are mounted, while on the underside of the unit base 6c, a disk drive motor 6d for driving the turn table 6a is mounted. The unit base 6c is secured with screws (not shown) from the underside so as to be stored in a unit holder 6e, thereby forming the reproducing unit 6.

The unit holder 6e has an opening 6f in the upper surface so that the turn table 6a and the optical pickup 6b can be projected above the upper surface of the unit holder 6e. On both side faces of the unit holder 6e, support pins 6g are formed so as to be projected outwards from the sides, while on the front side face, a unit joint pin 6h is formed so as to be projected outwards from the front side.

From above, the support pins 6g are respectively fitted to the recessed supporting sections 7b formed on the side faces of a rectangular opening 7a formed on the base plate 7. Further, the unit joint pin 6h is inserted into a unit guiding slot 15i of the unit actuating lever 15 (to be described later), thereby securing the reproducing unit 6 onto the base plate 7 as shown in FIG. 2.

In this state, the reproducing unit 6 can be pivoted down and up to the horizontal position about a line connecting the support pins 6g by moving the front portion of the reproducing unit 6 up and down. In the described movement, the position of the reproducing unit 6 changes according to the height position of the unit joint pin 6h supported by the unit actuating lever 15. In order to control the front end side of the reproducing unit 6 in the side-to-side direction, the aforementioned projections 7c are formed on both side faces of the rectangular opening 7a at the front portion.

Figure 2:
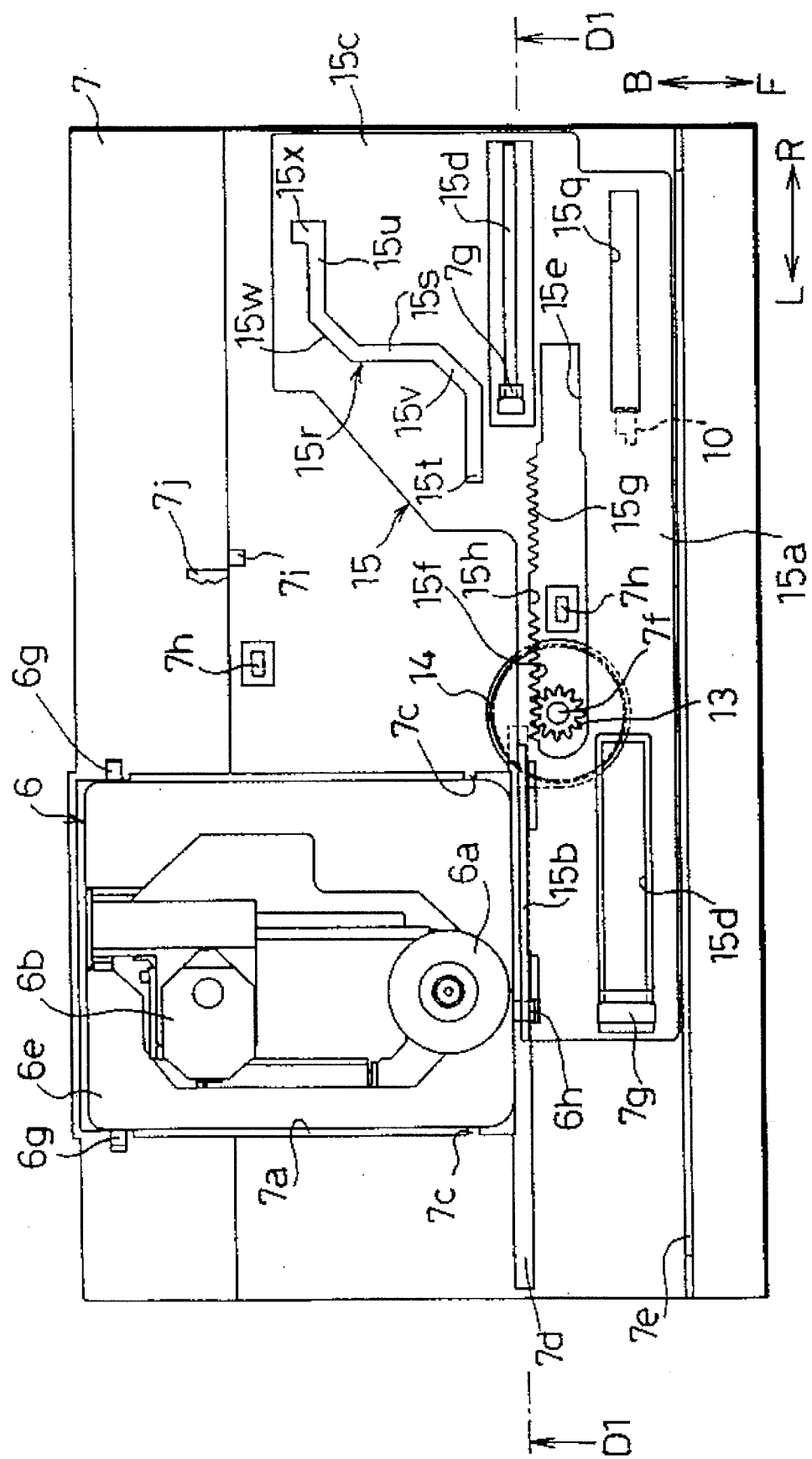
FIG. 2 is a plan view showing relative positions between a base plate, a reproducing unit and a unit actuating lever in the first fixed position of the disk reproducing apparatus.

On the base plate 7, a plate-like unit actuating lever 15 is provided between the base plate 7 and the first and second trays 4 and 5 as shown in FIG. 2. The unit actuating lever 15 is composed of a plate 15a which is formed side to side in an area between the rail 7e and the front side of the rectangular opening 7a so as to extend from the right end of the base plate 7. On the left end portion of the plate 15a, a unit guide piece 15b is formed vertically downward through a space formed between the front side of the rectangular opening 7a, while on the right end portion of the plate 15a, a lever joint cut-out forming piece 15c is formed so as to be extended backward (in the direction of B). Both the unit guide piece 15b and the lever joint cut-out forming piece 15c are connected to the plate 15a so as to form a piece of plate.

In the plate 15a, two slots 15d are formed side to side on the left-front portion and on the right portion. By inserting the T-shaped projections 7g formed on the base plate 7 into the slots 15d from the underside, the unit actuating lever 15 is secured on the base plate 7. In this arrangement, the unit actuating lever 15 can reciprocate side to side between the position where the right end thereof coincides with the right side of the base plate 7 (hereinafter referred to as a right limit position) and a position where the left end thereof coincides with the left side of the base plate 7 (hereinafter referred to as a left limit position).

In the substantial center of the plate 15, a slot 15e is formed side to side for allowing the drive gear 13 to penetrate therethrough. On the back side face of the slot 15e (in the direction of B), racks 15f and 15g in mesh with the drive gear 13 are formed so as to be horizontally aligned with an untoothed portion 15h (intermediate support portion) between them. Hereinafter, the rack on the left hand side of the untoothed portion 15h is referred to as the left rack 15f, and the rack on the right hand side of the untoothed portion 15h is referred to as the right rack 15g. In the first fixed position, the drive gear 13 is in mesh with the left end of the left rack 15f.

As shown in FIG. 3, on the unit guide plate 15b of the unit actuating lever 15, a unit guiding slot 15i is formed. At respective upper ends of the unit guiding slot 15i, a left horizontal portion 15j and a right horizontal portion 15k are respectively formed. Further, the unit guiding slot 15i is formed in a substantial V-shape by being composed of a left sloping portion 15n and a right sloping portion 15p with a horizontal holding portion 15m at the bottom.

In the first fixed position, the reproducing unit 6 is held with a unit joint pin 6h mating with the left horizontal section 15j. In this position, the turn table 6a and the optical pickup 6b are projected above so as to allow the reproduction from the disk 11.

As shown in FIG. 2, on the lever joint cut-out forming piece 15c of the unit actuating lever 15, a substantially S-shaped lever joint cut-out 15r is formed. As will be described later, a lever joint pin 16c of the tray lock lever 16 is fitted in the lever joint cut-out 15r. The tray lock lever 16 can freely slide on the unit actuating lever 15 in the front-and-back direction.

The lever joint cut-out 15r is composed of a stoppage portion 15s formed at its substantial center with regard to the length of the lever joint cut-out 15r, and left and right diagonals 15v and 15w formed so as to be connected at 45 degree angle to the ends of the stoppage portion 15s. The other ends of the diagonals 15v and 15w are respectively connected to left and right stoppage cancelling portions 15t and 15u. Further, an assembling-use hole 15x is formed at the right limit end of the right stoppage cancelling portion 15u so as to be recessed backward.

The unit actuating lever 15 can freely slide between the right limit position as shown in the figure and the left limit position. In order to detect the position of the unit actuating lever 15 which moves side-to-side in the described manner, a position detecting slot 15q is formed side to side at the right-front portion. In the state where the unit actuating lever 15 is moved to the right limit position, the aforementioned switch 10 on the base plate 7 is provided at the position corresponding to the left end of the position detecting slot 15q.

Figure 4A:
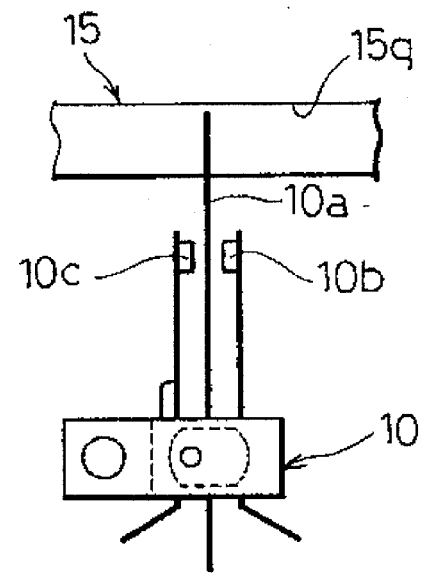
FIG. 4(a) is a front view showing open and closed states of a switch mounted to the base plate when moving the unit actuating lever.

As shown in FIG. 4(a), the switch 10 is composed of a movable piece 10a which extends upward into the position detecting slot 15q and is sandwiched between the first and second contacts 10b and 10c.

Figure 4B:
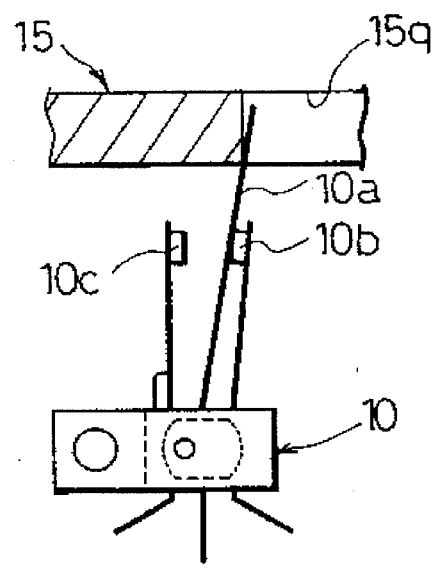
FIG. 4(b) is a front view showing open and closed states of the switch mounted on the base plate while the unit actuating lever is being moved to the right limit position.
Figure 4C:
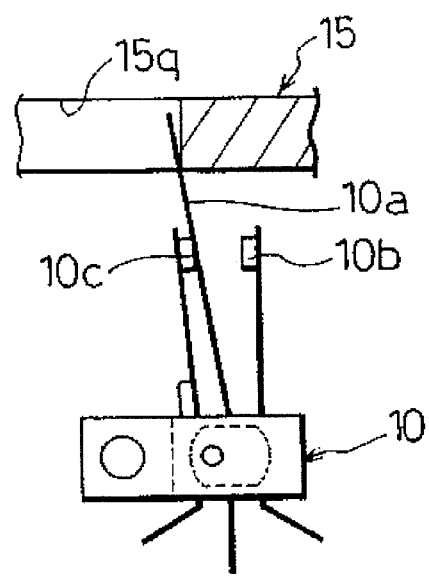
FIG. 4(c) is a front view showing open and closed states of the switch when the unit actuating lever is positioned at the left limit position.

As shown in FIG. 4(b), when the unit actuating lever 15 is moved to the right limit position, the movable piece 10a composed of an electrically conductive plate spring is deformed elastically to the right by the left end of the position detecting slot 15q. This, in turn, makes the movable piece 10a to be in contact with the first contact 10b, whereby the switch 10 is set ON, and a signal indicative of the right limit position is outputted. On the other hand, when the unit actuating lever 15 is moved to the left limit position, as shown in FIG. 4(c), the movable piece 10a is deformed to the left by the right end of the position detecting slot 15q. This, in turn, makes the movable piece 10a in contact with the second contact 10c, whereby the switch 10 is set ON, and a signal indicative of the left limit position is outputted. When the unit actuating lever 15 is positioned between the left limit position and the right limit position, the movable piece 10a is separated from both of the contacts 10b and 10c as shown in FIG. 4(a), and in this state, the switch 10 is set OFF.

Figure 6:
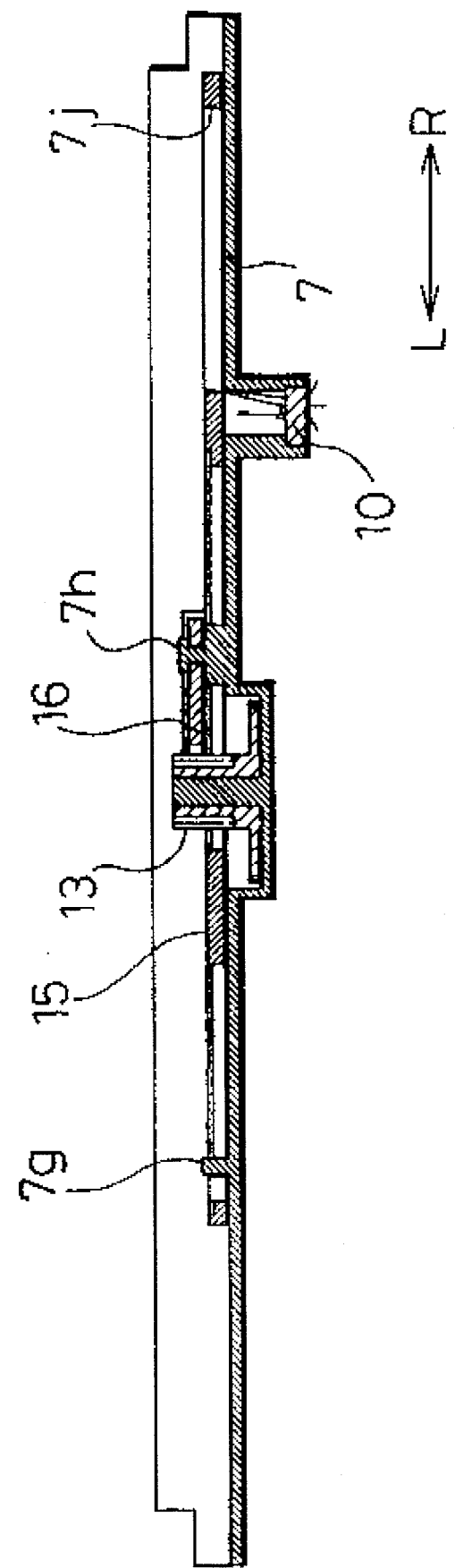
FIG. 6 is a cross-sectional view taken on line D2—D2 of FIG. 5.

As shown in FIG. 5, the tray lock lever 16 is connected to the base plate 7 so as to be mounted on the unit actuating lever 15 from thereabove. The tray lock lever 16 is made of a plate, and is positioned to the right of the drive gear 13 and extends from the vicinity of the front end (the end in the direction of F) of the base plate 7 into a position slightly in back of the substantial center of the base plate 7. On the tray lock lever 16, two discontinuous long slots 16a are formed in parallel in the front-and-back direction with a small distance in the side-to-side direction between them. As shown in FIG. 6, the T-shaped projections 7h formed on the base plate 7 are inserted into the slots 16a from the underside, thereby securing the tray lock lever 16 onto the base plate 7. As a result, as shown in FIG. 5, the tray lock lever 16 can reciprocate in the front-and-back direction between the position at which the front end thereof coincides with the vicinity of the front end of the base plate 7 (hereinafter referred as the front limit position) and the position at which the back end thereof coincides with the vicinity of the back end of the base plate 7 (hereinafter referred to as the back limit position).

The tray locking lever 16 has an extended piece 16b to the right at its substantial center. On the bottom face of the extended piece 16b, the lever joint pin 16c is formed so as to be projected downward. When assembling, the lever joint pin 16c is inserted into the left end of the left stoppage cancelling portion 15t of the lever joint cut-out 15r. On the other hand, along the left side face of the tray lock lever 16, rlacks 16d and 16e are formed in front of the drive gear 13 with an untoothed portion 16f between them so as to be in mesh with the drive gear 13 at the portion above the rack 15*f* and 15*g* of the unit actuating lever 15. The racks 16*d* and 16*e* and the untoothed portion 16*f* are linearly aligned. Hereinafter, the rack 16*d* in back of the untoothed portion 16*f* is referred to as a rear rack 16*d* and the rack 16*e* in front of the untoothed portion 16*f* is referred to as the front rack 16*e*.

On the right side face, a circular joint projection 16*g* made of a flexible material is formed at the back end portion. Further, along the back end of the extended piece 16*b*, a plate-like projection 16*h* made of a flexible material is formed so as to be extended towards the back. In the backward movement of the tray lock lever 16 from the position shown in the figure, the joint projection 16*g* is in mesh with the recessed portion of the intermediate position holding use projection 7*j*. With a further backward movement, the projection 16*h* becomes in contact with the slip-off preventing-use projection 7*i* formed on the base plate 7, thereby preventing the tray lock lever 16 from being separated from the base plate 7.

Beside the long slot 16*a* on the back side of the tray lock lever 16, a tray joint pin 16*i* extends vertically.

In the figure, the first tray 4 in the further upper position of the tray lock lever 16 is shown by the alternate long and short dash line. On the bottom face of the first tray 4, a tray joint groove 4*f* is formed. The tray joint groove 4*f* is composed of a stoppage cancelling portion 4*g* formed side-to-side with the opening 4*c* therebetween, left and right diagonals 4*h* and 4*i* formed so as to be connected at 45 degree angle to the ends of the stoppage cancelling portion 4*g* and left and right stoppage portions 4*j* and 4*k* formed so as to be connected from the ends of the left and right diagonals 4*h* and 4*i* respectively to the front and to the back. The described tray joint groove 4*f* forms a substantial S-shape which is bisected by the opening 4*c*.

In the first fixed position, the tray joint pin 16*i* of the tray lock lever 16 is set in the front portion of the left stoppage portion 4*j* of the tray joint groove 4*f*. Therefore, in this position, as long as the tray lock lever 16 is placed at the front limit position, the side-to-side movement of the first tray can be prevented, thereby holding the first tray 4 at the fixed position in the stand-by area 3*b*, i.e., the stand-by position.

Figure 7:
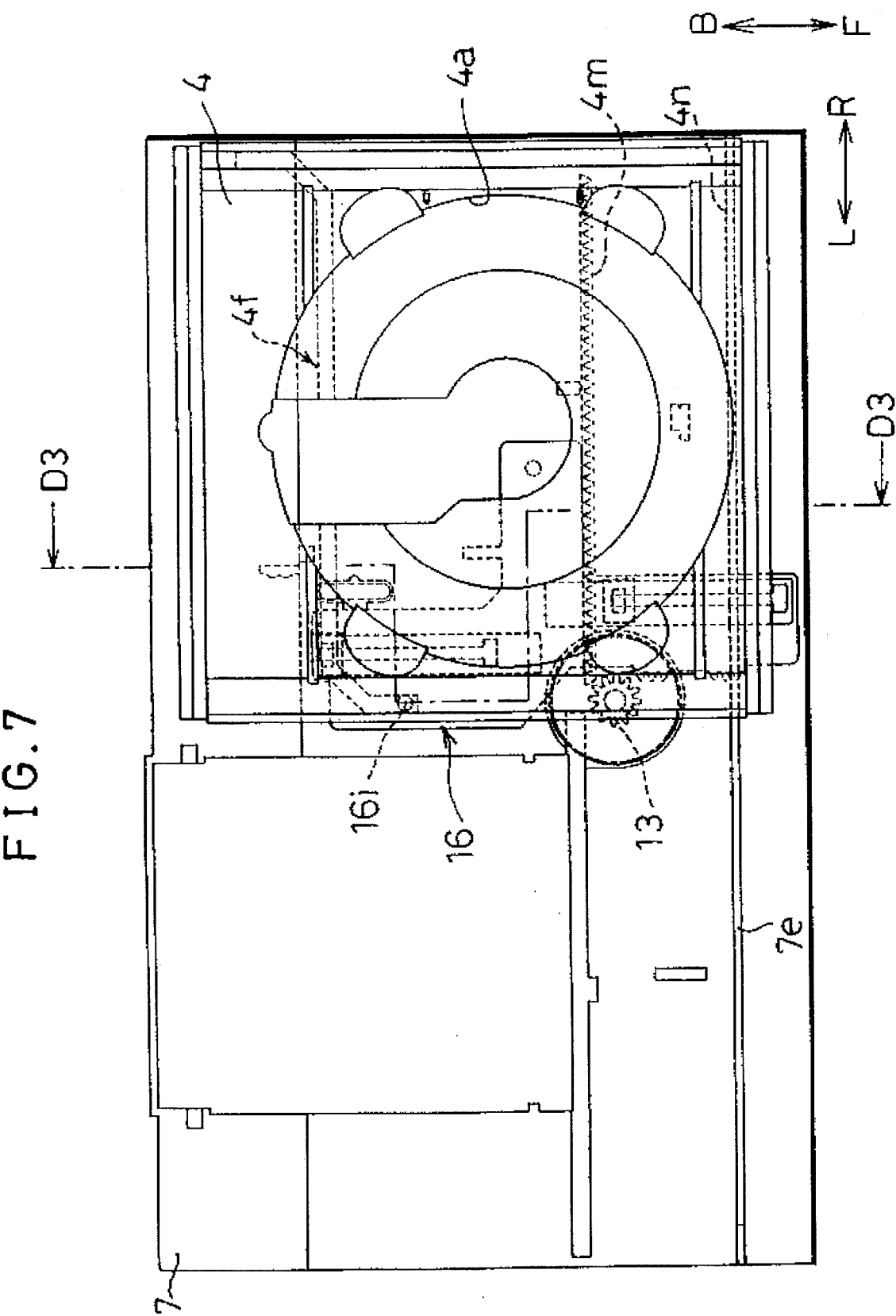
FIG. 7 is a plan view showing the relative position between the tray lock lever and the first tray in the first fixed position of the disk reproducing apparatus.

As shown in FIG. 7, on the bottom surface of the first tray 4, the aforementioned tray joint groove 4*f* is formed. The rack 4*m* is also formed side to side in the direction of the tangent of the drive gear 13 so that it can be engaged therewith. The rack 4*m* is formed to such a length that it will not be disengaged from the drive gear 13 from the position shown in FIG. 7 when the first tray 4 is set in the reproducing position where the first tray 4 is set in the reproducing area 3*a* and when it is set in the stand-by position. When the first tray 4 is slightly moved from the stand-by position towards the drive gear 13, the rack 4*m* becomes in mesh with the drive gear 13, and a rotation driving force from the drive gear 13 is transmitted to the first tray 4.

Figure 8:
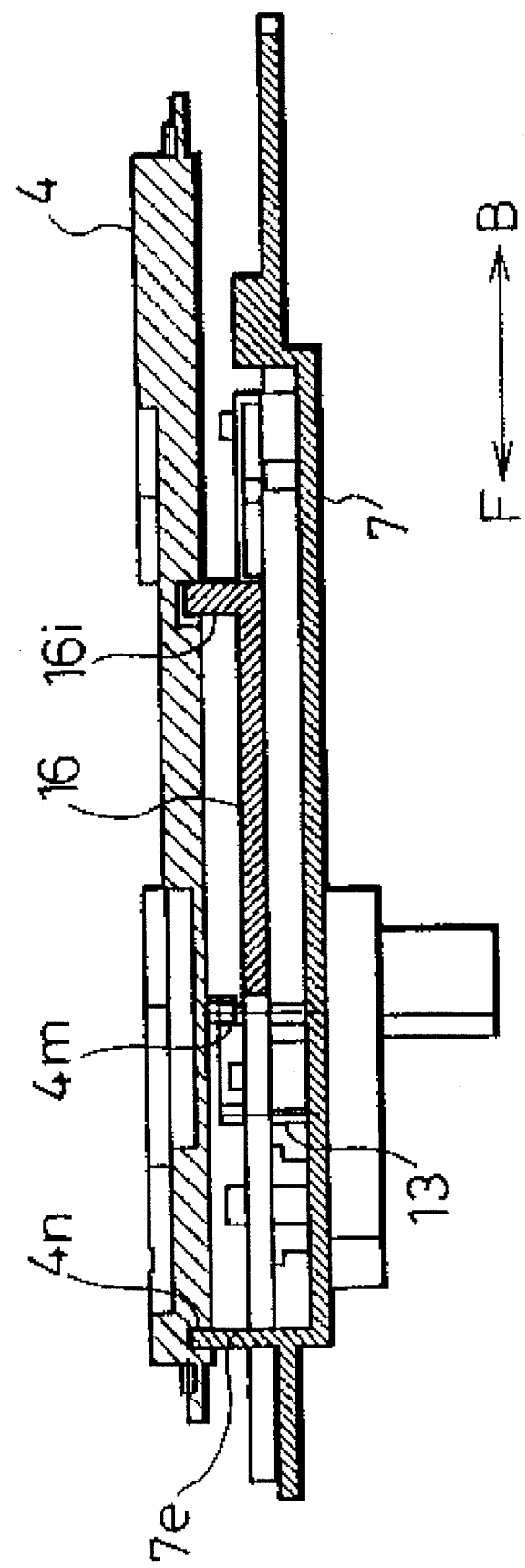
FIG. 8 is an enlarged cross-sectional view taken on line D3—D3 of FIG. 7.

A rail guide groove 4*n* is formed side-to-side on the bottom surface of the first tray 4 to the same length of the first tray 4 at the front side (in the F direction side). When assembling, the upper end portion of the rail 7*e* of the base plate 7 mates with the rail guide groove 4*n* as shown in FIG. 8. In this way, the height position of the first tray 4 can be controlled, and the side-to-side movement of the first tray 4 can be accurately guided. Moreover, the rack 4*m* is in mesh with the upper end of the drive gear 13, which is projected above the tray lock lever 16.

Next, the support structure of the first and second trays 4 and 5 by the tray guides 8 on the front side and the rear side and the interlocking mechanism between the trays 4 and 5 will be explained.

As shown in FIG. 9, on both the front and back of the first tray 4, parallel rack forming sections 4*p* are formed side to side. Parallel to the rack forming sections 4*p*, the guide pieces 4*q* are respectively formed at the front and back sides of the tray 4. The rack forming sections 4*p* and the guide pieces 4*q* are formed side to side to the same length of the first tray 4, and are assembled within the space between the tray guides 8.

Similarly, on both sides in the front-and-back direction of the second tray 5, rack forming sections 5*f* are formed side to side to the same length of the second tray 5. Outside the rack forming sections 5*f*, a pair of first guide projections 5*g*, a pair of second guide projections 5*h* and a pair of third guide projections 5*i* are respectively formed.

The respective configurations of the tray guides 8 and the trays 4 and 5 are the same between the front side and the rear side. Thus, explanations will be given only on the front side, and members having the same configurations and functions between the rear side and the front side will be designated by the same reference numerals, and thus the descriptions of the members on the rear side shall be omitted here.

As shown in FIG. 10(*a*), in the tray guide 8, the area above where the rack forming sections 4*p* and 5*f* are mounted is an empty space of such a height so as to allow clearance. On the upper surface of the rack forming section 4*p* of the first tray 4, a rack 4*r* is formed to the same length of the first tray 4. On the other hand, the both ends in the side-to-side direction of the rack forming section 5*f* of the second tray 5 are formed so as to be sloped upward to the sides at the same angle as the flanking portion 4*e*. On the underside of the rack forming section 5*f*, a rack 5*j* is formed. The rack 5*j* is composed of a horizontal rack 5*k* and upward sloping racks 5*m* connected to the both sides of the horizontal rack 5*k*.

Also shown in FIG. 10(*a*), in the first fixed position, the left end of the rack 4*r* of the first tray 4 vertically overlaps the right end of the sloping rack 5*m* of the second tray 5. In the overlapping area, a pinion 9 (intermediate transmitting member) is supported by a shaft of a vertical side face of the tray guide 8 so as to be freely rotatable and in mesh with both of the racks 4*r* and 5*j*. Therefore, when the first tray 4 is moved from the position shown in the figure to the left, the pinion 9 rotates. As a result, the second tray 5 is moved up along the slope and further moved to the right.

At substantial center on the underside of the upper surface of the guide rail 8, a projection with a triangular cross section 8*a* is formed for guiding the movement of the second tray 5 along the upward slope to the right. On both sides of the rack forming section 5*f* of the second tray 5, position controlling pieces 5*n* are formed so as to extend in an inverted U-shape from the sloping racks 5*m* for ensuring the engagement between the sloping racks 5*m* and the pinion 9.

As shown in FIG. 10(*b*), the first horizontal guide groove 8*b* is formed at the bottom portion of the vertical side face when assembling the apparatus, the guide piece 4*q* of the first tray 4 is fitted into the horizontal guide groove 8*b*, thereby supporting the first tray 4 along the first horizontal guide groove 8*b* so as to be movable between the stand-by position and the reproducing position.

On each of the front and back sides of the tray guide 8, oblique guide grooves 8*c*, 8*d* and 8*e* are formed so as to be sloped downward to the left on the left side of the center of the tray guide 8 above the first horizontal guide groove 8*b*. Similarly, oblique guide grooves 8*f*, 8*g* and 8*h* are formed so as to be sloped downward to the right on the right hand side of the center of the tray guide 8 above the first horizontal guide groove 8*b*. The oblique guide grooves 8*f*, 8*g* and 8*h* are formed so as to respectively correspond to the respective widths and intervals of the first through third projections 5*g*, 5*h* and 5*i*. The upper ends of the oblique guide groove 8*c*–8*h* are connected to the second horizontal guide groove 8*i*.

In the first fixed position where the second tray 5 is held at the reproducing position, the first through third projections 5*g*, 5*h* and 5*i* are fitted in the oblique guide grooves 8*c*, 8*d* and 8*e* at the respective bottom portions.

As can be seen from FIG. 10(*b*), the first projection 5*g* is longer than the second and third projections 5*h* and 5*i*, and the interval between the first projection 5*g* and the second projection 5*h* is longer than the interval between the second projection 5*h* and the third projection 5*i*. The bottom positions of the oblique guide grooves 8*c* through 8*h* which determine the respective height positions of the second tray 5 in the reproducing position and the stand-by position are set such that the respective height positions of the first tray 4 and the second tray 5 in the reproducing position and the stand-by position can be maintained at the same height position.

Next, the respective configurations of the first and second trays 4 and 5 on the side of the disk receiving faces 4*a* and 5*a* will be explained below.

As previously described in reference to FIG. 1, the first tray 4 is formed such that the respective flanking portions 4*e* in the side-to-side direction are sloped upward toward the center. On the upper surface of the first tray 4, two grooves 4*s* are formed side to side to the length of the horizontal portion of the upper surface of the first tray 4 between the flanking portions 4*e*. The described grooves 4*s* run parallel to each other in a side to side direction near the front and back portions of the disk receiving face 4*a* on the first tray 4.

To the right of the first tray 4, a pair of disk guiding projections 2*b* (hereinafter referred to as cabinet projections) are formed. The cabinet projections 2*b* with the upper end face thereof sloped downward to the center (triangular in shape) are formed on the inner surface of the cabinet 2*a* so as to be projected out above the first tray 4. As shown in FIG. 9, the inner ends thereof are situated along the circumference of the disk receiving face 4*a*. In this arrangement, when loading the disk 11 on the disk receiving face 4*a* from above, if the disk 11 is placed at a position slightly displaced to the right of the disk receiving face 4*a*, the disk 11 would be guided by the cabinet projections 2*b* so as to be centered right on the disk receiving face 4*a* and is secured in that position.

On the upper surface of the first tray 4, a pair of disk stoppage projections 4*t* are vertically formed slightly to the right of the left ends of the cabinet projections 2*b*.

On the underside of the second tray 5, a pair of disk pushing projections 5*p* are formed so as to be projected downward at a position on the extended line from the grooves 4*s* of the first tray 4. The respective functions of the disk pushing projections 5*p* and the grooves 4*s* will be explained below in more detail. Along the front side of the bottom surface of the second tray 5, a groove 5*s* is formed in the same manner as the rail guide groove 4*n* of the first tray 4. When the second tray 5 is held in the reproducing position or the stand-by position at the same height position as the first tray 4, the rail 7*e* of the base plate 7 is fitted in the groove 5*s* from the underside. As a result, the second tray 5 is held at a predetermined position in the front-and-back direction.

The respective flanking portions 5*e* of the second tray 5 formed in the side-to-side direction are sloped downward to the center. Namely, the flanking portions 5*e* are sloped in the opposite direction to the flanking portions 4*e* of the first tray 4. As shown in the figure, in the first fixed position, the right flanking portion 5*e* of the second tray 5 overlaps the left flanking portion 4*e* of the first tray 4. When the disk trays 4 and 5 are interchanged from the position shown in the figure to the second fixed position and is held at that position, the left flanking portion 5*e* of the second tray 5 overlaps the right flanking portion 4*e* of the first tray 4. Here, in order to prevent the cabinet projections 2*b* from hitting the right flanking portion 5*e* of the second tray 5, recessed portions 5*q* are formed on the right flanking portion 5*e*. On each flanking portion 5*e* of the second tray 5, circularly cut recessed portions 5*r* are formed so as to prevent the recessed portions 4*d* from being obstructed.

Next, the interchanging operation of the trays 4 and 5 of the disk reproducing apparatus 1 having the above configuration will be explained through the case where the trays 4 and 5 are interchanged from the first fixed position shown in FIG. 9 to the second fixed position. The explanations are given in the following order:

[1] a) Interlocking Mechanism among the reproducing unit 6, the first tray 4 and the unit actuating lever 15, the tray lock lever 16, and b) Interlocking Mechanism between the First Tray 4 and the Second Tray 5 (to be given separately);

[2] Interchanging Mechanism of Trays from the Second Fixed Position to the First Fixed Position; and

[3] the disk displacement on the first tray 4 adjusting operation.

[1] a) The Interlocking Mechanism among the Reproducing Unit 6, the First Tray 4, the Unit Actuating Lever 15 and the Tray Lock Lever 16.

As described earlier, in the first fixed position shown in FIG. 9, the first tray 4 is held in the stand-by area 3*b* and the second tray 5 is held in the reproducing area 3*a*, and thus reproduction from the disk 11 placed on the second tray 5 is permitted. In this first fixed position, as shown in FIG. 2, the unit actuating lever 15 is positioned at the right limit position, and thus a signal indicative of the right limit position is outputted from the switch 10. In this state, the drive gear 13 is in mesh with only the left rack 15*f* of the unit actuating lever 15.

The described movement can be achieved in the following manner. First, a user operates a disk interchanging operation key (not shown) provided in the CD and radio cassette apparatus 2, and a signal indicative of interchanging trays is inputted into a control device (not shown). Then, the control device conducts the drive motor so as to actuate the drive gear 13. The control device controls the conducting direction to the drive motor using the output signal from the switch 10 so that the drive gear 13 is driven in the counterclockwise direction.

Figure 11:
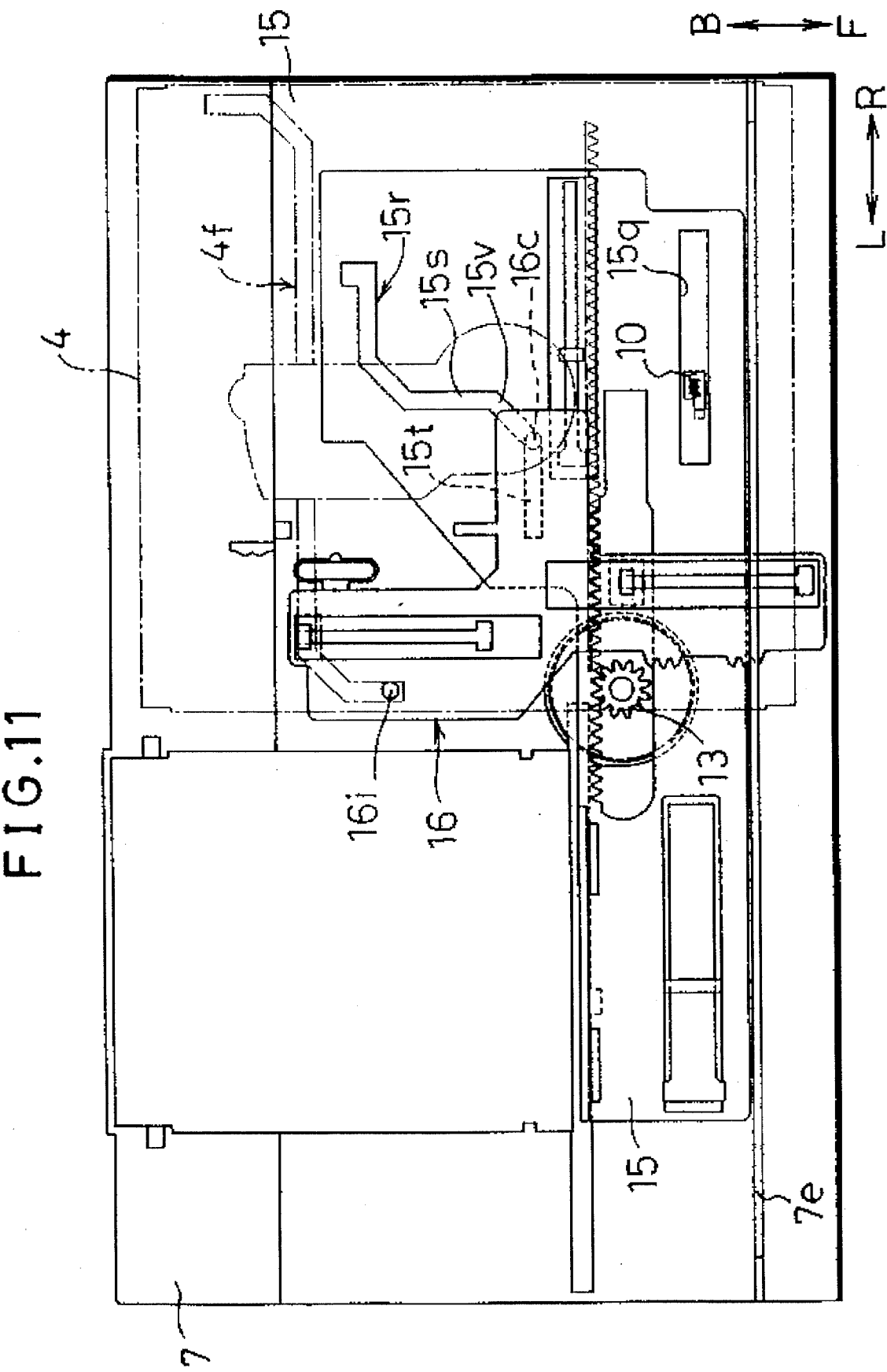
FIG. 11 is a plan view showing a movement of the unit actuating lever when interchanging trays from the first fixed position to the second fixed position of the disk reproducing apparatus.
Figure 12:
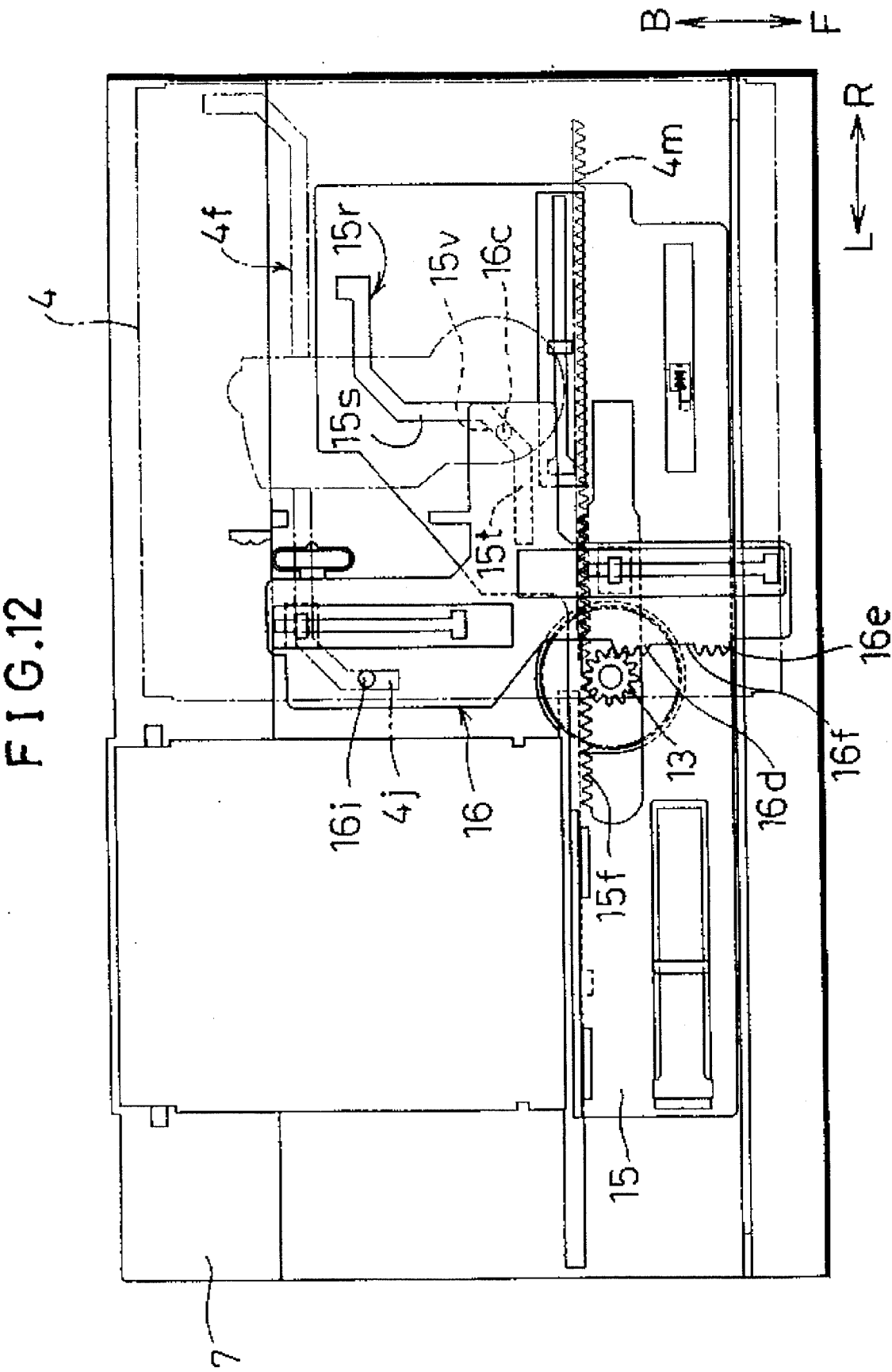
FIG. 12 is a plan view showing the state where the unit actuating lever has been further moved to the left from the position shown in FIG. 11.

When the drive gear 13 is actuated, first, the unit actuating lever 15 is moved to the left. As a result, the switch 10 is set OFF. Synchronous with the movement of the unit actuating lever 15, as shown in FIG. 11, the lever joint pin 16*c* of the tray lock lever 16 is moved relatively to the right within the left stoppage cancelling portion 15*t* of the lever joint cut-out 15*r* formed on the unit actuating lever 15. Then, as shown in FIG. 12, the lever joint pin 16*c* is moved along the left diagonal 15*v* of the lever joint cut-out 15*r* to the intermediate position, and the left rack 15*f* or the unit activating lever 15 is disengaged from the drive gear 13. Synchronous with the described movement of the lever joint pin 16*c* along the left diagonal 15v, the tray lock lever 16 having been in the stoppage position starts moving backward (in the direction of B) by being pushed, and as shown in FIG. 12, the rear rack 16d of the tray lock lever 16 becomes in mesh with the drive gear 13.

As a result, the transmittance of the driving force from the drive gear 13 is switched from the unit actuating lever 15 to the tray lock lever 16. During the further movement of the lever joint pin 16c along the left diagonal 15v, the unit actuating lever 15 is kept moving to the left even after being disengaged from the drive gear 13, by being pushed by the tray lock lever 16. On the other hand, in synchronism with the backward movement of the tray lock lever 16, the tray joint pin 16i of the tray lock lever 16 is moved backward along the left stoppage portion 4j of the tray joint groove 4f.

Figure 13:
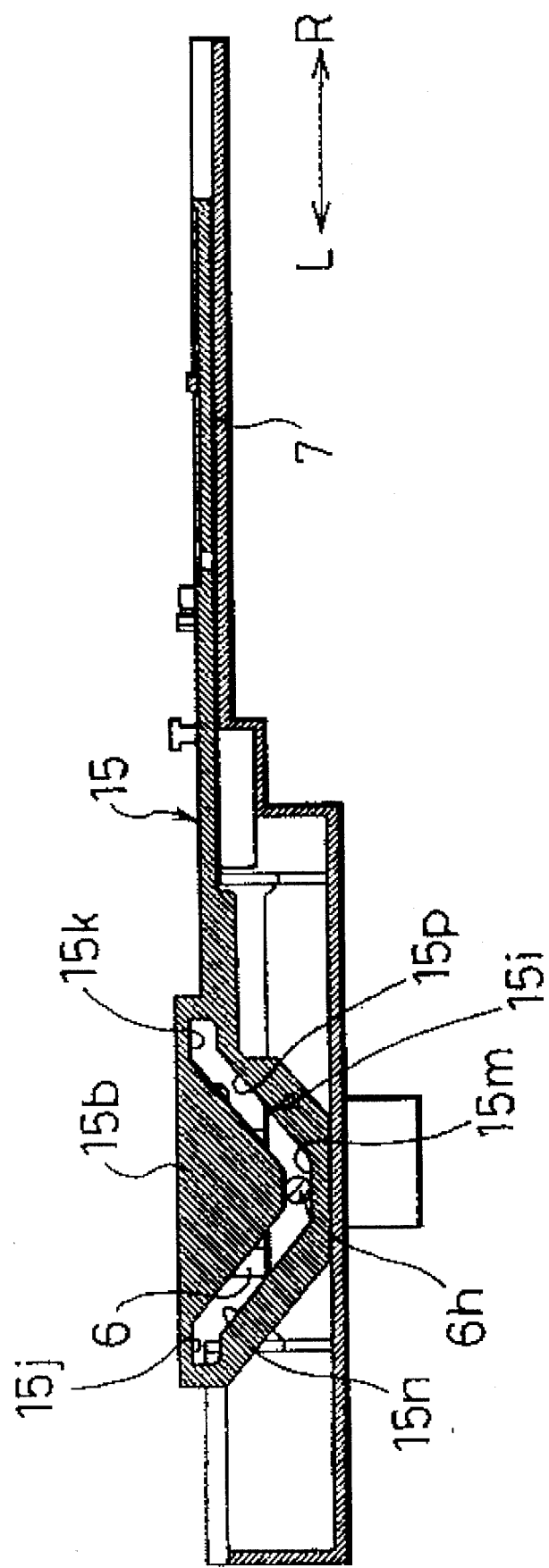
FIG. 13 is a cross-sectional view showing the relative position between the unit guide section and the unit joint pin of the reproducing unit when the unit actuating lever has been further moved to the left from the position shown in FIG. 12.

As shown in FIG. 13, during the movement of the unit actuating lever 15, the unit joint pin 6h is moved within the unit guiding slot 15i of the unit guide section 15b from the left horizontal portion 15j to the horizontal holding portion 15m via the left sloping portion 15n. As a result, the unit joint pin 6h is moved downward, and the front portion of the reproducing unit 6 is lowered, thereby securing the reproducing unit 6 in a retreated position where the turn table 6a and the optical pickup 6b are situated below the upper surface of the base plate 7. This allows the first and second trays 4 and 5 to reciprocate side to side on the base plate 7 without being interrupted by the reproducing unit 6.

Figure 14:
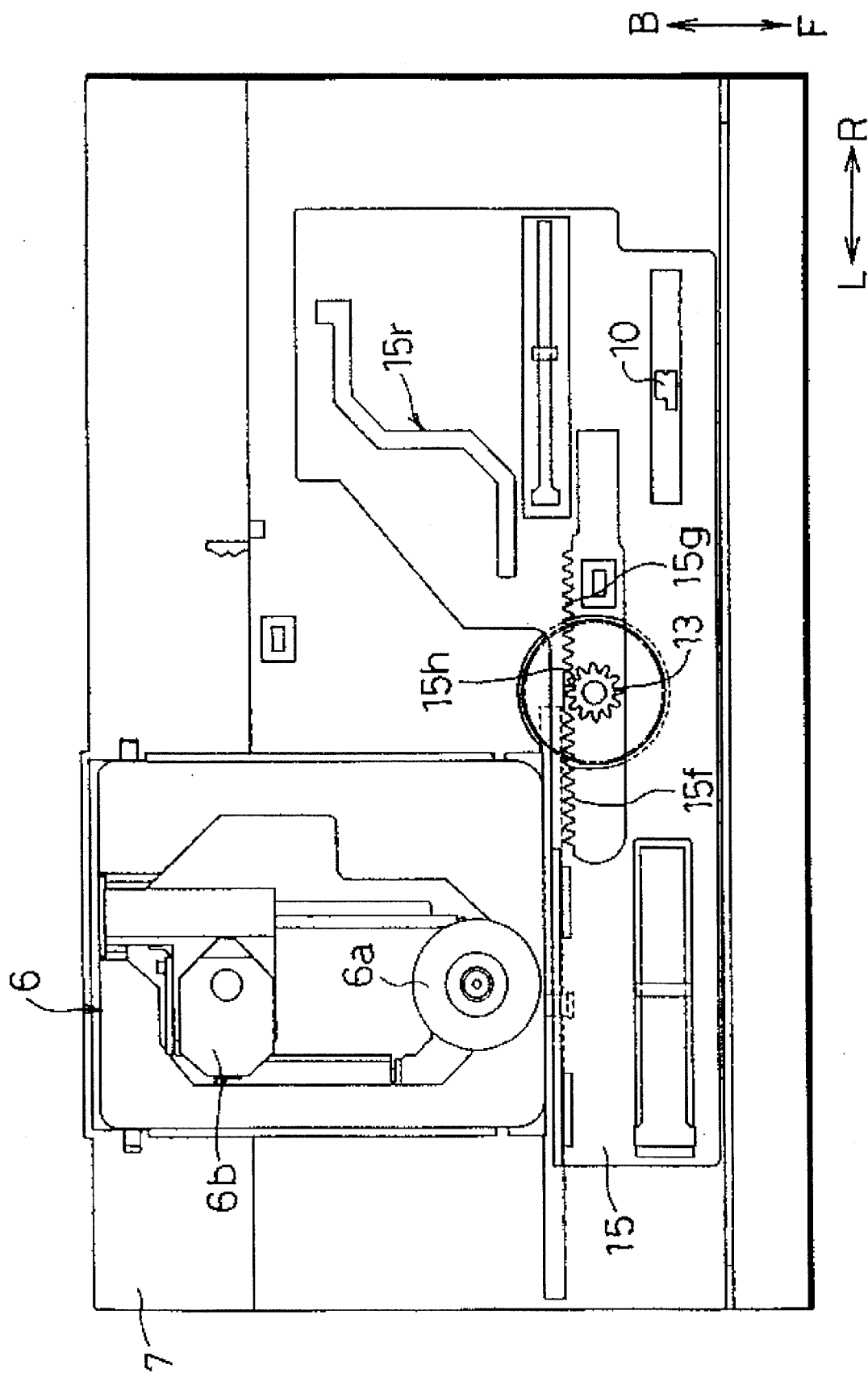
FIG. 14 is a plan view showing the relative position between the unit actuating lever and the base plate in the position shown in FIG. 13.

When the unit joint pin 6h is moved to the substantial center of the horizontal holding portion. 15m, the unit actuating lever 15 is situated in such a position that the untoothed portion 15h confronts the drive gear 13 as shown in FIG. 14.

Figure 15:
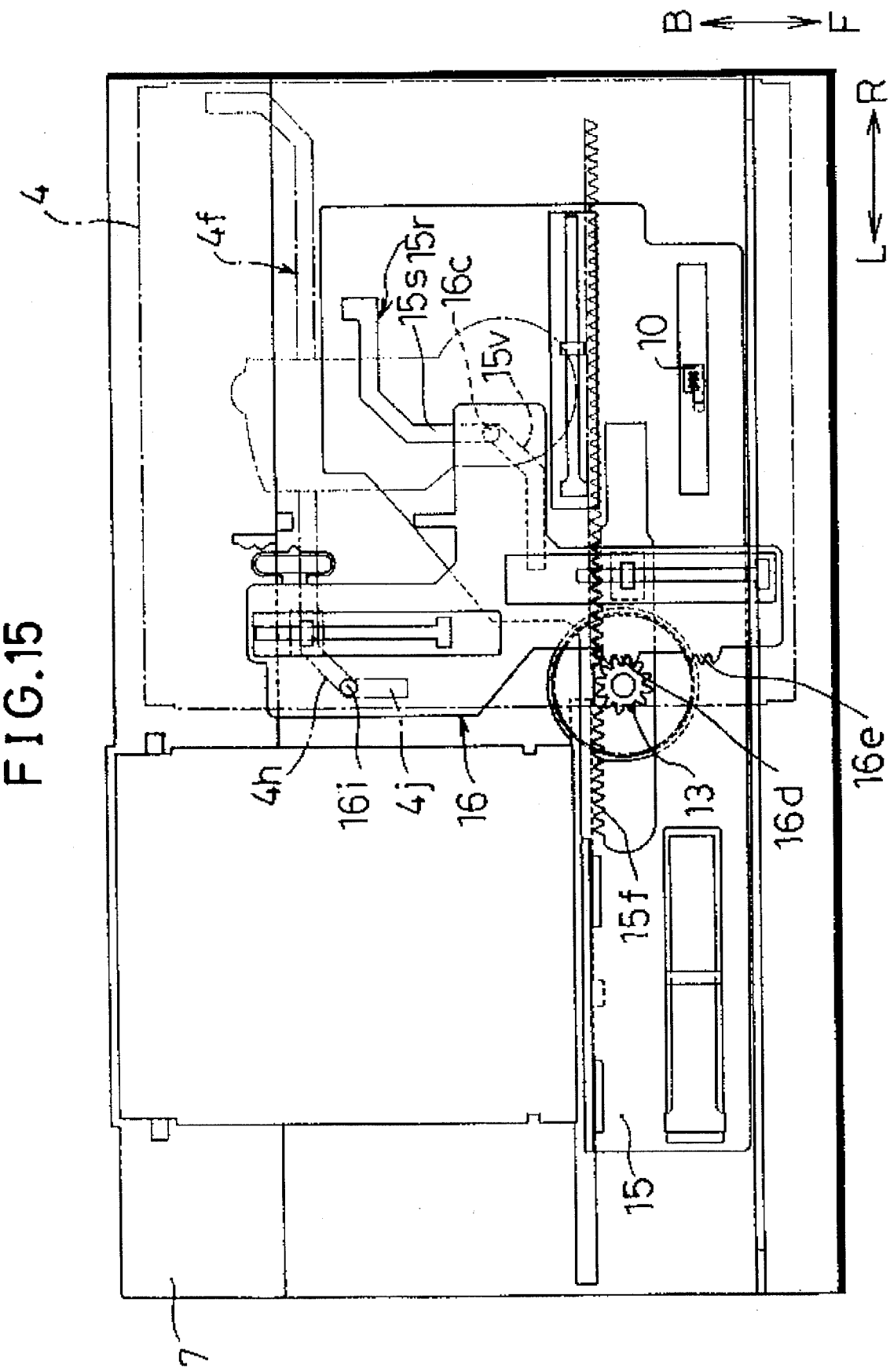
FIG. 15 is a plan view showing the state where the tray lock lever has been moved backward from the position shown in FIG. 14.

In this state, as shown in FIG. 15, in synchronism with the backward movement of the tray lock lever 16, the lever joint pin 16c is moved from the left diagonal 15v to the stoppage portion 15s. As a result, the push-out force is not exerted from the tray lock lever 16 to the unit actuating lever 15, thereby holding the unit actuating lever 15 in the stoppage position. As a result, the reproducing unit 6 is held in the retreated position.

Figure 16:
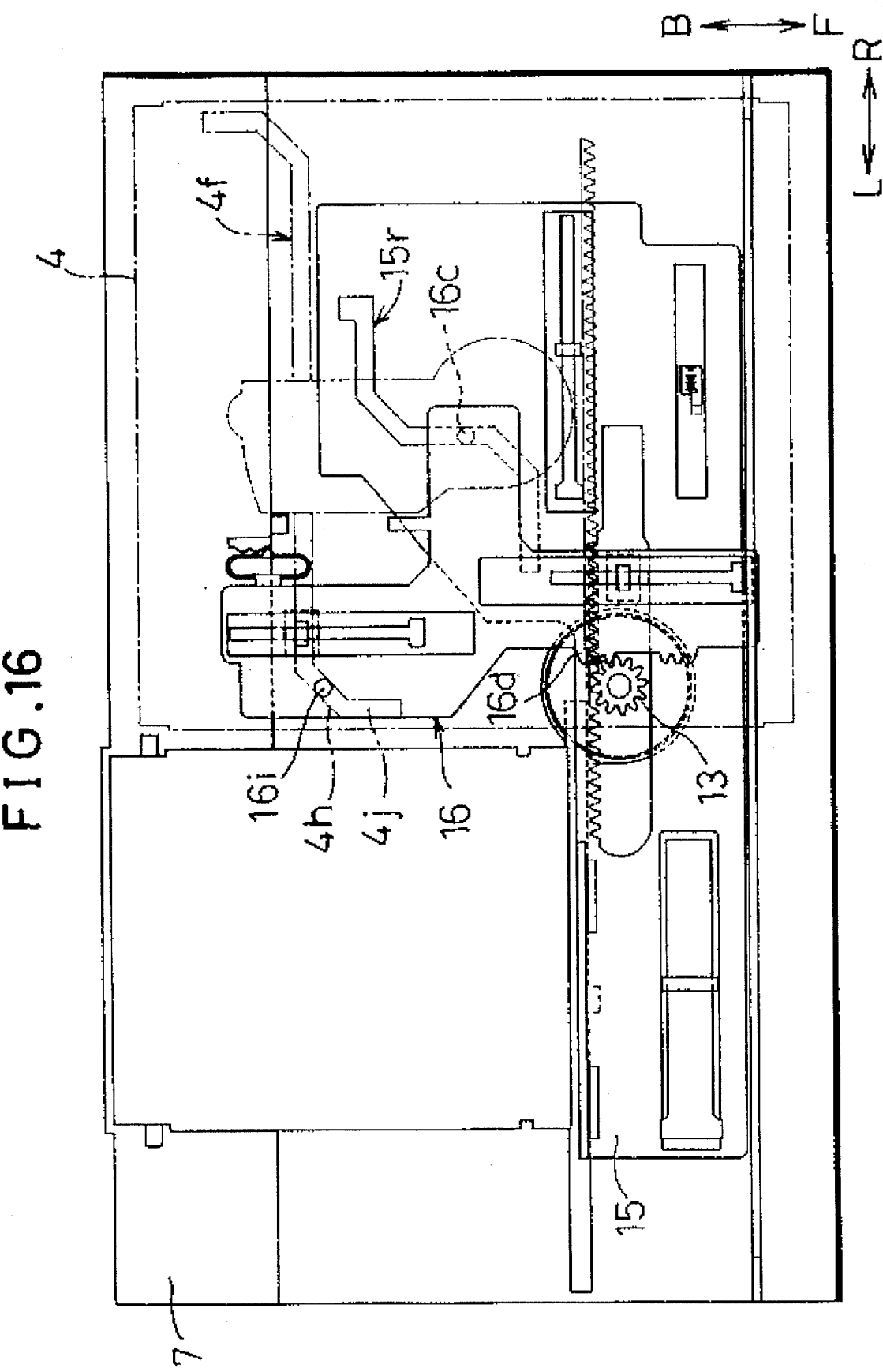
FIG. 16 is a plan view showing the state where the tray lock lever is further moved backward from the state shown in FIG. 15.

In the meantime, the tray joint pin 16i of the tray lock lever 16 is moved along the tray joint groove 4f from the left stoppage portion 4j to the left diagonal 4h. Further, in synchronism with the backward movement of the tray lock lever 16, the tray joint pin 16i is inserted in the left diagonal 4h as shown in FIG. 16. As a result, the first tray 4 having being locked in the stand-by position is pushed to the left, whereby the first tray 4 starts moving.

Figure 17:
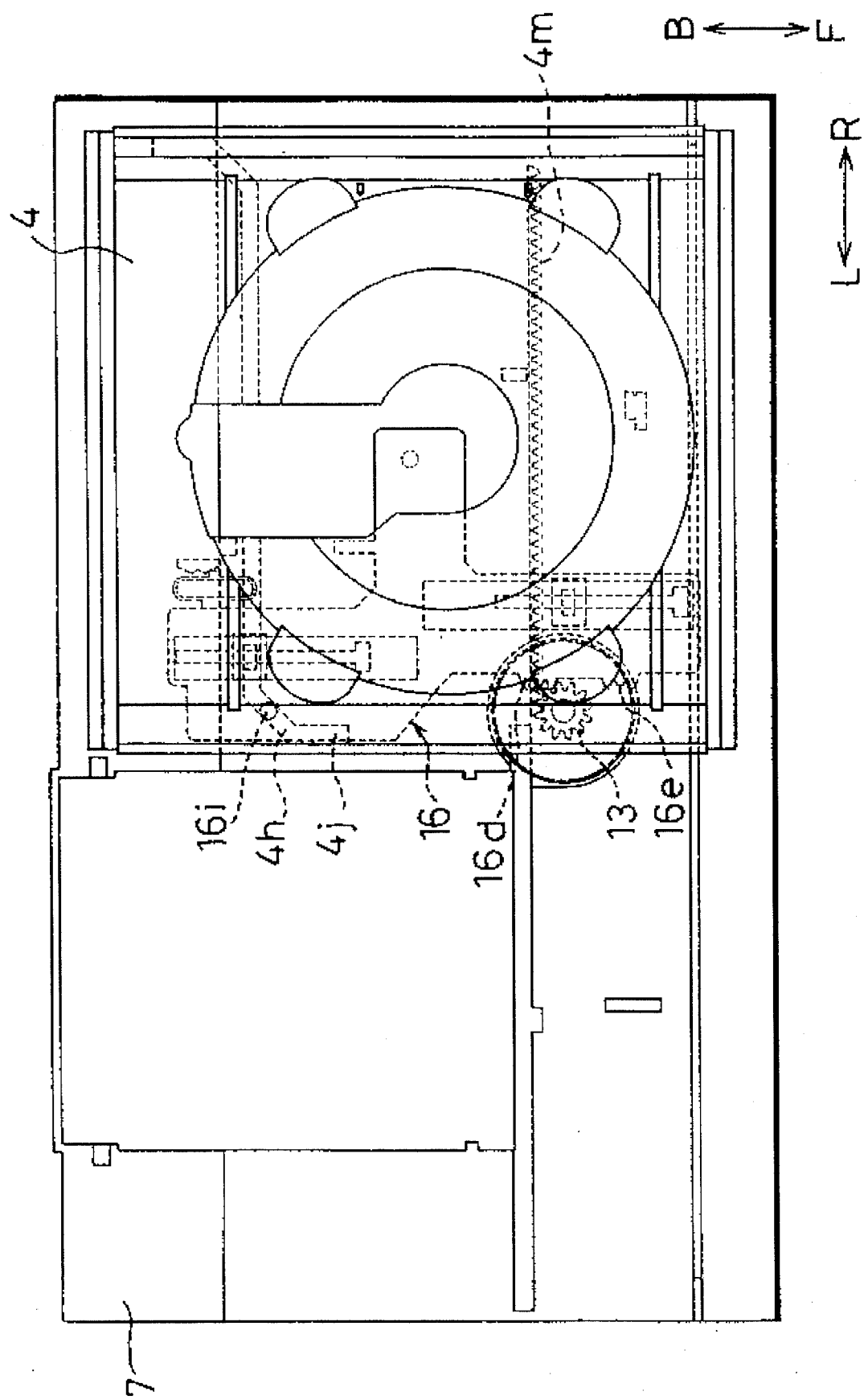
FIG. 17 is a plan view showing relative positions between the tray lock lever and the first tray in the state shown in FIG. 16.

When the first tray 4 starts moving to the left, as shown in FIG. 17, the rack 4m on the bottom surface of the first tray 4 becomes in mesh with the drive gear 13. This, in turn, disengages the rear rack 16d of the tray lock lever 16 from the drive gear 13. As a result, the transmittance of the driving force from the drive gear 13 is switched from the tray lock lever 16 to the first tray 4.

Figure 18:
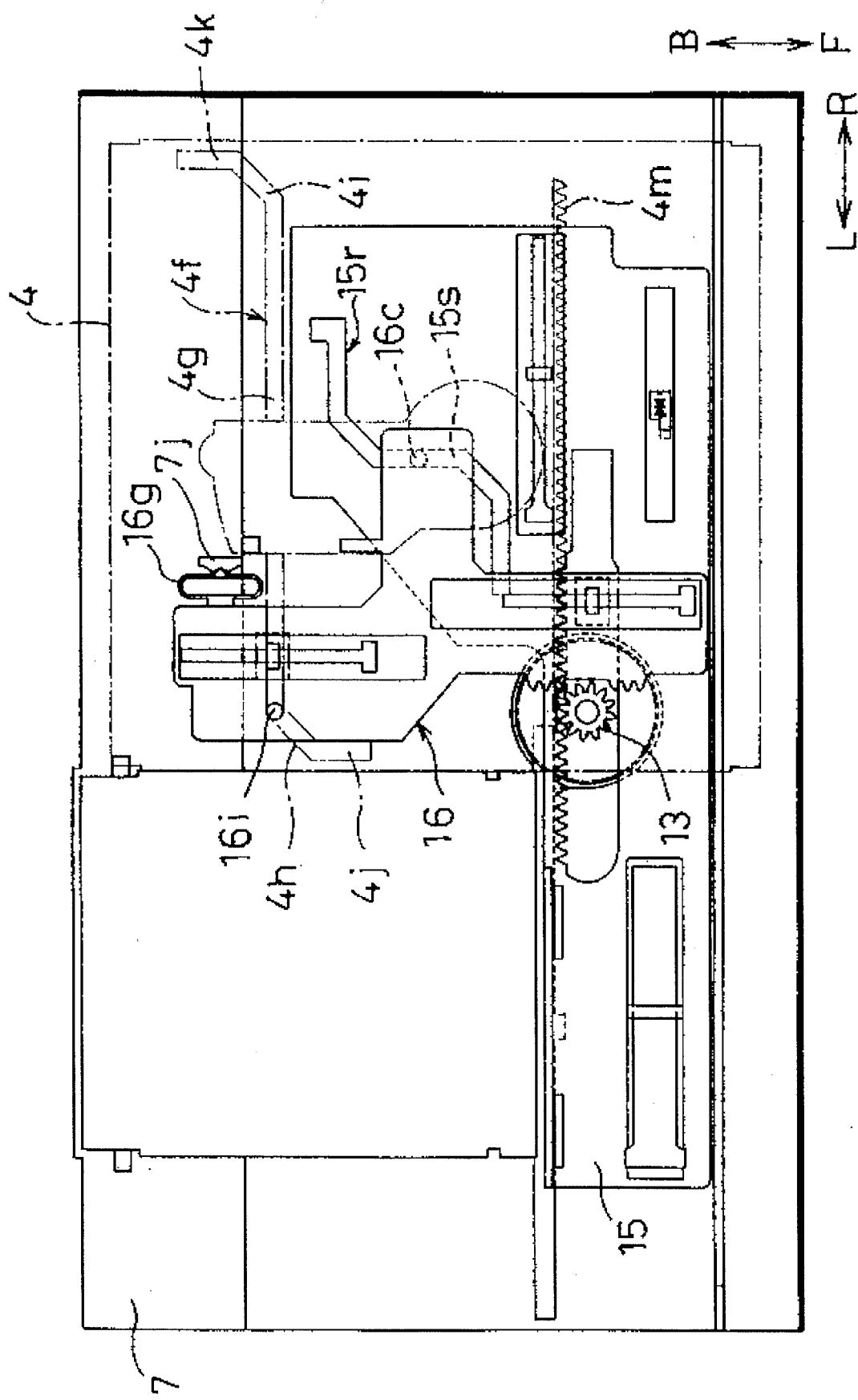
FIG. 18 is a plan view showing the state where the tray lock lever has been further moved backward from the state shown in FIG. 16 and is temporarily held in the stoppage position.

When the first tray 4 is moved to the left by receiving the driving force directly from the drive gear 13 in the described manner, as shown in FIG. 18, the tray joint pin 16i of the tray lock lever 16 is moved from the left diagonal 4h of the tray joint groove 4f to the stoppage cancelling portion 4g. In this state, the push-out force is no longer exerted from the first tray 4 to be driven by the drive gear 13 onto the tray lock lever 16, thereby temporarily holding the tray lock lever 16 in the stoppage position.

In this position, the joint projection 16g of the tray lock lever 16 mates with the recessed portion of the intermediate position holding-use projection 7j formed on the base plate 7, thereby holding the tray lock lever 16 at an intermediate position. On the other hand, the lever joint pin 16c is situated at the substantial center of the stoppage portion 15s of the lever joint cut-out 15r. Therefore, the unit actuating lever 15 also remains in the stoppage position.

Figure 19:
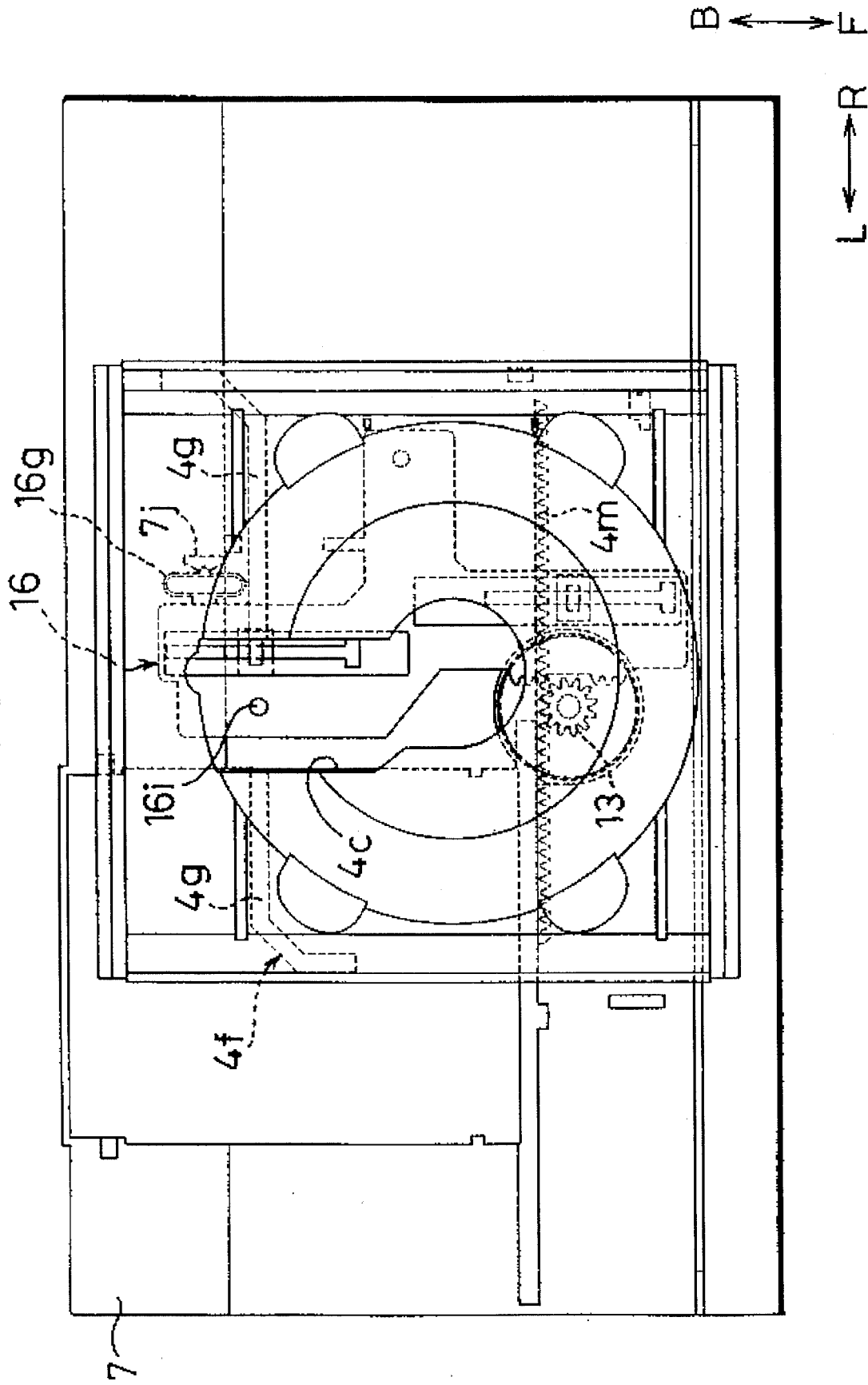
FIG. 19 is a plan view showing the state where the first tray has been moved to the left from the state shown in FIG. 18.

As described, in the state where the unit actuating lever 15 and the tray lock lever 16 are in their stoppage positions, the first tray 4 is moved to the left from the stand-by area 3b to the reproducing area 3a by the drive gear 13. During the described movement, the tray joint pin 16i of the tray lock lever 16 is relatively moved from the left to the right along the stoppage cancelling portion 4g of the tray joint groove 4f. In the meantime, as shown in FIG. 19, the tray joint pin 16 is moved through a releasing opening 4c formed at the substantial center of the first tray 4. Although the stoppage cancelling portion 4g of the tray joint groove 4f does not exist in this area, by the engagement between the joint projection 16g of the tray lock lever 16 and the intermediate position holding-use projection 7j, the displacement of the tray lock lever 16 can be prevented. Therefore, the tray joint pin 16i can move while it is inserted into the right stoppage cancelling portion 4g through the releasing opening 4c.

Figure 20:
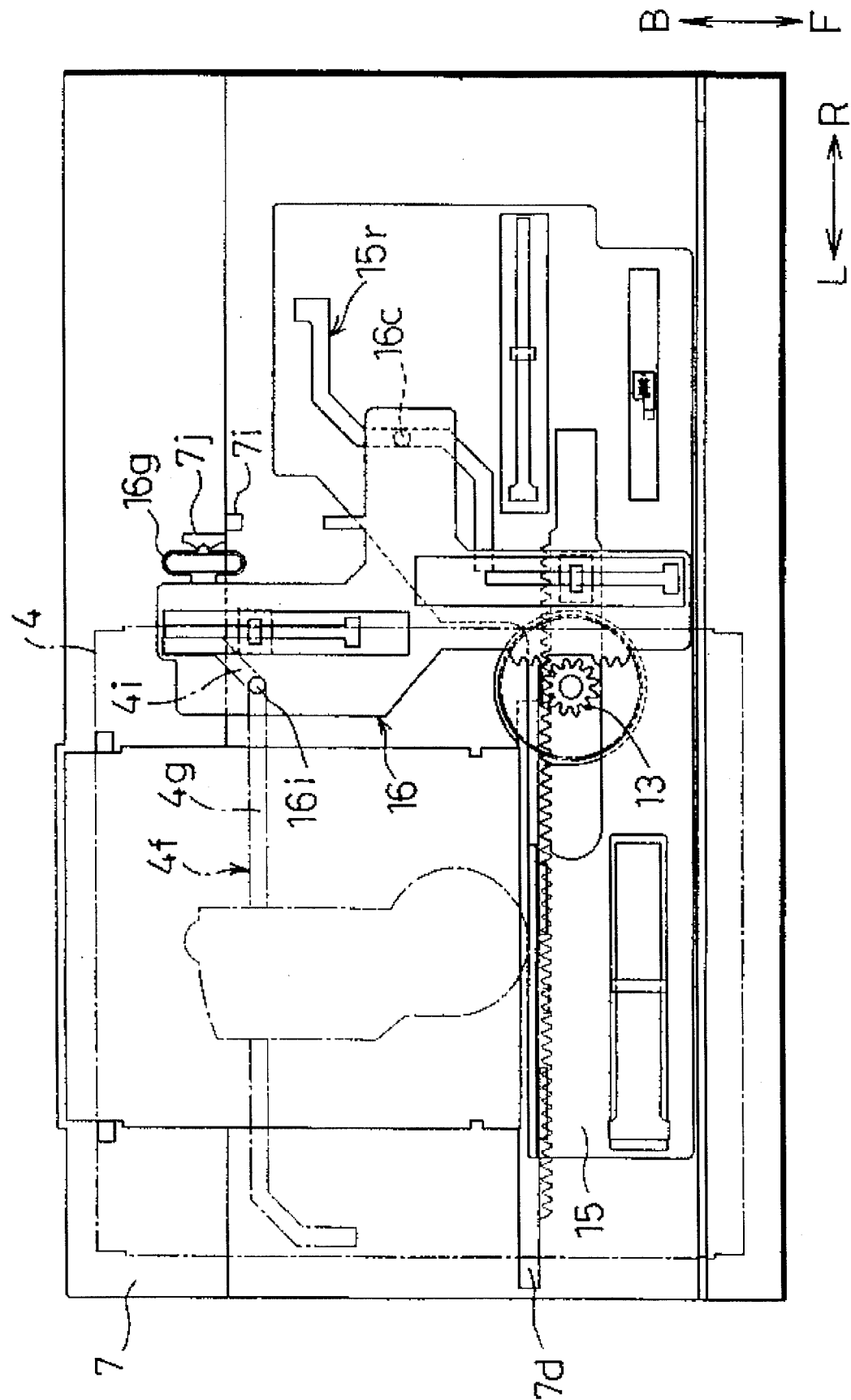
FIG. 20 is a plan view showing the relative position between the unit actuating lever and the tray lock lever when the first tray has been moved to the left from the position shown in FIG. 19.
Figure 21:
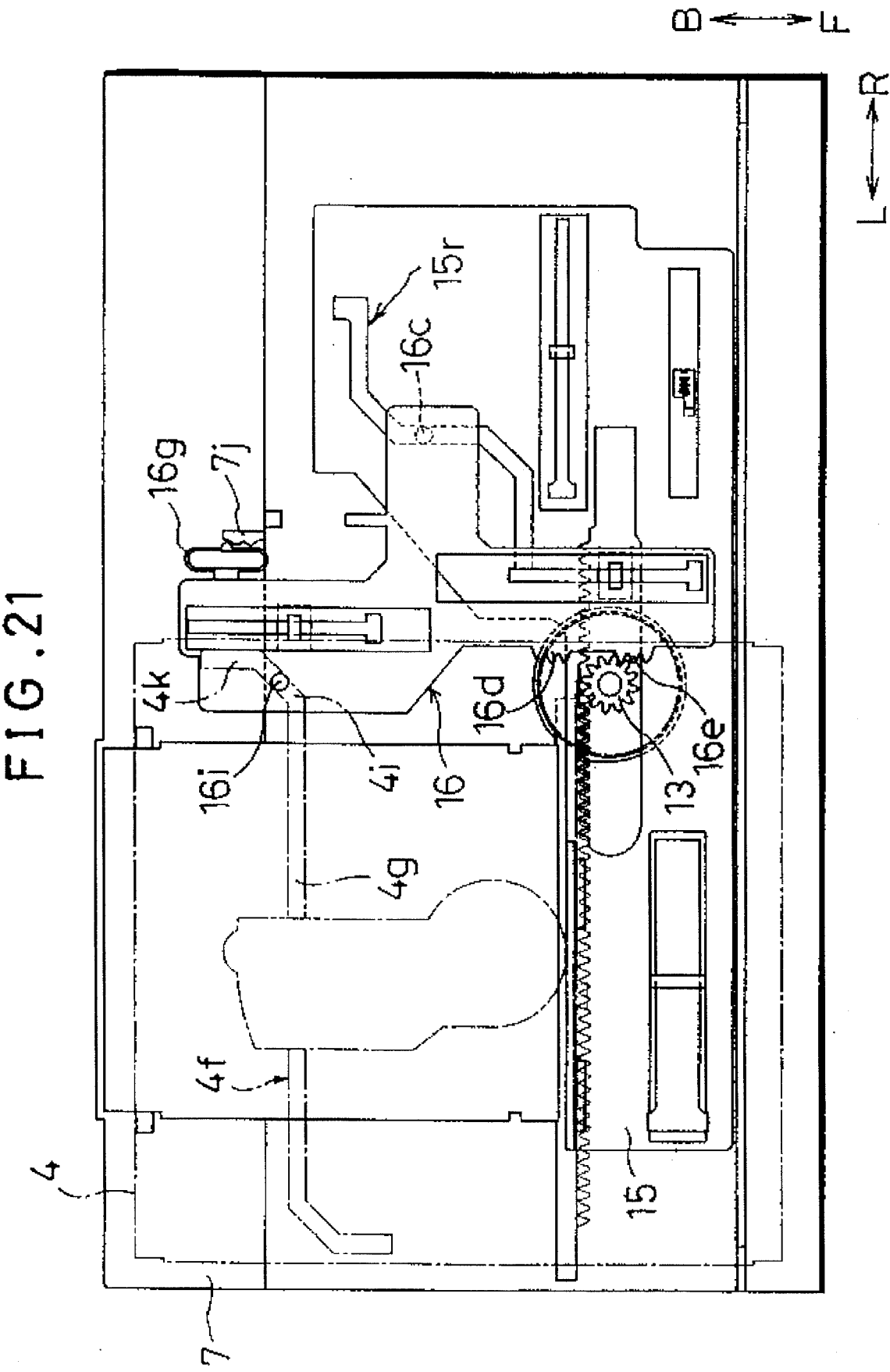
FIG. 21 is a plan view showing the state where the tray lock lever has been moved backward from the state shown in FIG. 20.

As shown in FIG. 20, when the tray joint pin 16i is moved from the stoppage cancelling portion 4g to the right diagonal 4i, in synchronism with the subsequent movement of the first tray 4 toward the left, the push-out force is exerted again onto the tray joint pin 16i backward from the right diagonal 4i, whereby the tray lock lever 16 is moved backward to the restarted position as shown in FIG. 21.

Figure 22:
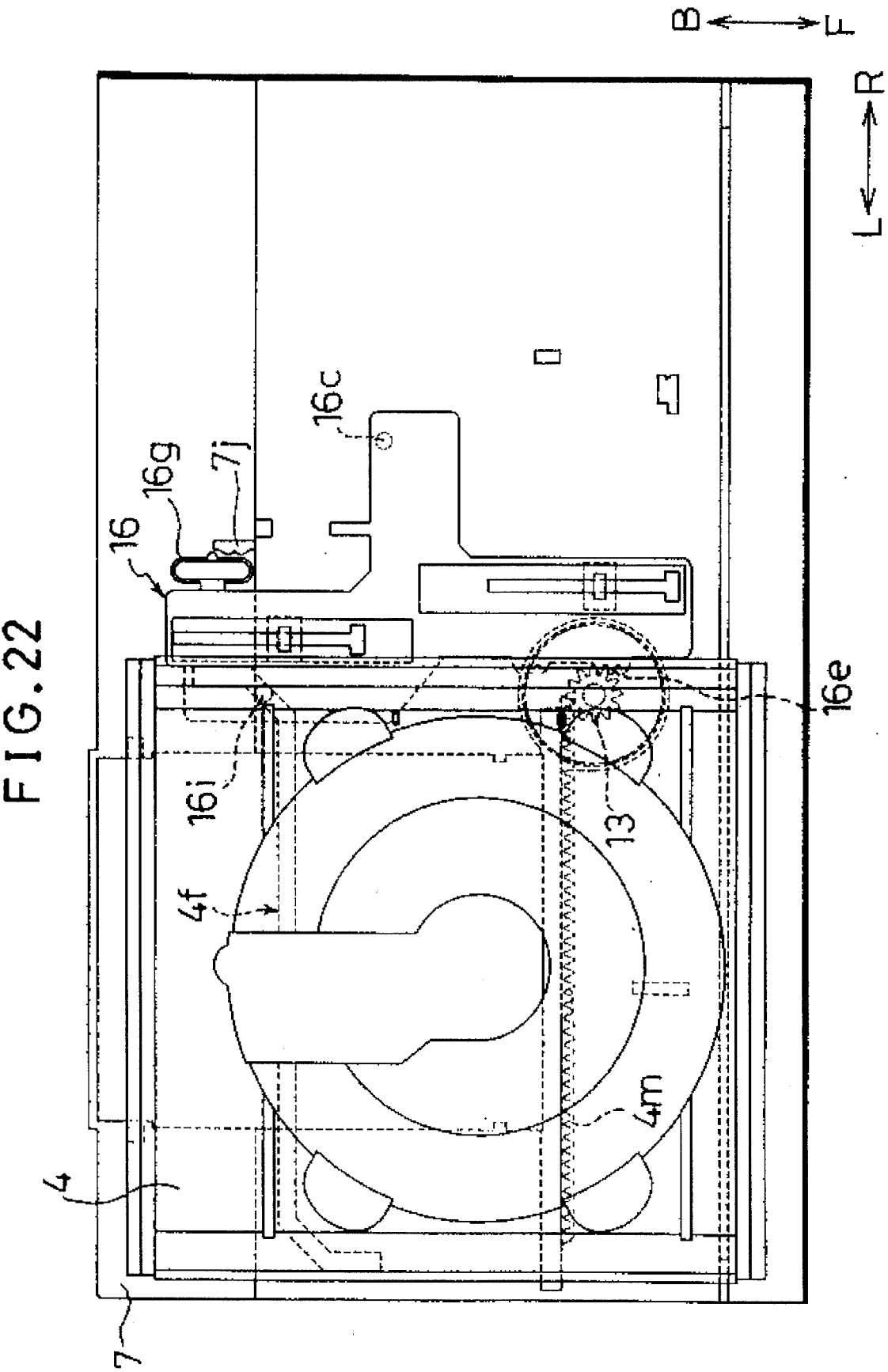
FIG. 22 is a plan view showing the relative position between the tray lock lever and the first tray in the state shown in FIG. 21.

Thereafter, the aforementioned movements occur in the reversed order. Namely, while the tray joint pin 16i of the tray lock lever 16 is being moved along the right diagonal 4i of the tray joint groove 4f, the front rack 16e of the tray lock lever 16 becomes in mesh with the drive gear 13. Directly after this, the rack 4m of the first tray 4 is disengaged from the drive gear 13 as shown in FIG. 22, and the transmittance of the driving force of the drive gear 13 is switched from the first tray 4 to the tray lock lever 16.

Figure 23:
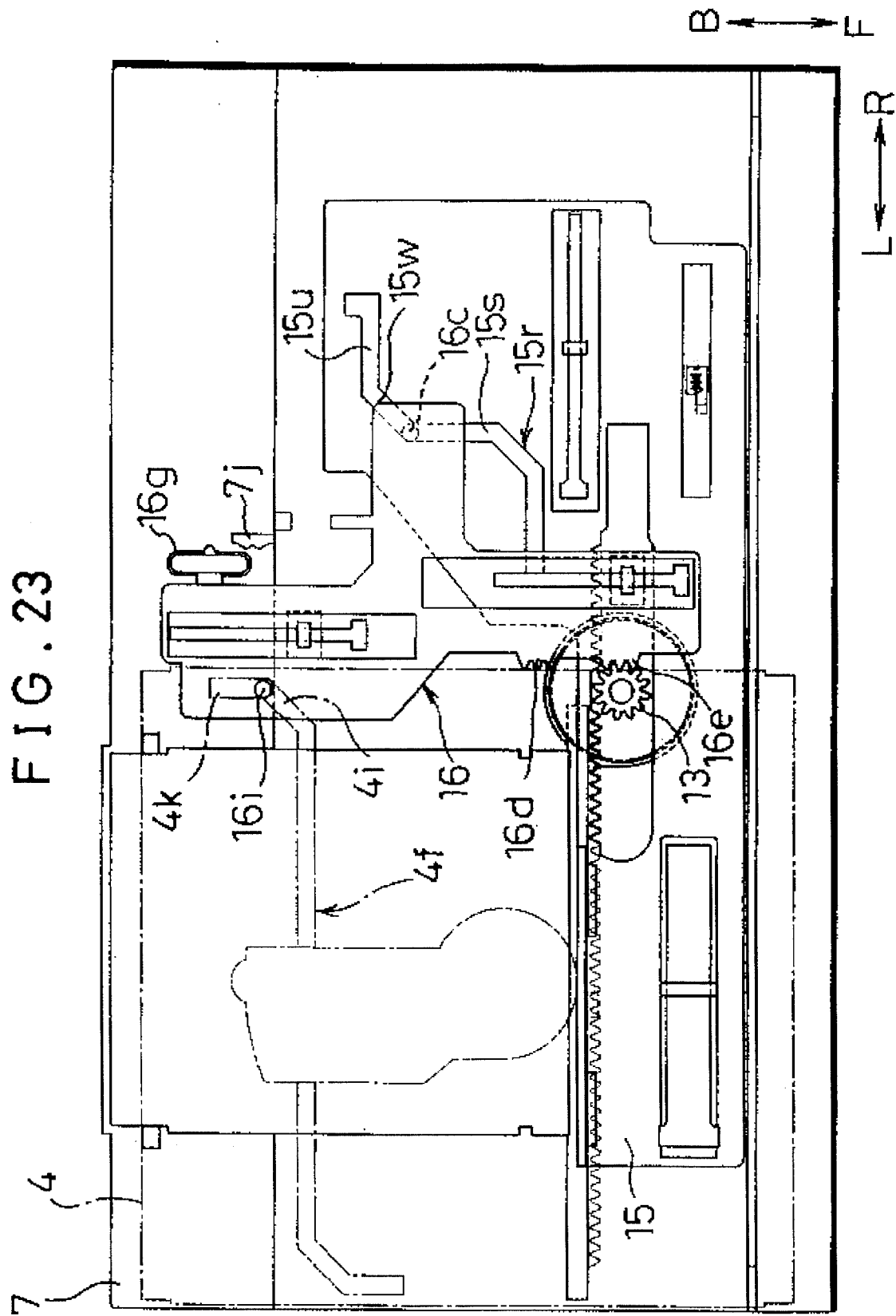
FIG. 23 is a plan view showing the state where the tray lock lever has been further moved backward from the state shown in FIG. 21.

Then, as shown in FIG. 23, when the tray joint pin 16i reaches the right stoppage portion 4k of the tray joint groove 4f, the first tray 4 is held at the left limit position of the base plate 7, i.e., the reproducing position.

Figure 24:
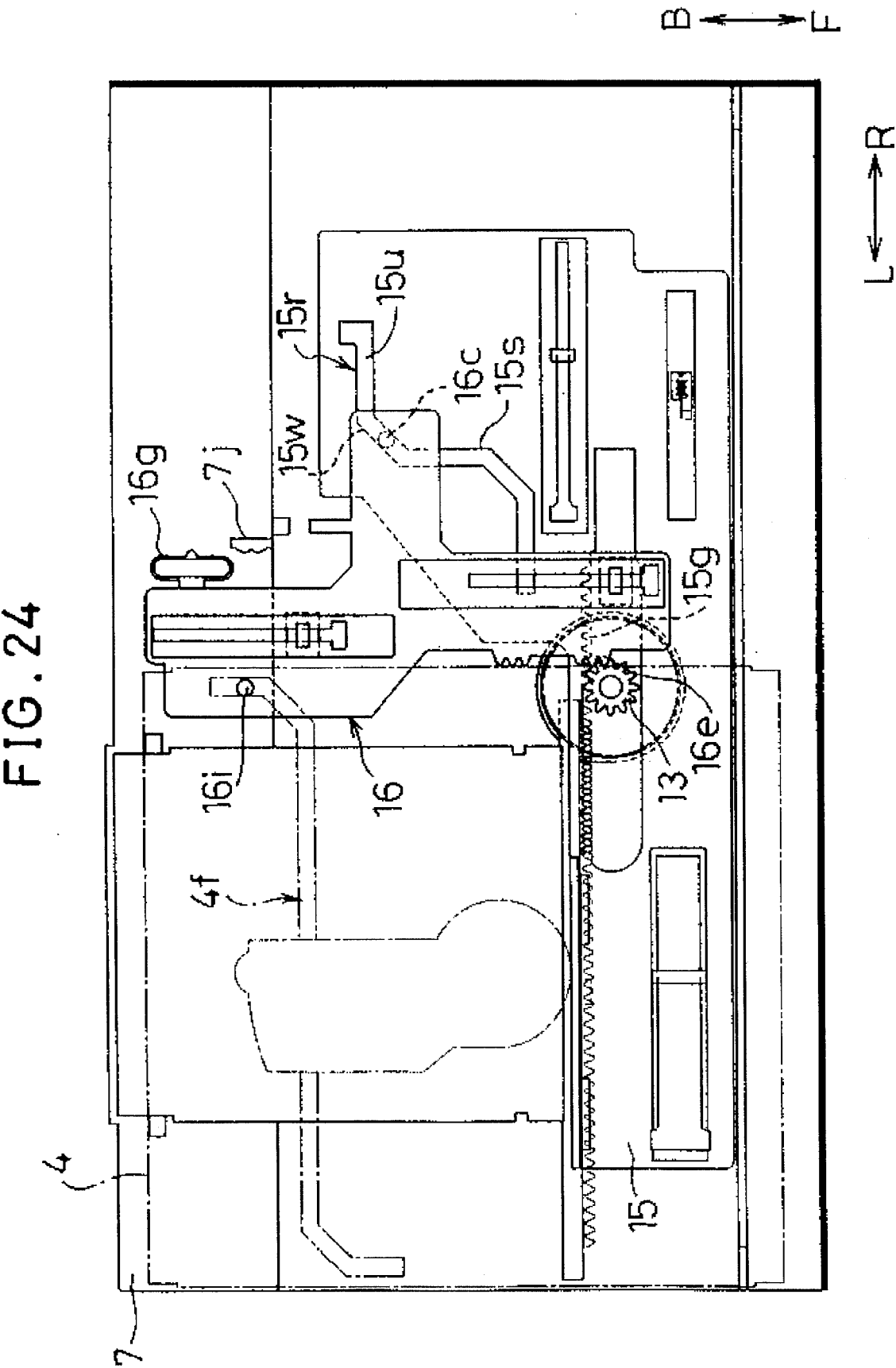
FIG. 24 is a plan view showing the state where the tray lock lever has been further moved backward from the state shown in FIG. 23.

In the meantime, the lever joint pin 16c is moved from the stoppage portion 15s to the right diagonal 15w of the lever joint cut-out 15r. Then, as shown in FIG. 24, while the lever joint pin 16c is being moved within the right diagonal 15w, the unit actuating lever 15 is being pushed again toward the left. As a result, the right rack 15g of the unit actuating lever 15 becomes in mesh with the drive gear 13, causing the front rack 16e of the tray lock lever 16 to be disengaged from the drive gear 13. As a result, the transmittance of the driving force of the drive gear 13 is switched from the tray lock lever 16 to the unit actuating lever 15.

Figure 25:
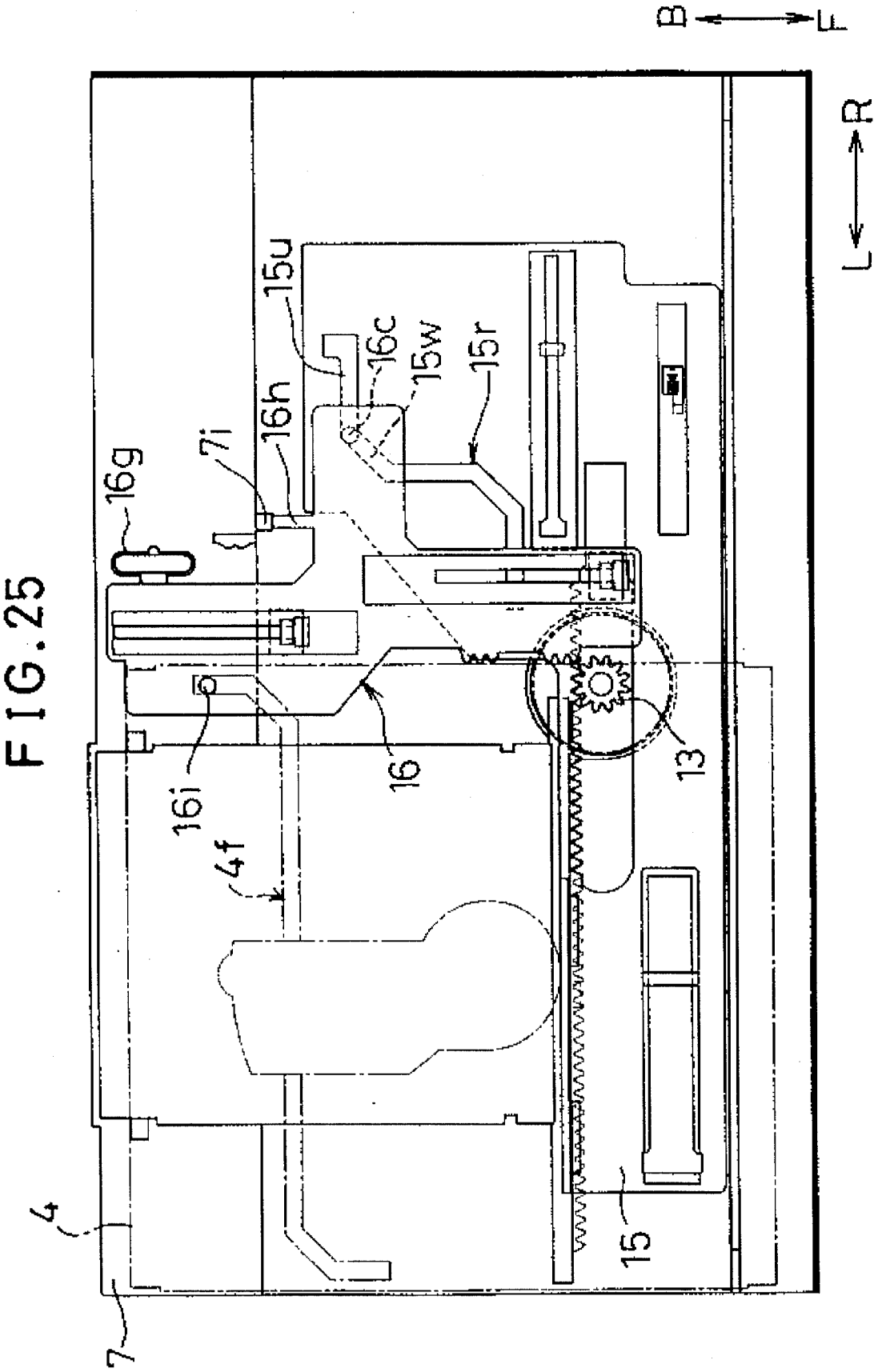
FIG. 25 is a plan view showing the state where the tray lock lever has been further moved backward from the state shown in FIG. 24 and is held in the stoppage position.
Figure 26:
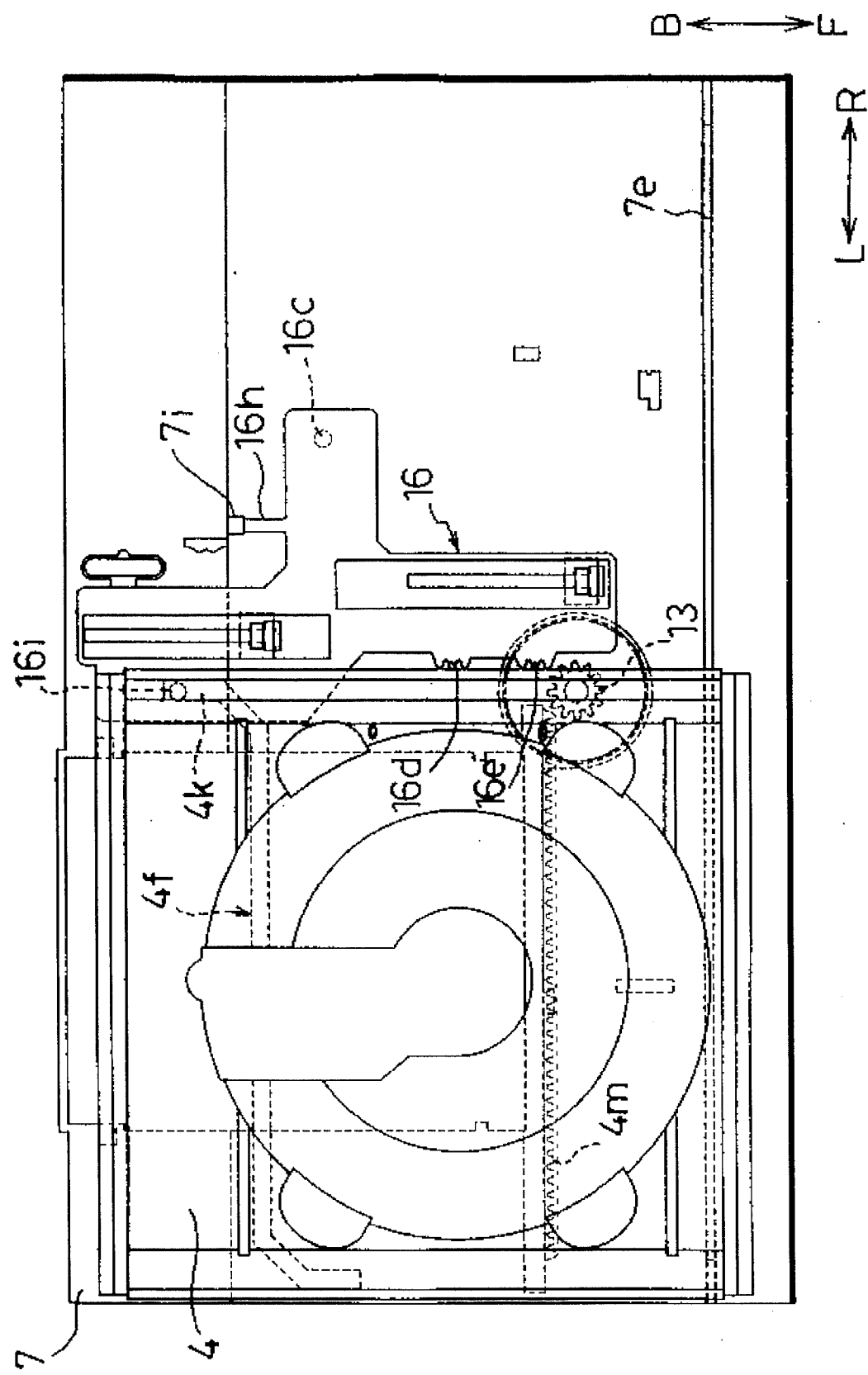
FIG. 26 is a plan view showing relative positions between the tray lock lever and the first tray in the state shown in FIG. 25.

Subsequently, as shown in FIG. 25, when the lever joint pin 16c reaches the right stoppage cancelling portion 15u of the lever joint cut-out 15r, the backward movement of the tray lock lever 16 is stopped. In this state, the tray lock lever 16 is held at the rear end position where the leading end of the projected piece 16h is in contact with the slipping-off preventing projection 7i which is projected vertically from the base plate 7. In this position, as shown in FIG. 26, the tray joint pint 16i of the tray lock lever 16 is inserted to the rear limit position of the right stoppage portion 4k of the tray joint groove 4f, thereby holding the first tray 4 at the reproducing position.

Figure 27:
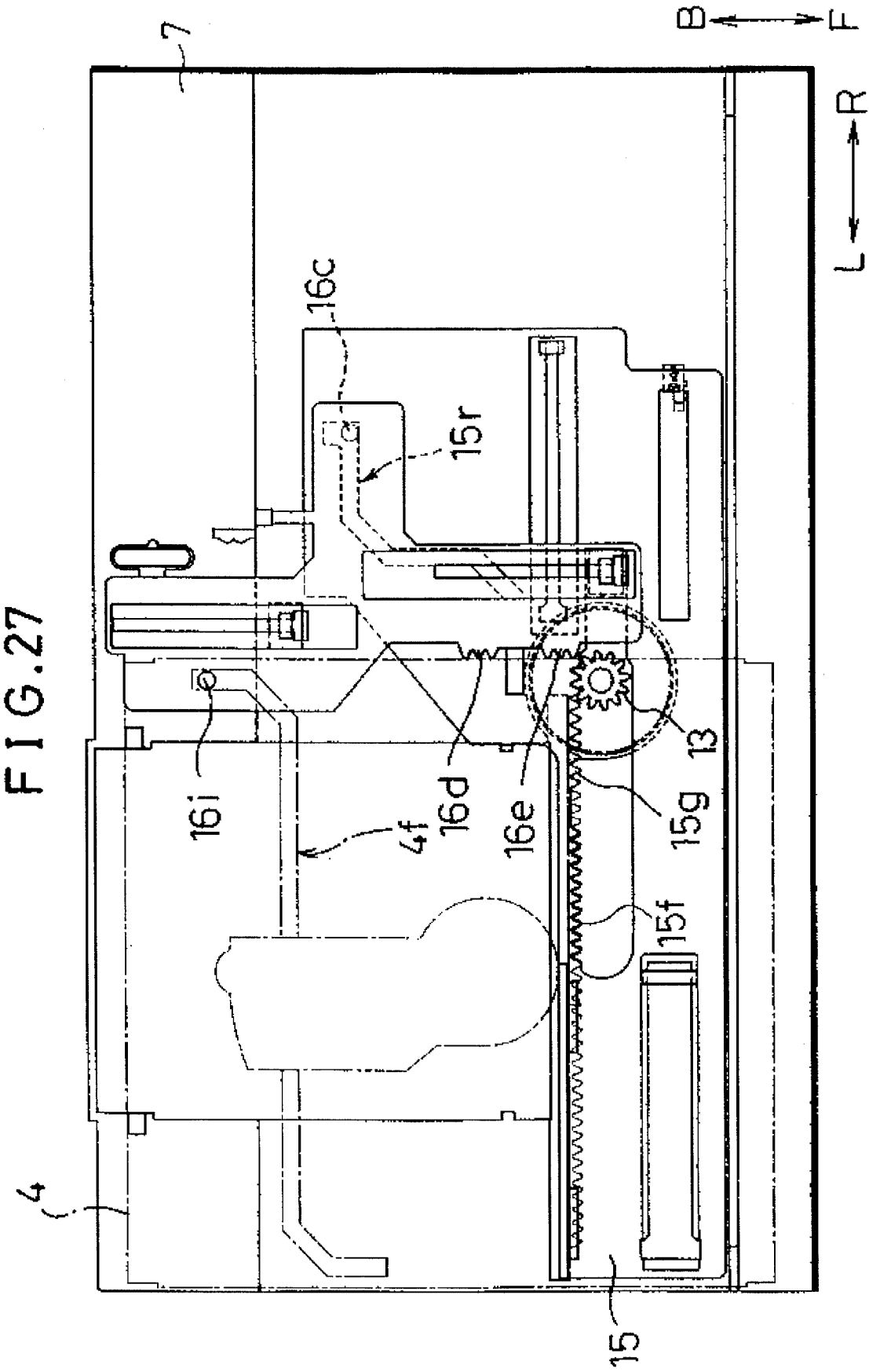
FIG. 27 is a plan view showing the relative position among the tray lock lever, the unit actuating lever and the base plate in the state shown in FIG. 26.
Figure 28:
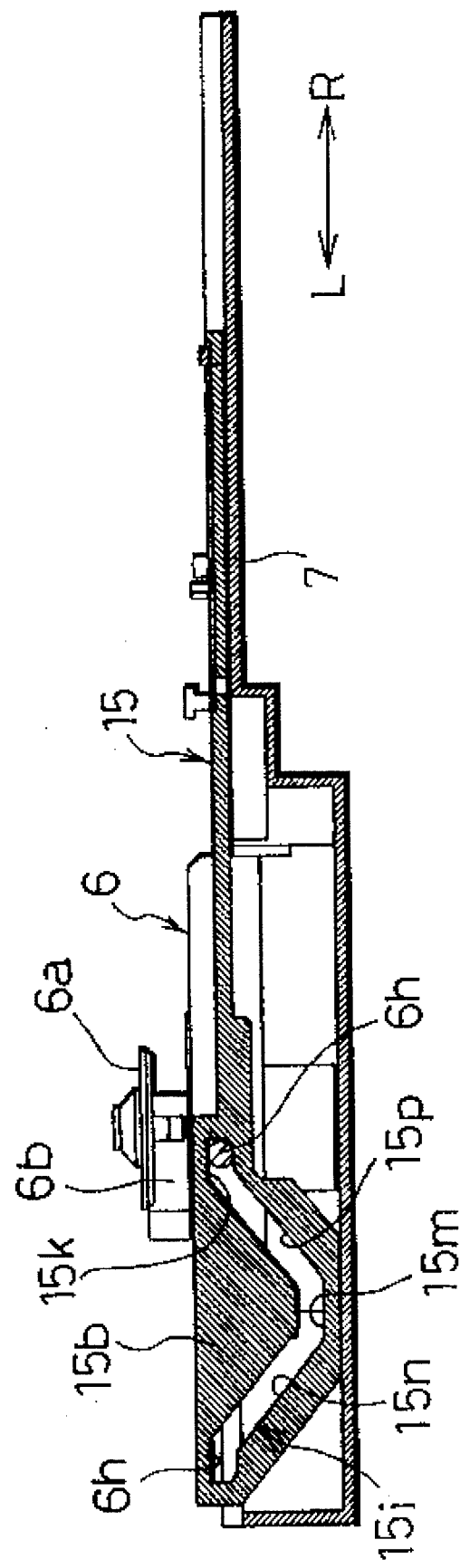
FIG. 28 is a cross-sectional view showing the relative position between the unit guide section of the unit actuating lever and the unit joint pin of the reproducing unit in the state shown in FIG. 27.

In the state where the first tray 4 is held in the reproducing position, the unit actuating lever 15 is moved to the left by the drive gear 13. Synchronous with this movement, the unit actuating lever 15 is moved to the left limit position of the base plate 7 as shown in FIG. 27. In the meantime, as shown in FIG. 28, the unit joint pin 6h is moved within the unit guiding slot 15i of the unit guiding section 15b from the horizontal holding portion 15m to the right horizontal portion 15k through the right sloping portion 15p. As a result, the front end portion of the reproducing unit 6 is raised to the position where the turn table 6a and the optical pickup 6b are projected above the upper surface of the unit holder 6e through the opening 4c. Namely, the unit reproducing unit 6 is raised back to the reproducing position.

Figure 29:
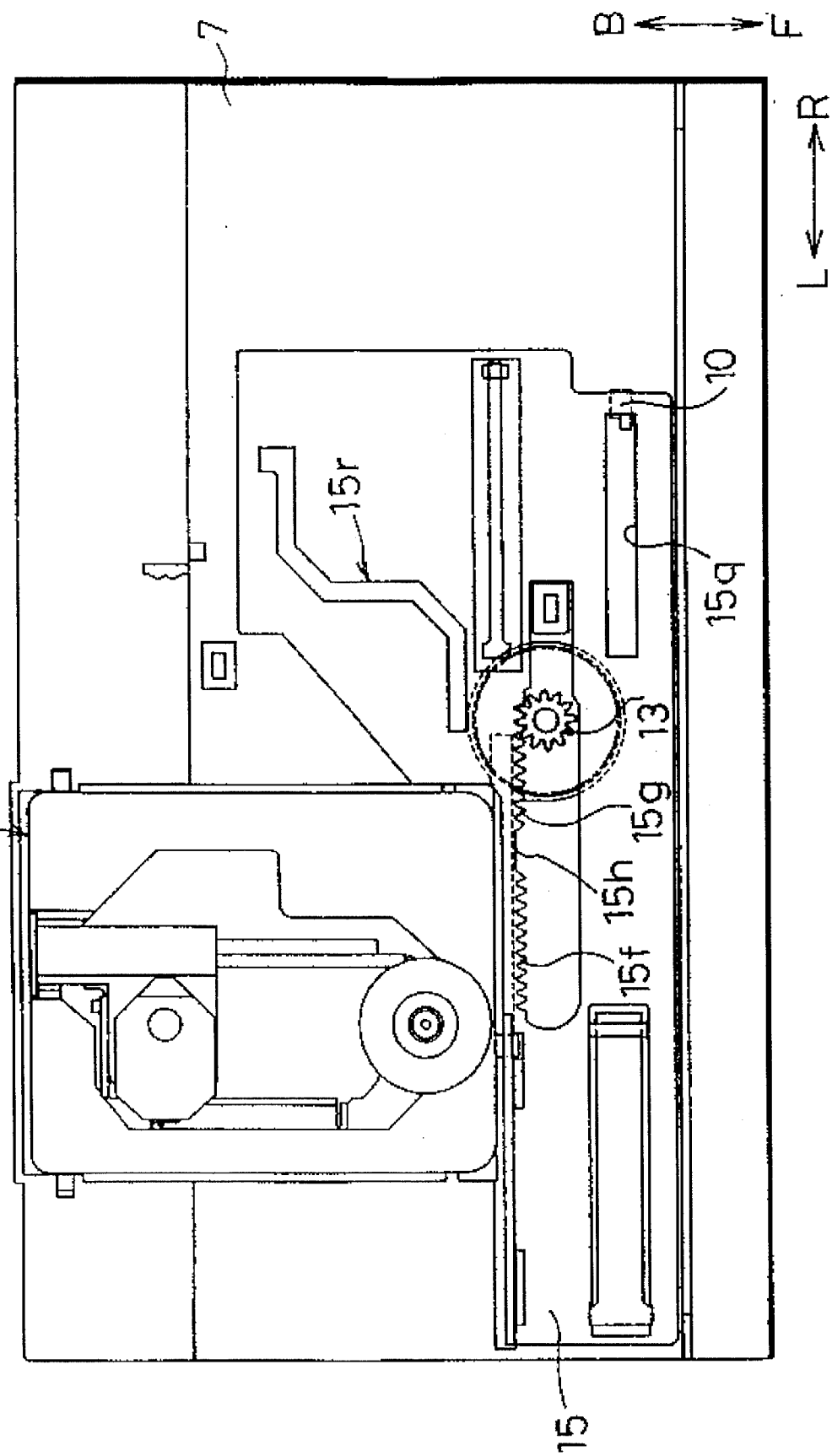
FIG. 29 is a plan view showing the relative position among the unit actuating lever, the base plate and the reproducing unit in the state shown in FIG. 28.

When the reproducing unit 6 is raised back to the reproducing position in the described manner, the unit actuating lever 15 reaches the left limit position of the base plate 7. In this state, as the switch 10 shown in FIG. 29 is activated by the right end of the position detecting slot 15q, and thus, the switch 10 having being in the OFF state is closed, and a signal indicative of the left limit position is outputted. Consequently, the rotation of the drive gear 13 is stopped, thereby completing the tray interchanging operation.

In this state, as shown in FIG. 29, the drive gear 13 is in mesh with the right end of the right rack 15g of the unit actuating lever 15. Therefore, when the drive gear 13 is rotated from this position in the clockwise direction, the trays 4 and 5 are interchanged from the second fixed position to the first fixed position as will be described later.

[2] Interlocking Mechanism between the First Tray 4 and the Second Tray 5

Next, the movement of the first tray 4 between the reproducing position and the stand-by position in accordance with the rotation of the drive gear 13 and the movement of the second tray 5 which is synchronism with the movement of the first tray 4 will be explained below through the case of interchanging the trays from the first fixed position to the second fixed position.

Figure 30:
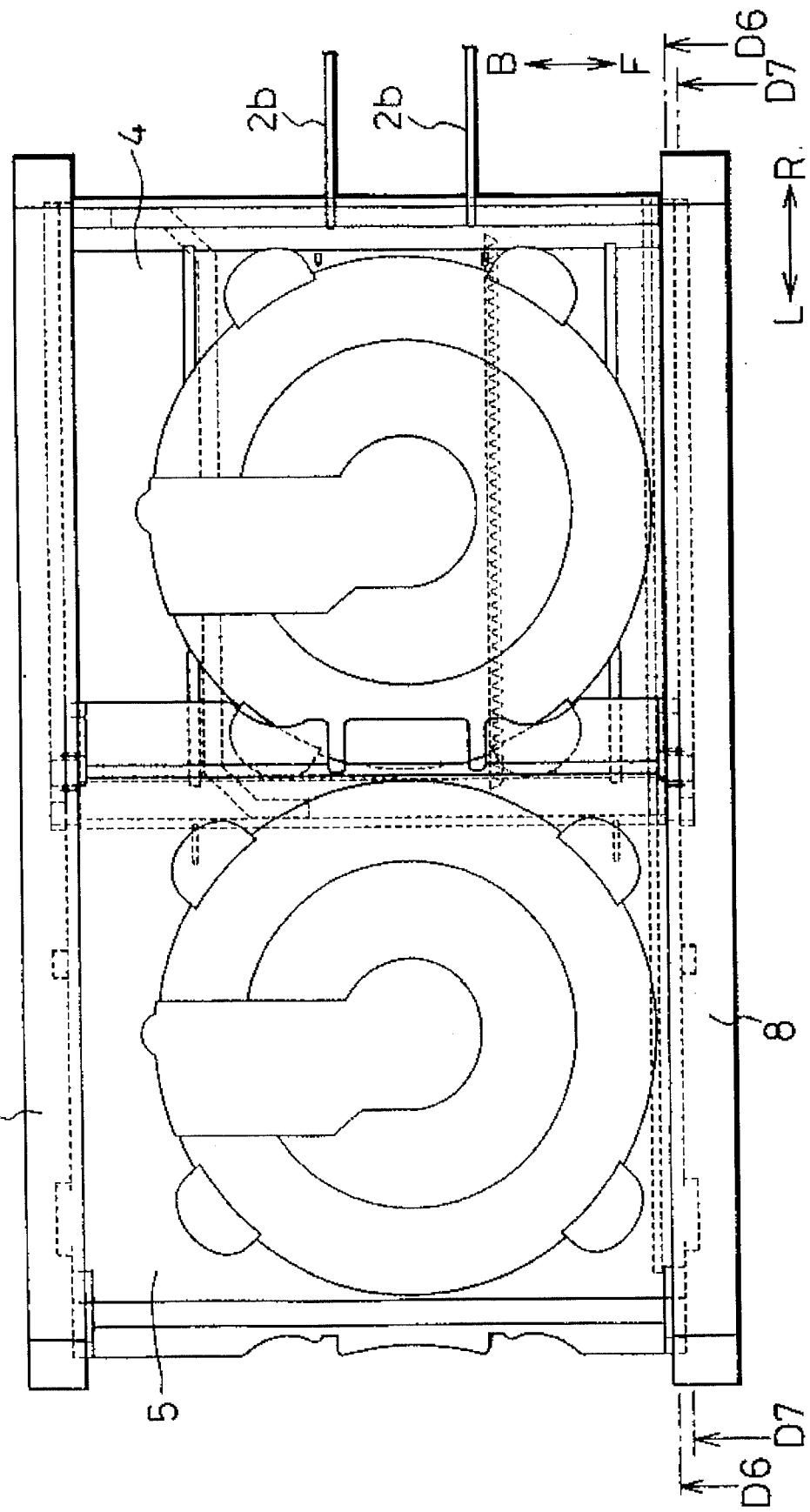
FIG. 30 is a plan view showing the movements of the first tray and the second tray of the disk reproducing apparatus when interchanging them from the first fixed position to the second fixed position.

FIG. 30 shows the first tray 4 which is slightly moved to the left (in the direction of L) from the stand-by position in the middle of the described movement. In this state, the second tray 5 starts moving to the right at the same time. This is because as shown in FIG. 31(a), with the leftward movement of the first tray 4, the pinion 9 in mesh with the rack 4r of the first tray 4 rotates in the clockwise direction in the figure, and rotations of the pinion 9 are transmitted to the rack 5j of the second tray 5 in mesh therewith. When the second tray 5 starts moving, the pinion 9 becomes in mesh with the sloping rack 5m, whereby the force is exerted toward the right from the pinion so as to move the second tray 5 in the right-upward direction.

As shown in FIG. 31(b), the first through third projections 5g, 5h and 5i of the second tray 5 are supported by being in mesh with the oblique guide grooves 8c, 8d and 8e respectively in the direction of the moving force in the tray guide 8. With the described arrangement, the first through third guide projections 5g, 5h and 5i are respectively guided along the oblique guide grooves 8c; 8d and 8e in an oblique direction. Therefore, the second tray 5 is moved to the right-upward direction while maintaining the horizontality of the upper surface thereof until it reaches the second horizontal guide groove 8i.

Both of the first tray 4 and the second tray 5 are supported by the front and rear tray guides 8, and the moving force of the first tray 4 is transmitted to the second tray 5 by the pinions 9 respectively mounted on the inner surfaces of the tray guides 8. Therefore, the second tray 5 can be moved in synchronism with the movement of the first tray 4 without the problem of the tilt or wobble, thereby ensuring the smoother movement of the trays 4 and 5.

Figure 32:
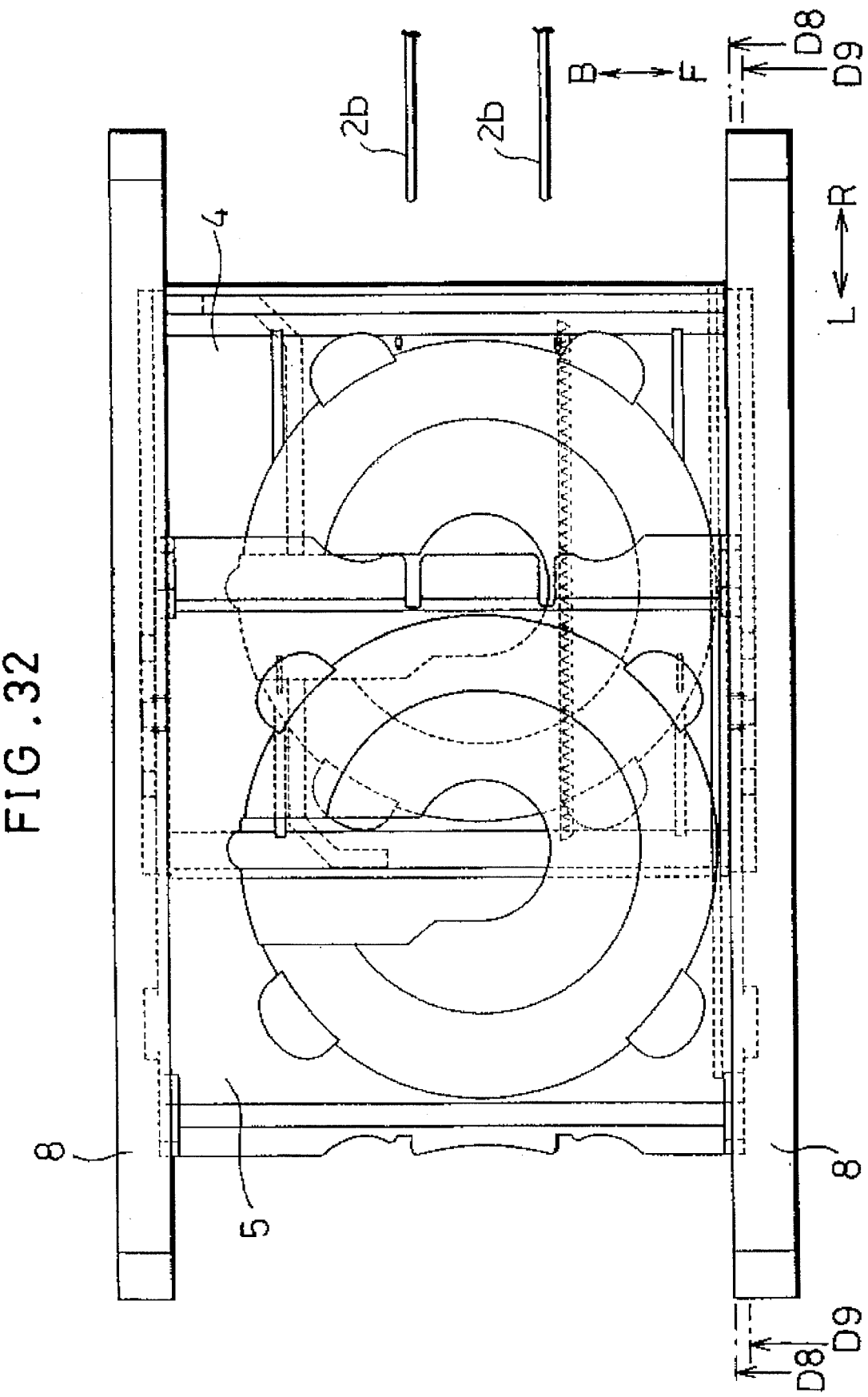
FIG. 32 is a plan view showing the state where the first tray has been moved to the left from the position shown in FIG. 30.
Figure 33A:
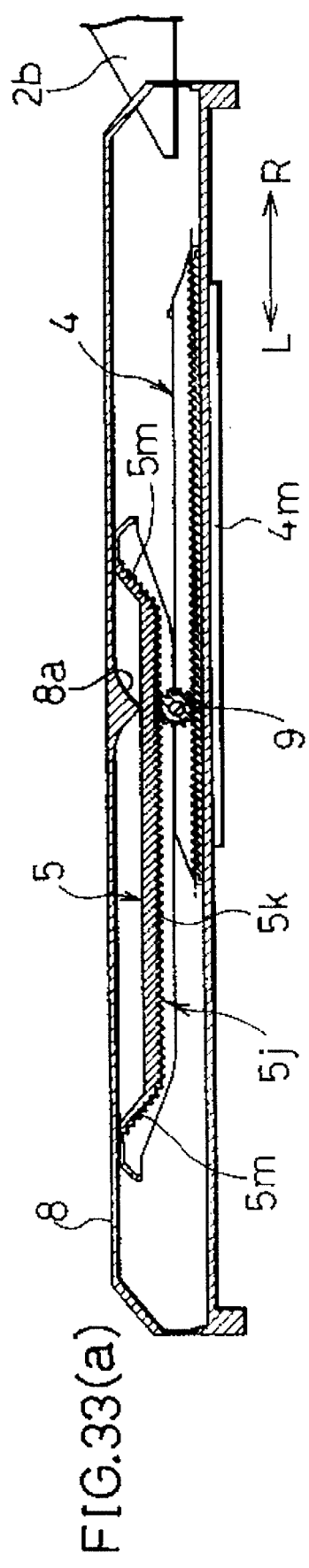
FIG. 33(a) is a cross-sectional view taken on line D8—D8 of FIG. 32.

FIG. 32 shows the first tray 4 which is further moved to the left from the described position. In this state, as shown in FIG. 33(a), the pinion 9 is in mesh with the horizontal rack 5k of the rack 5j of the second tray 5. In this state, the second tray 5 is raised to a position where the lower surface thereof is situated slightly above the upper surface of the first tray 4. Therefore, the trays 4 and 5 can be moved in opposite directions without being interrupted from one another.

Figure 33B:
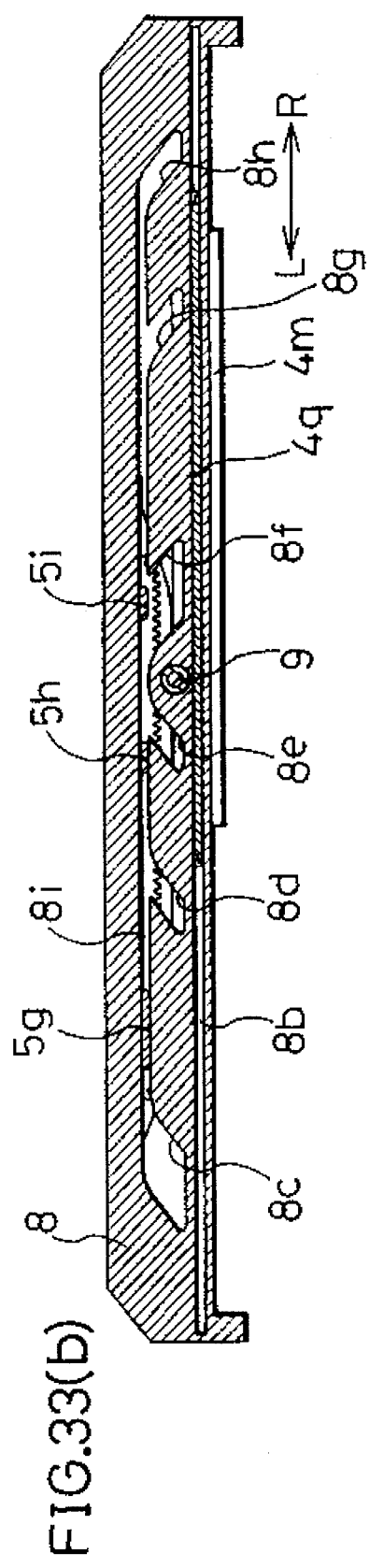
FIG. 33(b) is a cross-sectional view taken on line D9—D9 of FIG. 32.

The described horizontal movement of the second tray 5 is guided by the first through third guide projections 5g, 5h and 5i respectively in mesh with the second horizontal guide groove 8i as shown in FIG. 33(b). In the figure, the third guide projection 5i is situated above the oblique guide groove 8f, and is set in the intermediate position within the second horizontal guide groove 8i. However, since the second tray 5 is supported by the first and the second guide projections 5g and 5h in the second horizontal guide groove 8i, the second tray 5 can be moved horizontally without being tilted.

FIG. 34 shows the state where the first tray 4 is further moved to the left from the described position. In this position also, as shown in FIG. 35(a), the pinion 9 remains in mesh with the horizontal rack 5k of the second tray 5. As shown in FIG. 35(b), the second guide projection 5h is set in the intermediate position above the oblique guide groove 8e. However, since the third guide projection 5i is supported by making a mating with the second horizontal guide groove 8i when it comes to the position above the oblique guide groove 8f. In the same manner, the first through third projections 5g, 5h and 5i are all supported by at least two points, thereby maintaining the horizontality of the second tray 5.

Figure 37A:
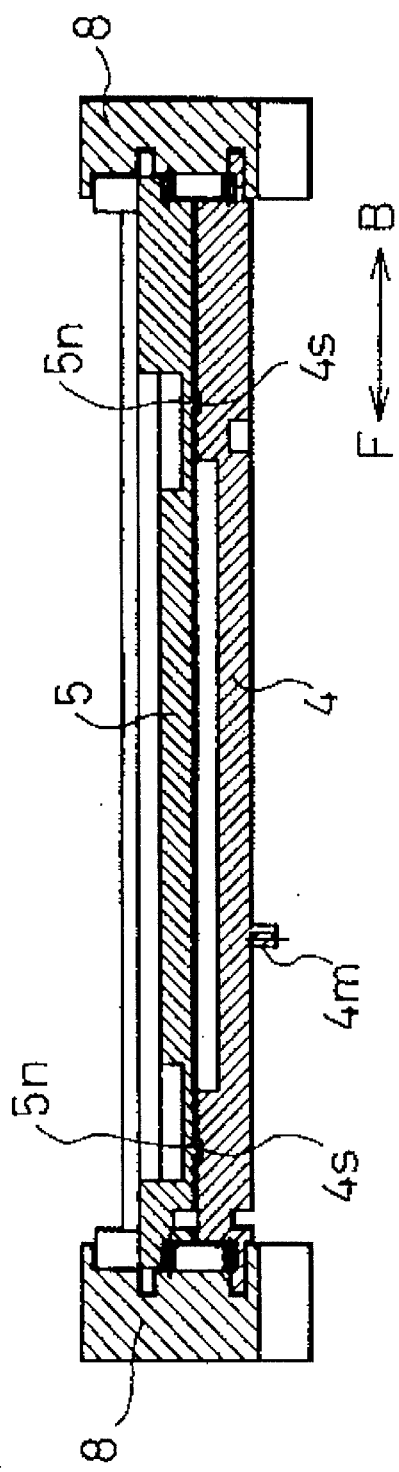
FIG. 37(a) is an enlarged perspective cross-sectional view taken on line D12—D12 of FIG. 36.

FIG. 36 shows the state where the first tray 4 is further moved to the left and the first and second trays 4 and 5 are one above the other with their centers vertically aligned. As shown in FIG. 36, the length of the second tray 5 in the side-to-side direction is set slightly longer than the first tray 4 for the reasons to be described later. When the second tray 5 and the first tray 4 are moved in mutually opposite directions by crossing over one another, as shown in FIG. 37(a), the disk pushing projection 5n formed on the bottom surface of the second tray 5 is moved by being inserted into the groove 4s formed on the upper surface of the first tray 4. Again, the function thereof will be described later.

Figure 37B:
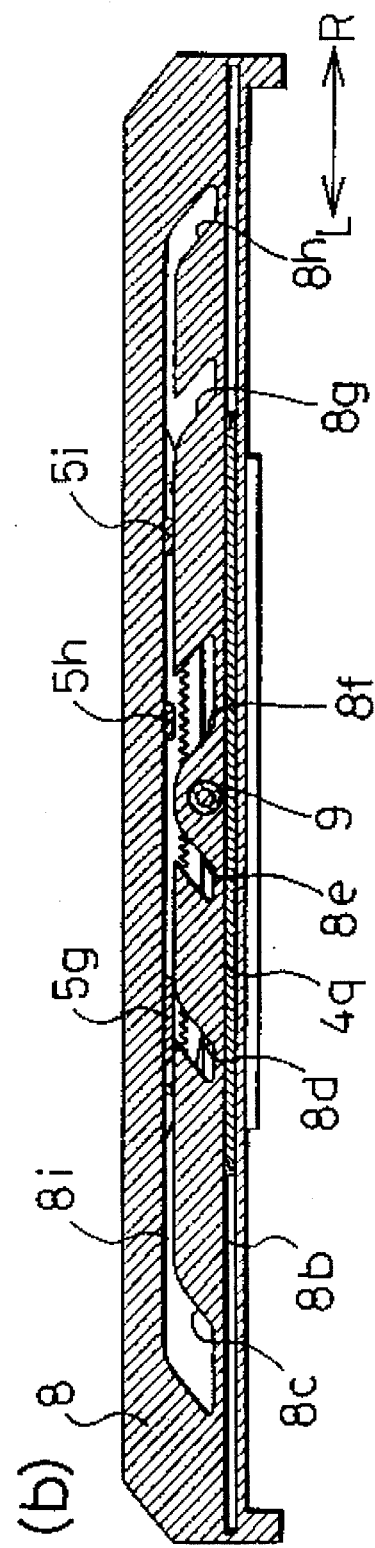
FIG. 37(b) is a cross-sectional view taken on line D13—D13 of FIG. 36.

As shown in FIG. 37(b), in the state where the trays 4 and 5 are vertically overlapped, the second guide projection 5h is situated above the oblique guide groove 8f and is set in the intermediate position. However, since the width of the first guide projection 5g is set wider than the oblique guide groove 8d, as in the described case, the second tray 5 is supported by at least two projections among the first through third projection 5g, 5h and 5i, thereby maintaining the horizontality of the second tray 5.

Figure 38:
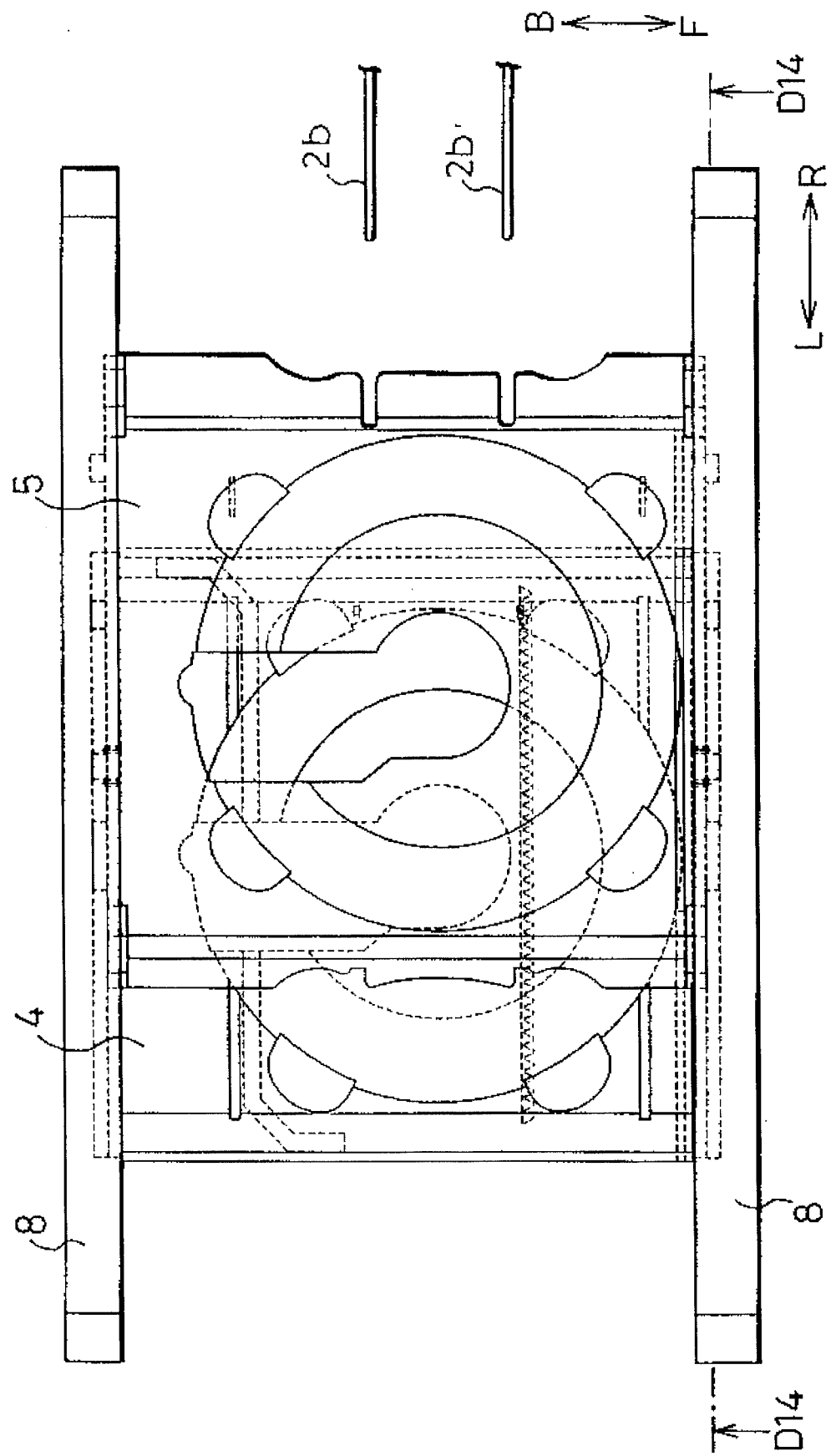
FIG. 38 is a plane view showing the state where the first tray has been further moved to the left from the state shown in FIG. 36.
Figure 39:
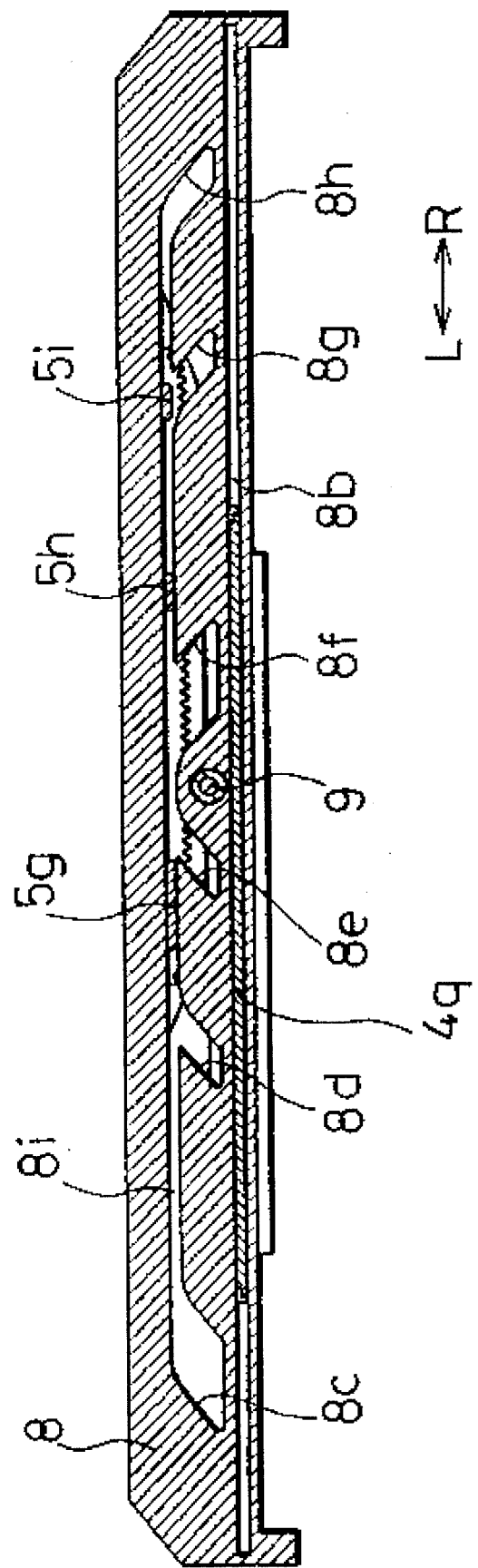
FIG. 39 is a cross-sectional view taken on line D14—D14 of FIG. 38.

FIG. 38 shows the state where the first tray 4 is further moved to the left. As shown in FIG. 39, the third guide projection 5i is situated above the oblique guide groove 8g and is not in contact therewith. However, the second guide projection 5h is inserted into the second horizontal guide groove 8i, and is situated to the right of the gravity center of the second tray 5. Therefore, the second tray 5 is supported by the second guide projection 5h and the first guide projection 5g situated to the left of the gravity center, thereby moving the second tray 5 horizontally to the right.

FIG. 40 shows the state where the first tray 4 is further moved to the left almost to the reproducing position. As shown in FIG. 41(a), the pinion 9 is moved from the horizontal rack 5k of the second tray 5 to be in mesh with the left sloping rack 5m. Therefore, the moving force is exerted from the pinion 9 to the second tray 5 in the right-downward direction.

As shown in FIG. 41(b), in the described state, the first through third guide projections 5g, 5h and 5i are respectively situated above the oblique guide grooves 8f, 8g and 8h which are formed in the direction of the moving force. Before reaching this position, the first guide projection 5g is horizontally moved on the oblique guide groove 8e situated to the left of the pinion 9. However, since the width of the oblique guide groove 8e is set smaller than the width of the first guide projection 5g, the support of the first guide projection 5g can be maintained and the first guide projection 5g can be moved horizontally to the position shown in FIG. 41(b).

Figure 42:
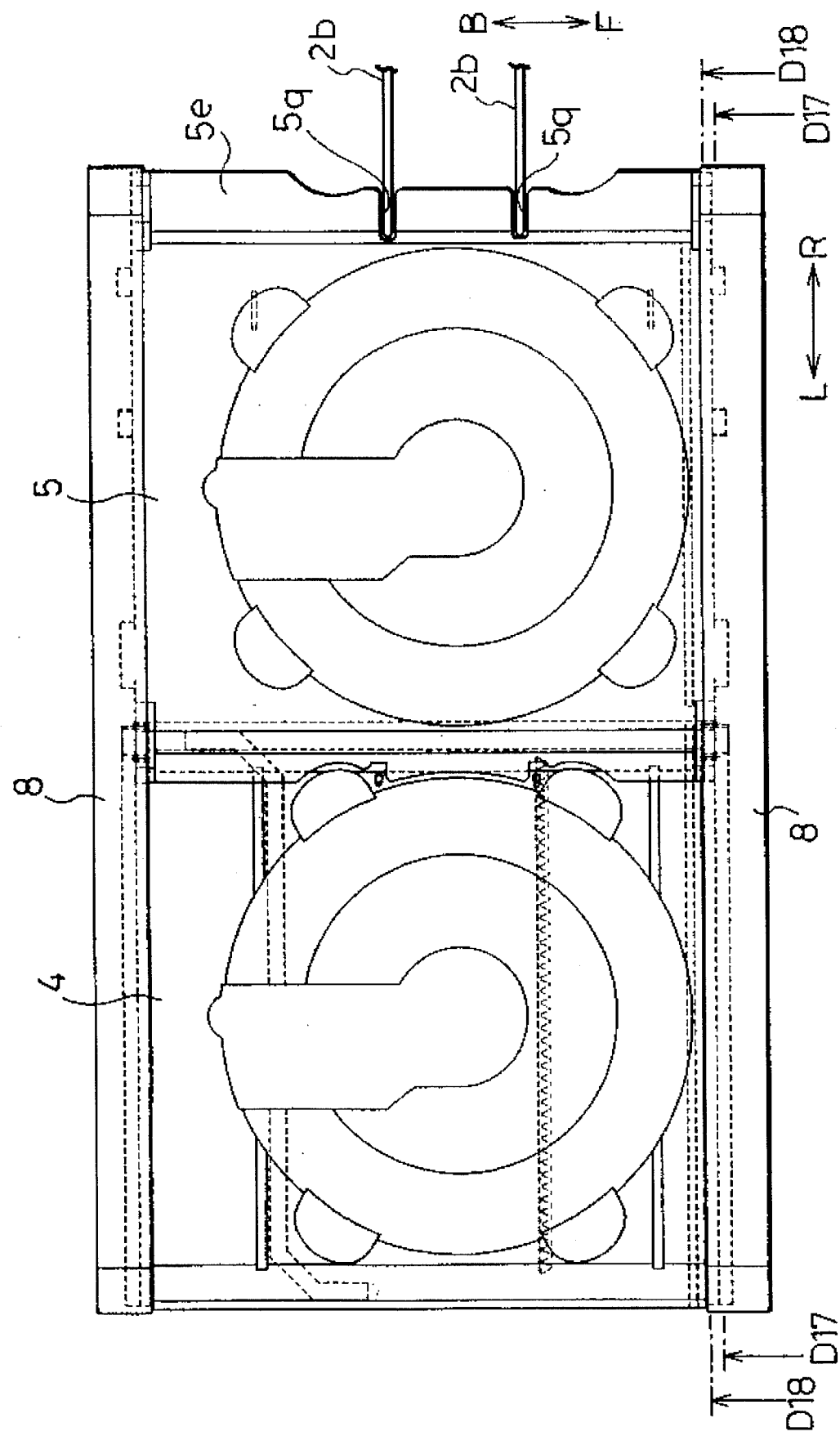
FIG. 42 is a plan view showing the state where the first tray has been further moved to the left from the state shown in FIG. 40.

With the further rotation of the pinion 9, the first through third guide projections 5g, 5h and 5i are moved from the position shown in the figure along the oblique guide grooves 8f, 8g and 8h in the right-downward direction. Then, as shown in FIG. 42, the first and second trays 4 and 5 are moved to the second fixed position where the first tray 4 is set in the reproducing position and the second tray 5 is set in the stand-by position, whereby the first and second trays 4 and 5 are stopped moving. In this state, the respective cabinet projections 2b are inserted into the releasing grooves 5q formed in the right flanking portion 5e of the second tray 5.

In this second fixed position, as shown in FIG. 43(a), the first through third guide projections 5g, 5h and 5i are lowered to the respective bottom portions of the oblique guide grooves 8f, 8g and 8h. As shown in FIG. 43(b), the pinion 9 is in the stoppage position at which it is in mesh with the top end of the left sloping rack 5m of the second tray 5. As shown in the figure, the first and second trays 4 and 5 are held in such a position that the respective upper surfaces thereof are situated at the same height position also in the second fixed position.

As described, the interlocking movement of the first and second trays 4 and 5 are generated via the pinion 9, and after the trays 4 and 5 have been interchanged, the locking movement is generated toward the first tray 4 by the tray lock lever 16. In the meantime, the reproducing unit 6 is raised to the reproducing position by the movement of the unit actuating lever 15, thereby completing the interchange of the trays 4 and 5.

Furthermore, it is arranged such that in the reproducing positions, the trays 4 and 5 have a common center respectively. In the interchanging operation of the trays 4 and 5, since the second tray 5 is moved in an oblique direction when the ends of the sloping racks 5m are in mesh with the pinion 9, the horizontal movement of the second tray 5 is shorter than the first tray 4, for example, by about 5.2 mm.

Therefore, in the fixed position of the second tray 5 in the stand-by area 3b, the center of the disk receiving face 5a is displaced from the center of the disk receiving face 4a of the first tray 4 secured in the area 3b by 5.2 mm. Therefore, in order to set the respective areas occupied by the trays 4 and 5 substantially equal in the stand-by area 3b, the length of the second tray 5 in the side-to-side direction is set longer than the first tray 4 so as to compensate the difference.

In the above view of the stand-by area 3b, when installing and removing the disk 11, since there is no significant difference in appearance between the tray 4 and the tray 5, the apparatus can be maintained in a presentable condition without a feeling of physical disorder. Furthermore, in the state where the second tray 5 is set in the stand-by area 3b, the problem that unwanted substances enter the space between the cabinet 2a on the right hand side can be prevented.

[3] Interchanging Mechanism of the Trays from the Second Fixed Position to the First Fixed Position Next, the interchanging mechanism of the trays from the second fixed position to the first fixed position will be explained below. As in the previous case, the explanation will be given by firstly explaining the movements of the reproducing unit 6 and the first tray 4 interlocked with the unit actuating lever 15 and the tray locking lever 16, and then explaining the interchanging mechanism between the first tray 4 and the second tray 5.

This interchanging movement can be achieved by carrying out the described movement from the first fixed position to the second fixed position in the reversed order. Namely, as shown in FIG. 42, in the second fixed position where the first tray 4 is set in the reproducing position, and the second tray 5 is set in the stand-by position, since the unit actuating lever 15 is set in the left limit position, the switch 10 shown in FIG. 29 outputs a signal indicative of the left limit position is outputted. In this case, the operation key for the disk interchange is operated by the user. As a result, when a signal indicative of the interchange of the trays is inputted into the control device, the conduction to the drive motor is started by the control device. As a result, the drive gear 13 is rotated in the clockwise direction in FIG. 29.

First, the rightward movement of the unit actuating lever 15 is started, and the unit actuating lever 15 is kept driven by the drive gear 13 until the right rack 15g of the unit actuating lever 15 disengages from the drive gear 13.

In the meantime, the reproducing unit 6 is moved to the retreated position as the unit joint pin 6h is guided from the right horizontal portion 15k to the horizontal holding portion 15m along the unit guiding slot 15i, thereby holding the reproducing unit 6 at that retreated position.

As shown in FIG. 24, directly before the unit actuating lever 15 disengages from the drive gear 13, the lever joint pin 16c is moved forward by being pushed along the right oblique 15w of the lever joint cut-out 15r. As a result, the front rack 16e of the tray lock lever 16 becomes in mesh with the drive gear 13, and the transmittance of the driving force from the drive gear 13 is switched from the unit actuating lever 15 to the tray lock lever 16. After the movement of the unit actuating lever 15 is stopped, the tray locking lever 16 is kept being moved forward until the front rack 16 disengages from the drive gear 13, and then stopped at that position.

As shown in FIG. 22, directly before the tray lock lever 16 is stopped, the tray joint pin 16i of the tray lock lever 16 pushes the first tray 4 rightward by moving along the right diagonal 4i of the tray joint groove 4f. Then, the movement of the first tray 4 is started, and the rack 4m becomes in mesh with the drive gear 13. As a result, the transmittance of the driving force from the drive gear 13 is switched from the tray lock lever 16 to the first tray 4. After the movement of the tray lock lever 16 is stopped at the position as shown in FIG. 20, the first tray 4 is kept moving to the right until the rack 4m disengages from the drive gear 13 as shown in FIG. 17.

Then, directly before the first tray 4 is stopped at its right limit position, i.e., the stand-by position, as shown in FIG. 16, the tray joint pin 16i is relatively moved along the left diagonal 4h of the first tray 4. As a result, the tray lock lever 16 is moved forward and the rear rack 16d becomes in mesh with the drive gear 13. As a result, the transmittance of the driving force of the drive gear 13 is switched from the first tray 4 to the tray lock lever 16.

Thereafter, as shown in FIG. 12, by inserting the tray joint pin 16i into the left stoppage portion 4j of the tray Joint groove 4f of the first tray 4, the first tray 4 is locked to the stand-by position shown in the figure.

On the other hand, directly before the rear rack 16d of the tray lock lever 16 disengages from the drive gear 13, the unit actuating lever 15 is moved to the right as the lever joint pin 16c is moved along the left diagonal 15v of the lever joint cut-out 15r. As a result, the left rack 15f of the unit actuating lever 15 becomes in mesh with the drive gear 13, and the transmittance of the driving force from the drive gear 13 is switched from the tray lock lever 16 to the unit actuating lever 15.

In synchronism with the subsequent rightward movement of the unit actuating lever 15, as shown in FIG. 3, the unit joint pin 6h is moved from the horizontal holding portion 15m to the left horizontal portion 15j via the left sloping portion 15n of the unit guide slot 15i. As a result, the reproducing unit 6 is raised back to the reproducing position where the members including the turn table 6, etc., are situated above the upper surface of the unit holder 6e through the releasing opening 5c of the second tray 5 set in the reproducing position as will be described later.

Directly after that, the switch 10 shown in FIG. 2 having being in the OFF state is closed by being in contact with the left end of the position detecting slot 15q of the unit actuating lever 15, thereby outputting a signal indicative of the right limit position. As a result, feeding to the drive motor (not shown) is stopped so as to stop the rotation of the drive gear 13, thereby completing the interchange of the trays 4 and 5 from the second fixed position to the first fixed position.

The movement of the first tray 4 from the reproducing position to the stand-by position is transmitted to the second tray 5 via the pinion 9. Therefore, the second tray 5 is moved from the stand-by position to the reproducing position in synchronism with the movement of the first tray 4.

More specifically, when the first tray 4 starts moving rightward from the second fixed position shown in FIG. 43(a) and FIG. 43(b), the second tray 5 starts moving to the left via the pinion 9. As shown in FIG. 41(b), this movement can be achieved in the following manner. As the first through third guide projections 5g, 5h and 5i are guided along the oblique guide grooves 8f, 8g and 8h in the left-upward direction, the second tray 5 is also moved in the left-upward direction above said first tray while maintaining the horizontality of the surface thereof as shown in FIG. 41(a).

Then, the second tray is moved over the first tray 4 from the stand-by area 3b to the reproducing area 3a along the second horizontal guide groove 8i of the tray guide 8 as the oblique guide grooves 8f, 8g and 8h move in order shown in FIG. 39, FIG. 37(b), FIGS. 35(a) and (b) and FIGS. 33(a) and (b).

When the first through third guide projections 5g, 5h and 5i are respectively positioned above the oblique guide groove 8c, 8d and 8e on the left hand side of the tray guide 8 as shown in FIG. 31(b), the pinion 9 is relatively moved to the right sloping rack 5m from the horizontal rack 5k of the second tray 5. As a result, the moving force is exerted from the pinion 9 to the second tray 5 in the left-downward direction.

Figure 10A:
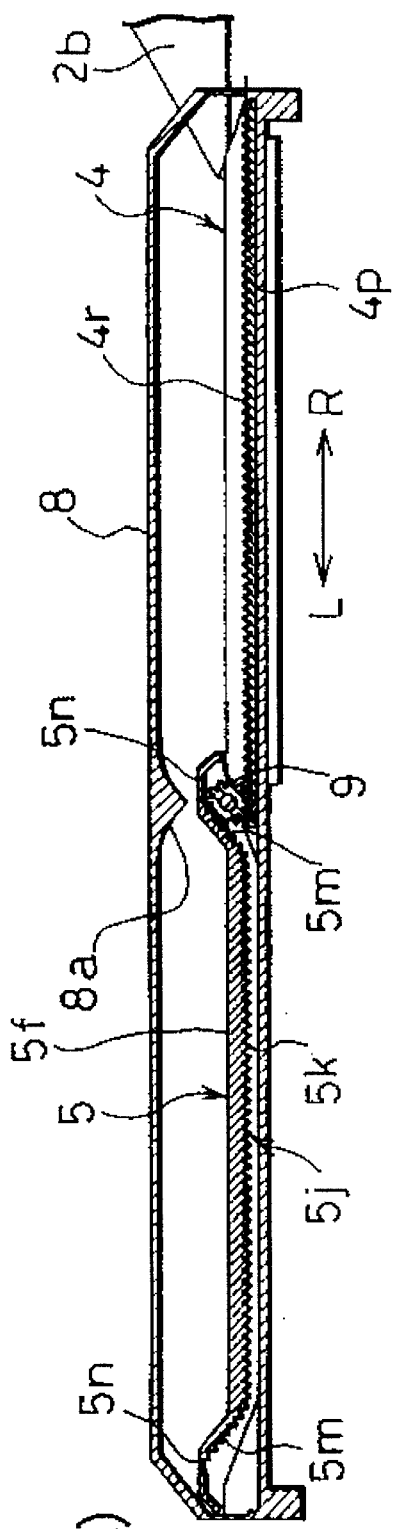
FIG. 10(a) is a cross-sectional view taken on line D4—D4 of FIG. 9.
Figure 10B:
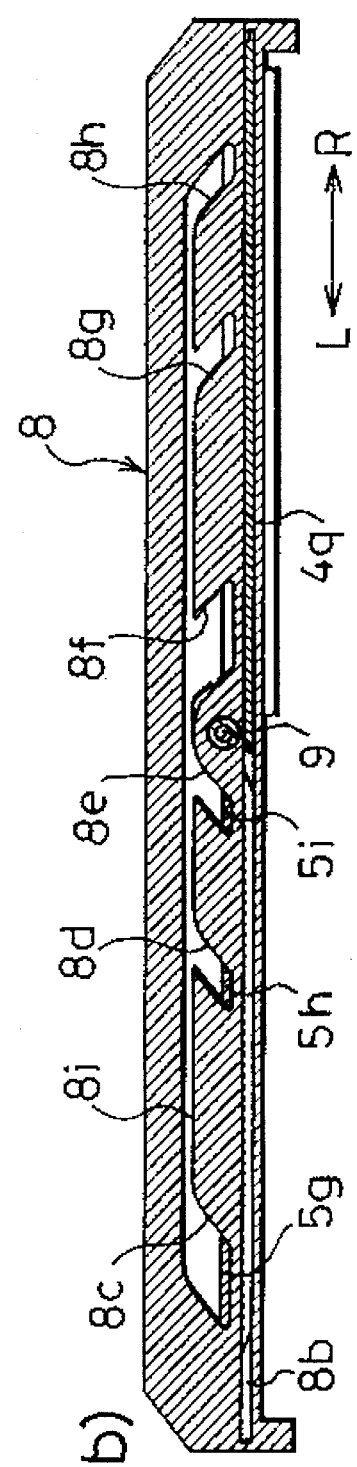
FIG. 10(b) is a cross-sectional view taken on line D5—D5 of FIG. 9.

In synchronism with the subsequent rotating movement of the pinion 9, the second tray 5 is guided along the oblique guide groove 8c, 8d and 8e and is moved in the left-downward direction while maintaining the horizontality of the surface thereof by the moving force exerted from the pinion 9 and its dead weight. Then, as shown in FIG. 10(b), the first through third guide projections 5g, 5h and 5i are further moved to the position at which the respective first through third guide projections 5g, 5h and 5i reach the respective bottom portions of the oblique guide grooves 8c, 8d and 8e. In this state, as shown in FIG. 10(a), the second tray 5 is lowered to the position where the upper surface thereof and the disk receiving face 5a are situated at the same height position of the first tray 4 set in this area.

As described, after the position of the second tray 5 has been changed in synchronism with the first tray 4, the first tray 4 is locked by the movement the tray lock lever 16, and in the meantime, the reproducing unit 6 is raised back to the reproducing position by the movement of the unit actuating lever 15, thereby completing the interchanging movement of trays from the second fixed position to the first fixed position.

[4] Correction of Displaced Disk to be Centered on the First Tray 4

Next, the disk displacement correcting operation which is to be carried out for correcting the displacement of the disk 11 on the first tray 4 set in the stand-by area 3b in the first fixed position will be described.

As an example of the disk displacement error on the first tray 4, FIG. 9 shows the disks 11 respectively placed in such a position that the edge portion thereof is in contact with the tray guide 8 on the rear side and the tray guide 8 on the front side as respectively shown by the alternate long and short dash lines.

If the disk 11 is displaced on the disk receiving face 4a to the right, the disk 11 slides along the upper sloping portions of the cabinet projection 2b onto the first tray 4. Here, the leading end of each cabinet projection 2b is placed to the left of the disk stoppage projections 4t of the first tray 4 in the stand-by position. Therefore, the disks 11 will not be placed over the disk stoppage projections 4t but are placed to the left of the disk stoppage projections 4t as shown in the figure.

First, the case where the disk 11 is displaced toward the rear tray guide 8 will be explained in reference to FIG. 9.

Figures 44A, 44B:
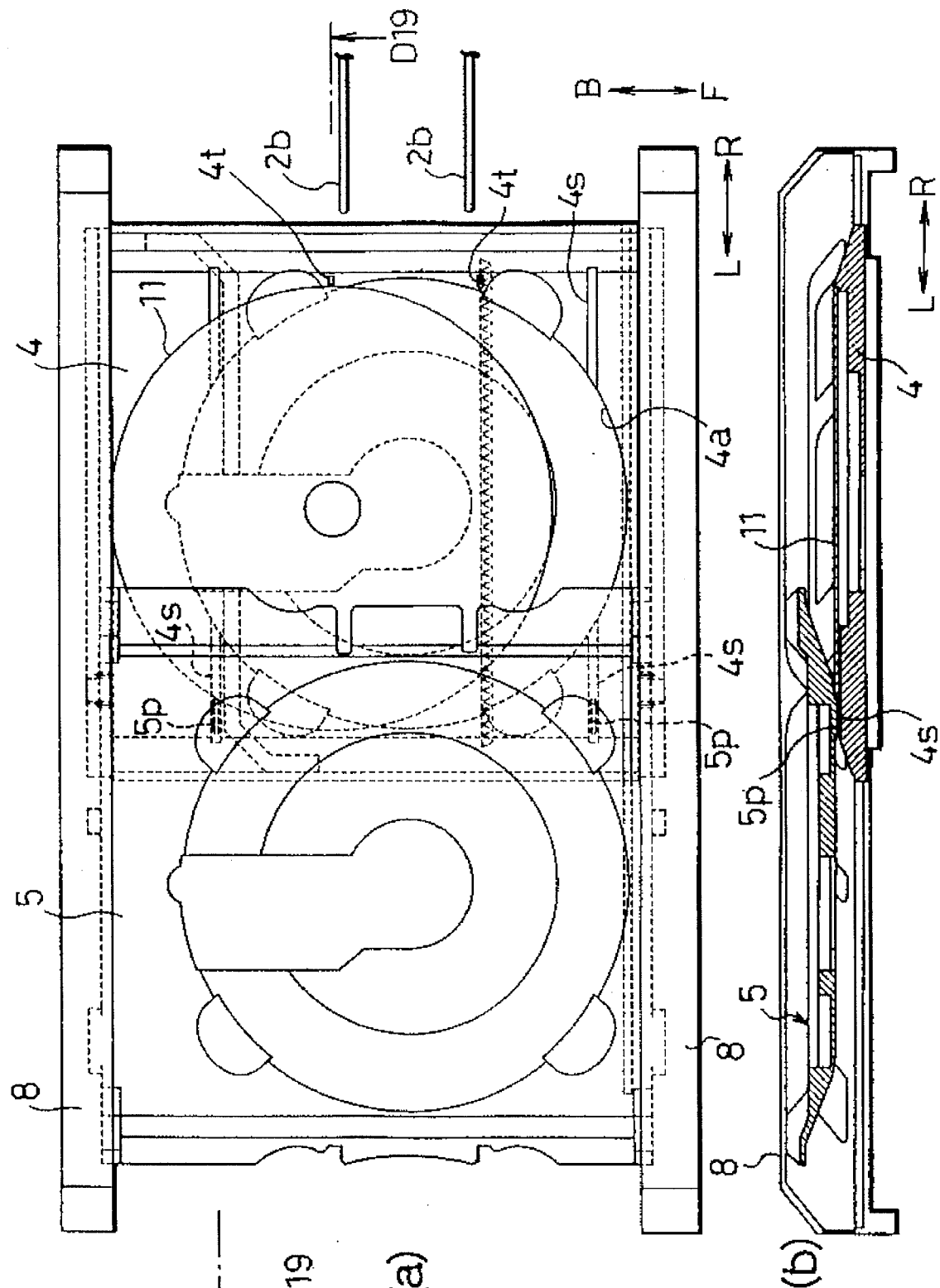
FIG. 44(a) is a plan view showing an adjustment of the first and second trays when a disk on the first tray is displaced backward.
FIG. 44(b) is a cross-sectional view taken on line D19—D19 of FIG. 44(a).

FIG. 44(a) shows the state where the interchanging operation of the trays 4 and 5 is started, i.e., when a transition occurs in the movements of the second tray 5 from the upward movement in an oblique direction to the horizontal movement as more clearly shown in FIG. 44(b). In this state, the disk pushing projection 5p mounted on the bottom surface of the second tray 5 is moved to the right while the bottom portion thereof mates with the groove 4s formed on the upper surface of the first tray 4. In this state, a space between the upper surface of the first tray 4 and the lower surface of the second tray 5 is set slightly larger than the thickness of the disk 11 so that the disk 11 on the upper surface of the first tray 4 can be inserted therein.

Therefore, as the disks 4 and 5 are moved, as shown in FIG. 44(a), the disk pushing projection 5p on the back portion (the end in the direction of B) becomes in contact with the left-back portion of the peripheral portion of the disk 11. In the meantime, the disk stoppage projection 4t on the rear end comes in contact with the right end of the peripheral portion of the disk 11. Therefore, as the disks 4 and 5 are further moved from the position shown in FIG. 44(a), the disk 11 is pushed forward (in the direction of F), and is stored on the disk receiving face 4a.

In the state where the disk 11 is stored in the recessed portion on the disk receiving face 4a, since the surface of the disk 11 is situated at the lower position of the above-mentioned position, the disk pushing projection 5p is moved over the upper surface of the disk 11 with a predetermined distance between them, and the subsequent interchanging operation of the disks 4 and 5 is carried out.

Figures 45A, 45B:
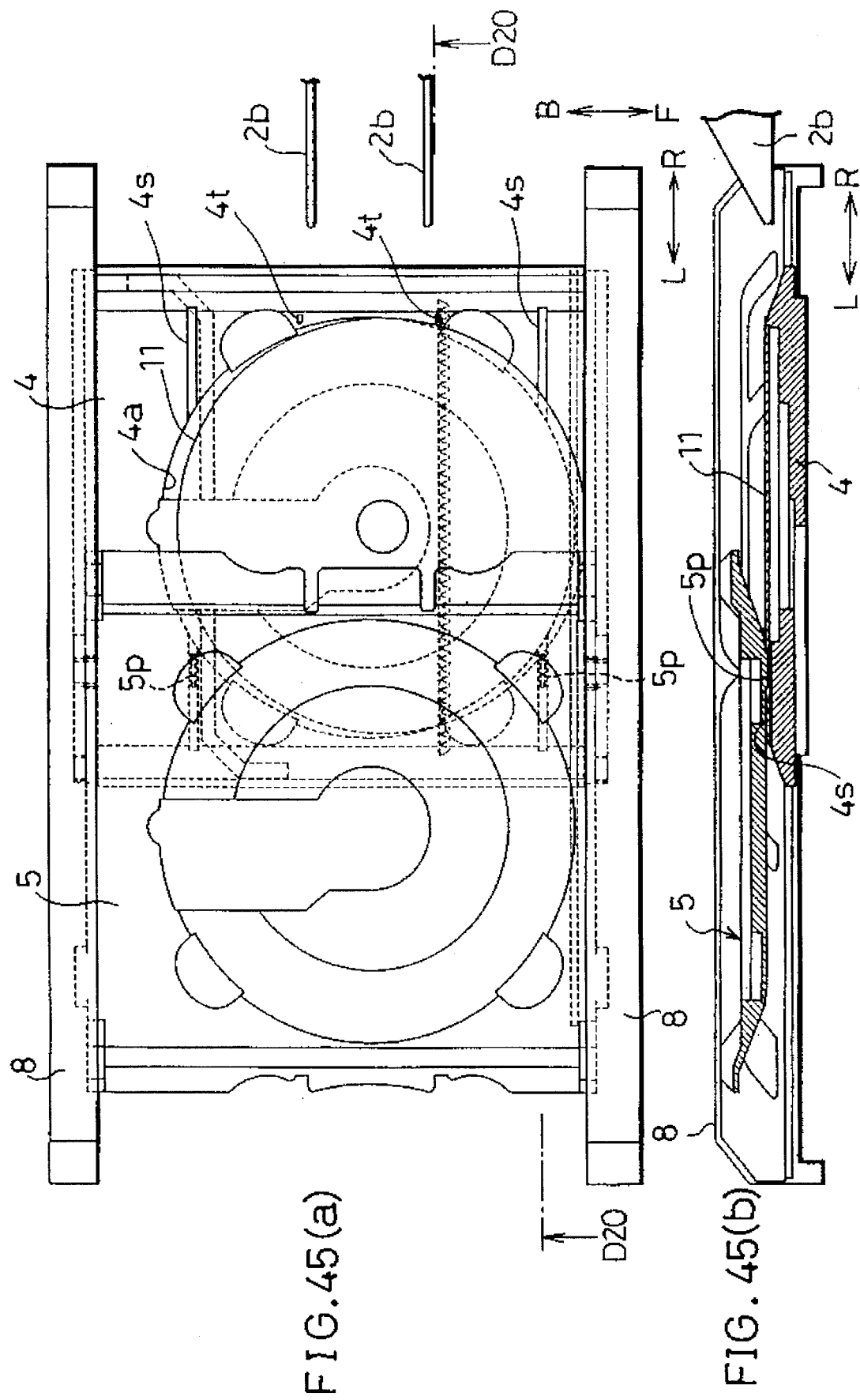
FIG. 45(a) is a plan view showing an adjustment of the first and second trays when a disk placed on the first tray is displaced to the front.
FIG. 45(b) is a cross sectional view taken on line D20—D20 of FIG. 45(a).

As shown in FIG. 45(a), in the case where the interchanging operation of disk trays 4 and 5 whereon the disks 11 are displaced onto the front side (in the direction of F) is started, the displacements of the disks 11 are rectified automatically in the manner described above. Namely, as shown in FIG. 45(b), while the disks are being moved with the disk pushing projection 5p formed on the bottom surface of the second tray 5 mating with the groove 4s formed on the upper surface of the first tray 4, as shown in FIG. 45(a), the disk pushing projection 5p on the front side comes in contact with the left-front portion of the peripheral portion of the disk 11, while the disk stoppage projection 4t on the front side comes in contact with the right end of the disk 11. In this way, the disk 11 is being pushed backward to be stored on the disk receiving face 4a.

As described, in the case where the disk 11 is displaced from the first tray 4 which is to be moved under the second tray 5, by pushing the disk 11 onto the disk receiving face 4a, the displacement can be automatically corrected.

For the second tray 5 which is to be moved above the first tray 4, the problem of being scarred would not occur even if the disk 11 is displaced. As to the first tray 4, however, if the disk interchange is carried out without rectifying the displacement of the disk 11, the surface of the disk 11 may be scarred when being interchanged with the second tray 5. Therefore, since the arrangement of the present invention enables the rectification of the displacement of the disk 11, the disk 11 can be prevented from being scarred. Moreover, the space between the trays 4 and 5 when being interchanged can be made significantly smaller, thereby achieving the reduced size of the entire apparatus.

When loading the disk 11 in the reproducing area 3a, the disk 11 is placed on the turn table 6a projected above through the releasing opening 4c or 5c of the tray 4 or 5. When the disk interchanging operation is to be carried out, the disk 11 having being placed on the turn table 6a is automatically placed on the disk receiving face 4a or 5a of the tray 4 or 5 as the reproducing unit 6 is lowered to the retreated position so as to allow the tray 4 or 5 to be moved to the retreated position.

As explained, when the user selects to carry out the reproducing operation from the disk 11 placed on the tray 4 or 5 in the stand-by position 3a, the tray exchanging operation is carried out.

In the case of interchanging the trays 4 and 5 by crossing each other, when the second tray 5 having being moved over the first tray 4 comes to the boundary the stand-by area 3b and the reproducing area 3a, the second tray 5 is lowered from the overlapping area to be set in the reproducing position. Since the described arrangement offers a smaller height difference between the height position of the first tray 4 in the reproducing position 3a and the height position of the second tray 5 in the reproducing position 3a, the up-and-down movement of the reproducing unit 6 can be made smaller. Since the above arrangement makes the apparatus thinner, the reduced size of the entire apparatus can be achieved.

According to the disk reproducing apparatus of the present embodiment, in order to set the disk receiving faces 4a and 5a of the trays 4 and 5 at the same height position in the reproducing area 3a, from the up-and-down movement of the reproducing unit 6 between the reproducing position and the retreated position, the up-and-down movement for compensating the height difference between the trays 4 and 5 can be eliminated, thereby achieving a still thinner disk reproducing apparatus.

On the other hand, in the aforementioned conventional disk reproducing apparatus, when the second tray 53 is set in the stand-by area, since a space is formed below the second tray 53 after the first tray 52 is being moved to the reproducing area, the problem is presented in that unwanted substances are likely to enter. In order to counteract this, the disk reproducing apparatus of the present embodiment is arranged such that when the second tray 5 is moved from the reproducing area 3a to the stand-by area 3b, the second tray 5 is also lowered to the same height position of the first tray 4. According to the above arrangement, since a space is not formed under the second tray 5 after the first tray 4 has being moved, unwanted substances are not likely to enter under the second tray 5.

The disk reproducing apparatus in accordance with the present embodiment is further arranged such that in the state where the trays 4 and 5 are respectively set in the reproducing area 3a and the stand-by area 3b, the flanking portions 4e and 5e of the trays 4 and 5 which are adjacent to one another are vertically overlapped. As a result, since the area occupied by the edge portions of the disk receiving faces 4a and 5a are smaller than the case where the flanking portions are aligned side to side, the length of the apparatus in the side-to-side direction can be made smaller, thereby achieving the reduced size of the entire apparatus.

Especially, the flanking portions 4e and 5e which are vertically overlapped are formed to be sloped, and when interchanging trays, the second tray 5 is raised by being guided in an oblique direction along the oblique guide groove 8c, 8d and 8e of the tray guide 8. In this case, since a switching mechanism for switching the movements between two directions, i.e., between the upward movement and the subsequent horizontal movement, is not required, the simplified structure of the apparatus can be achieved. Moreover, since the respective amounts of movements of the trays 4 and 5 can be made smaller by the overlapping portion, the length of the apparatus in the side-to-side direction can be made still smaller, thereby achieving the reduction in the size of the apparatus.

On the other hand, the aforementioned conventional apparatus is arranged such that the sliding plate 56 and the actuating plate 60 are moved by the cam grooves 57a and 57b formed on the cam disk 57. Therefore, in order to ensure the required stroke of the movement of the sliding plate 56 and the actuating plate 60, rotation driving members including the cam disk 57 and the large pinion 58b having a still larger diameter are required. In this case, since a large rotation torque or moment is exerted on the shaft, a still stronger rotation supporting mechanism is required. Therefore, not only the rotation drive members themselves but also the rotation support sections are required to be made larger, thereby presenting the problem that a significant reduction in the size of the apparatus cannot be achieved.

In order to counteract the above problem, since the disk reproducing apparatus of the present invention is arranged such that the moving force is transmitted to the first tray 4 by the drive gear 13 and that the second tray 5 is interlocked with the first tray 4 by the pinion 9 provided between the first tray 4 and the second tray 5. In this case, since the moving resistance occurs only from the second tray 5 which is to be driven by the pinion 9, the support mechanism of a simplified structure can be adopted for the pinion 9 without requiring the strong support mechanism. This feature also contribute to reduce the size of the entire apparatus.

Furthermore, in the present embodiment, since the pinion 9 is formed in the vertically overlapped area between the reproducing area 3a and the stand-by area 3b of the trays 4 and 5 respectively set in the reproducing area 3a and the stand-by area 3b. Therefore, without providing additional members for ensuring the engagement with the pinion 9, such as extended pieces, etc., on the trays 4 and 5, the engagement between the pinion 9 and the trays 4 and 5 can be ensured throughout the movement of the trays 4 and 5, thereby achieving a still reduced size of the entire apparatus.

Especially, since it is arranged such that the relative movement between the trays 4 and 5 is generated by the engagement between the pinion 9 and the racks 4r and 5j formed on the trays 4 and 5, the displacement of trays 4 and 5 due to a slipping generated between them can be prevented. In the above arrangement, since the tray interchanging operation can be surely carried out, an improved reliability can be achieved.

Since the sliding racks 5m are formed on both ends of the rack 5j provided on the bottom surface of the second tray 5, even when the second tray 5 is set in the reproducing position or in the stand-by position, the pinion 9 can be kept in mesh with the sliding rack 5m. Therefore, when the movement of the first tray 4 is started, the movement of the second tray 5 is started simultaneously.

Moreover, by rotating the pinion 9 while being in mesh with the sliding rack 5m, at the initial and final stage of the tray interchanging operation, the moving force is exerted from the pinion 9 along the moving path in an oblique upward direction or in an oblique downward direction of the second tray 5. Additionally, on the tray guide 8, oblique guide grooves 8c through 8h are formed in parallel to the direction of the pushing force. Therefore, the smooth movement along the slope of the second tray 5 before and after the horizontal movement can be achieved without difficulties.

In order to support and guide the second tray 5 with the tray guide 8, a plurality of guide projections 5g, 5h and 5j are formed along the flanking portion of the second tray 5. The first guide projection 5g is formed to be longer than other guide projections 5h and 5j in the side-to-side direction. Therefore, the downward movement of the second tray 5 from the second horizontal guide groove 8i to the oblique guide grooves 8c through 8h is generated in order at the position where the respective length of the guide projections 5g, 5h and 5j coincide with the oblique guide grooves 8c through 8h, namely, only in the reproducing area and the stand-by area. Therefore, even with the arrangement that the respective upper ends of the oblique guide grooves 8c through 8h are connected to the second horizontal guide groove 8i, the downward movement of the second tray 5 in the middle of movement can be prevented, thereby ensuring a stable movement of the second tray 5 with a simple structure.

In the present embodiment, on both sides of the upper surface of the area forming each sliding rack 5m of the second tray 5, position controlling portions 5n is formed in a substantial inverted U-shape. On the other hand, a downward projection 8a in a substantial V-shape is formed at the substantial center of the upper surface of the tray guide 8. Therefore, when an oblique sliding movement occurs of the second tray 5, since the position controlling portion 5n slides along the sloping face of the downward projection 8a, the position controlling section 5n is prevented from floating upward. As a result, the pinion 9 is prevented from disengaging from the sliding rack 5m, and the smoother movement of the second tray 5 can be ensured.

In the above arrangement, the amount of movement of the second tray 5 is smaller than the first tray 4 for the tilt angle of the sliding rack 5m, however, the length of the second tray 5 in the side-to-side direction is set longer than the first tray 4. Therefore, the area covered by the second tray 5 set in the stand-by area 3b coincides with that of the first tray 4 set in the stand-by area 3b, thereby preventing the problem that unwanted substances enter the space under the tray 5 from above while maintaining the apparatus in the presentable condition.

In the conventional apparatus, the cam disk 57 for receiving a driving force from the drive source, the slide plate 56 by the cam disk 57, a small pinion 58a and a large pinion 58b for moving the trays 52 and 53 by being driven by the sliding plate 56 are all provided between the drive source and trays 52 and 53. On the other hand, in the present embodiment the driving force from the drive source is transmitted by the single drive gear 13 and the first tray is driven directly by the drive gear 13, and further the second tray 5 is driven via the pinion 9. Therefore, the arrangement of the present embodiment has an advantage by reducing the number of components for moving the trays 4 and 5, thereby enabling a low cost of the apparatus.

In the conventional apparatus, in order to ensure the amount of movement of the trays 52 and 53 within one rotation of the cam disk 57, the large pinion 58b and the small pinion 58a are provided, and the difference in deceleration between them is set large. Moreover, in order to set the amount of movement of the sliding plate 56 larger, a larger cam disk 57 is required, thereby presenting the problem that the entire apparatus becomes larger in size. On the other hand, the apparatus of the present embodiment is arranged such that the driving force is transmitted through the rack 4m of the first tray 4 by the drive gear 13 directly. According to the above arrangement, by increasing the number of rotations of the drive gear 13, the moving amount of the first tray 4 can be ensured. Thus, the drive gear 13 is not needed to be made larger. Moreover, since the pinion 9 is provided only for transmitting the driving force of the first tray 4 to the second tray 5, it is not required to be made larger. Since this enables the above components to be made smaller, the size of the entire apparatus can be reduced.

On the other hand, in the present embodiment, the disk pushing projection 5p is formed on the bottom surface of the second tray 5 so as to be projected downward. Therefore, if the disk 11 is displaced from the disk receiving face 4a of the first tray 4 at the stand-by position, the disk pushing projection 5p is made in contact with the peripheral portion of the disk 11 while being interchanged, thereby being pushed onto the disk receiving face 4a of the first tray 4.

As a result, the disk 11 placed on the first tray 4 is prevented from being scarred. In the conventional apparatus, in order to prevent the disk 11 from being scarred when placing the disk on the tray 52, a larger space is required between the upper tray 53 and the lower tray 52. However, in the present embodiment, since the displacement of the disk 11 can be automatically corrected, the space in the overlapping area between the upper surface of the first tray 4 and the lower surface of the second tray 5 can be made smaller, thereby achieving the reduced size of the entire apparatus.

Furthermore, on the upper surface of the first tray 4, a disk control projection 4t is also formed to the right of the disk receiving face 4a, and the disk 11 to be pushed to the right by the disk pushing projection 5p is prevented from moving to the right by the disk stoppage projection 4t. As a result, the disk 11 is pushed toward the center of the first tray 4, i.e., towards the disk receiving face 4a. Therefore, displacement of the disk 11 can be surely corrected. In this state, since the cabinet projection 2b is formed so as to be projected from the cabinet 2a, the displaced disk 11 can be prevented from moving over the disk stoppage projection 4t, and is placed to the left of the projection 4t. Thus, the displacement of the disk can be surely corrected.

In the present embodiment, by one direction movement of the unit actuating lever 15, the reproducing unit 6 is lowered from the reproducing position and is held at the retreated position. Then, the reproducing unit 6 having been held at the retreated position is raised again to the reproducing position. The described movement of the reproducing unit 6 is achieved by the unit guiding slot 15i of a substantial V-shape formed on the unit guide piece 15b of the unit actuating lever 15. On the other hand, in the conventional apparatus, the up-and-down movement of the reproducing unit is achieved by the unit guide groove sloping in one direction. In this conventional arrangement, switching means is required for switching the rotation direction of the drive gear in response to the moving direction (upward or downward) of the reproducing unit 6. In the present embodiment, since the upward movement subsequent to the downward movement of the reproducing unit 6 can be generated while maintaining the rotation direction of the drive gear 13 in one direction, the structure of the entire apparatus can be simplified.

Moreover, in the unit actuating lever 15 for generating the up-and-down movement of the reproducing unit 6 by one direction movement, an untoothed portion 15h is formed between the left rack 15f and the right rack 15g. Therefore, while holding the reproducing unit 6 at the retreated position, the unit actuating lever 15 can be automatically held at the stoppage position. This enables the reproducing unit 6 to be lowered and raised before and after the tray interchanging operation by moving the unit actuating lever 15 in one direction. Moreover, the stroke of the movement of the unit actuating lever 15 required for the up-and-down movement of the reproducing unit 6 can be made significantly smaller. Therefore, the simplified structure and the reduced size of the entire apparatus can be achieved.

In the conventional apparatus, also for the purpose of ensuring the amount of movement of the actuating plate 60 for raising and lowering the reproducing unit 61, a larger cam disk 57 is required. Moreover, since the actuating plates 60 are respectively positioned on the front and rear sides of the trays 52 and 53, thereby presenting the problem that the apparatus cannot be made significantly smaller. In order to counteract the above problem, the apparatus of the present embodiment is arranged such that the unit actuating lever 15 is directly moved by the drive gear 13. According to the above arrangement, even when the drive gear 13 of a smaller diameter is used, a required amount of movement of the unit actuating lever 15 can be ensured by increasing the number of rotations of the drive gear 13. Moreover, the unit actuating lever 15 may be placed so as to be moved along the base plate 7 below the trays 4 and 5. Therefore, the width of the apparatus in the front-and-back direction will not be made larger by the unit actuating lever 15. In this regard also, the size of the entire apparatus can be reduced.

In the present embodiment, the tray lock lever 16 is provided under the first tray 4 so as to be movable in the front-and-back direction, and the first tray 4 at the first or second fixed position is locked by the tray lock lever 16. Moreover, when the trays are being interchanged, by the engagement between the tray lock lever 16 and the unit actuating lever 15, the tray lock lever 16 is moved in the direction where the first tray 4 is unlocked at an appropriate timing in accordance with the up-and-down movement of the reproducing unit 6. As a result, the fixed position of the trays 4 and 5 can be ensured against the vibrations, etc. In the meantime, a complicated interlocking mechanism is not needed, thereby simplifying the structure of the entire apparatus.

On the tray lock lever 16, front and rear racks 16e and 16d are formed so as to be in mesh with the drive gear 13, and only by rotating the drive motor in the direction set based on the detected position by the switch 10, the sequential operation of lowering the reproducing unit 6, interchanging the trays 4 and 5 and raising the reproducing unit 6, can be achieved. Namely, the member to be mate with the drive gear 13 is changed from the first tray, the unit actuating lever 15 and to the tray lock lever 16 at a predetermined timing in order by the mutual relationship among the first tray 4, the unit actuating lever 15 and the tray lock lever 16. According to the above arrangement, a switching mechanism is not required separately, or the rotation direction of the drive gear 13 is not needed to be switched, nor needed to be stopped. Moreover, a plurality of driving sources are not required, thereby simplifying the structure of the entire apparatus.

In the present embodiment, on the lower surface of the first tray 4, tray joint groove 4f is formed. The tray joint groove 4f is provided with the left and right sliding portions 4h and 4i which form an angle of 45° with respect to the moving direction of the tray 4 in the side-to-side direction. Similarly, on the unit actuating lever 15 which moves in the side-to-side direction, the lever joint cut-out 15r is formed. The lever joint cut-out 15r includes the left and right diagonals 15v and 15w which respectively form an angle of 45° to the moving direction. In the described arrangement, using the push-out force exerted when the tray joint pin 16i and the lever joint pin 16c are moved along the diagonals, the engagement of the drive gear 13 is switched to each rack. Therefore, in the arrangement where the drive gear 13 is used as the single drive source, the complicated interlocking mechanism with the described switching mechanism is not required. Since this enables the reduced number of components, the lower cost and the reduced size of the apparatus can be achieved.

In the present embodiment, the switch 10 having two contacts per circuit is employed for detecting the position of the unit actuating lever 15. As a result, whether the apparatus is set in the first fixed position or the second fixed position can be detected. Then, based on the result of detection, the rotation direction of the drive gear 13 is determined. Furthermore, upon completing the interchange operation of the trays, the rotation of the drive gear 13 is stopped by the output from the switch 10. Therefore, the switching of the tray interchanging direction and the stoppage of the driving of the drive gear 13 can be easily controlled. Therefore, the tray interchanging operation can be surely performed with few errors. Moreover, since the number of components can be reduced, the manufacturing cost can be reduced.

The apparatus of the present embodiment is further arranged such that the joint projection 16g is formed on the tray lock lever 16 for holding the first tray 4 at the intermediate position where the first tray 4 is unlocked from the tray lock lever 16. Therefore, the respective movements of the trays 4 and 5 can be prevented from being disturbed by the tray lock lever 16. Moreover, after the trays 4 and 5 have been interchanged, they can be surely locked again. This enables a smoother interchanging operation of the trays 4 and 5, thereby reducing the number of operation error.

The invention being thus described, it will be obvious that the same way be varied in many ways. Such variations are not to be regarded as a departure from the spirit and scope of the invention, and all such modifications as would be obvious to one skilled in the art are intended to be included within the scope of the following claims.

What is claimed is:

1. A disk reproducing apparatus comprising:

a reproducing unit for reading recorded information from a disk;

a cabinet including a reproducing area in which a reproducing position for reading recorded information from the disk by said reproducing unit is set substantially constant relative to the cabinet and a stand-by area in which a stand-by position for exchanging a disk is set substantially constant relative to the cabinet, said reproducing area and said stand-by area being horizontally aligned in the same plane in said cabinet;

a first tray including a disk receiving face for placing thereon a disk, the disk receiving face being formed parallel to the horizontal direction, said first tray being capable of reciprocating between the reproducing position and the stand-by position;

a second tray including a disk receiving face for placing thereon a disk, the disk receiving face being formed parallel to the horizontal direction, said second tray being arranged such that when said first tray is selectively positioned at either one of the reproducing position and the stand-by position, said second tray is positioned at the other position, said second tray moving above said first tray, said first tray and said second tray moving simultaneously parallel to one another in mutually opposite horizontal directions when the trays are interchanged upon changing positions, said second tray overlapping said first tray at a predetermined height position with respect to the reproducing position;

reproducing position guide means for guiding a downward movement of said second tray from the predetermined height position to the reproducing position when said second tray is being moved from the stand-by position to the reproducing position.

2. The disk reproducing apparatus as set forth in claim 1, wherein said reproducing position and said stand-by position are formed substantially on the same plane parallel to the horizontal direction.

3. The disk reproducing apparatus as set forth in claim 2, wherein:

each disk receiving face is substantially circular in shape and is formed on a respective central portion on an upper surface of said first or second tray so as to be recessed, and when one of said first and second trays is set in said reproducing position, and the other of said first and second trays is set in said stand-by position, respective adjoining flanking portions of said first and second trays are placed one above the other outside each disk receiving face.

4. The disk reproducing apparatus as set forth in claim 3, wherein when said first tray is set in said stand-by position, and said second tray is set in said reproducing position, said respective adjoining flanking portions which are placed one above the other are sloped with respect to the horizontal direction so as to allow an oblique movement with respect to the horizontal direction of said second tray, and said disk reproducing apparatus further comprising:

an oblique movement guide means for guiding said second tray along a sloping face of a flanking portion to the position at which said first and second trays are vertically aligned when said second tray is pushed and moved from said reproducing position to said stand-by position.

5. The disk reproducing apparatus as set forth in claim 4, wherein:

a plurality of guide projections are formed on both sides of the second tray in a direction orthogonal to the reciprocating direction of said second tray, tray guides, having formed thereon guide grooves into which said guide projections are to be respectively inserted, are formed on both sides of said first and second trays, said guide grooves are formed substantially horizontal corresponding to a position where said first and second trays are vertically aligned, while from both ends of horizontal portions of the guide grooves, oblique portions are formed for enabling a downward movement of said second tray to be set in said reproducing area or said stand-by area, and said tray guides constitute said reproducing position guide means, said stand-by position guide means and said oblique movement guide means.

6. The disk reproducing apparatus as set forth in claim 5, wherein:

at least one of said plurality of guide projections is longer than other guide projections with regard to the reciprocating direction, and respective width of the guide grooves formed on said tray guides, that extend in an oblique downward direction, are set according to respective length of said guide projections.

7. A disk reproducing apparatus comprising:

a reproducing unit for reading recorded information from a disk;

a cabinet in which a reproducing position for reading recorded information from a disk by said reproducing unit and a stand-by position for exchanging a disk are horizontally aligned parallel to one another;

a first tray including a disk receiving face formed parallel to the horizontal direction, said first tray being capable of reciprocating between the reproducing position and the stand-by position;

a second tray including a disk receiving face for placing thereon a disk formed parallel to the horizontal direction, said second tray being arranged such that when said first tray is selectively positioned at either one of the reproducing position and the stand-by position, said second tray is positioned at the other position, said second tray moving above said first tray, said first tray and said second tray moving simultaneously parallel to one another in mutually opposite directions when the trays change position, said second tray overlapping said first tray at a predetermined height position with respect to the reproducing position;

a drive source for generating a driving force;

a driving member for transmitting the driving force to said first tray;

an intermediate transmitting member being located between said first tray and said second tray so as to be engaged therewith, so that when one of said trays is moved the other tray will be driven directly by the transmitting member;

wherein when said first tray is positioned at the reproducing position and said second tray is positioned at the stand-by position, a first overlapping portion which partially overlaps said first tray is formed at an end portion on a first tray side of said second tray, and when said first tray is positioned at the stand-by position and the second tray is positioned at the reproducing position, a second overlapping portion which partially overlaps said first tray is formed at an end portion on a first tray side on said second tray; and said intermediate transmitting member is supported between bottom faces of said second tray and said first tray, said bottom faces of said second tray including a bottom of said first overlapping portion, a bottom face formed between said first overlapping portion and said second overlapping portion, and a bottom face of said second overlapping portion.

8. The disk reproducing apparatus as set forth in claim 7, wherein:

said intermediate transmitting member is composed of pinions, and a rack formed on each of an upper surface of said first tray and on a lower surface of said second tray, the lower surface of the second tray extending from the first overlapping portion to the second overlapping area and the rack on the lower surface of the second tray extending from said first overlapping portion to said second overlapping area, so that engagement with said pinions are formed at positions corresponding to a reciprocating range of said first and second trays.

9. The disk reproducing apparatus as set forth in claim 8, wherein:

said first and second overlapping portions are upwardly sloped with respect to the horizontal direction so as to allow respective bottom faces to form oblique rack portions.

10. The disk reproducing apparatus as set forth in claim 9, wherein:

when initiating or completing a tray interchanging operation, said second tray is pushed and moved in an oblique upward or downward direction relative to the horizontal direction, by rotating said pinion while being in mesh with said sloping rack portion.

11. The disk reproducing apparatus as set forth in claim 10, wherein:

a length of said second tray with regard to the reciprocating direction is set longer than a length of said first tray in accordance with a difference in an amount of horizontal movement of said first tray and said second tray, that corresponds to an angle of said oblique rack portions.

12. The disk reproducing apparatus as set forth in claim 10, wherein:

the upper surface of each sloping rack portion of said second tray is formed as a position controlling section in substantially inverted U-shape, a tray guide having an upper surface with a central portion including, a downward projecting portion formed in V-shape, and an oblique movement of said second tray is guided such that said position controlling section is moved along a sloping face of said downward projecting portion.

13. The disk reproducing apparatus as set forth in claim 7, further comprising:

a unit actuating member capable of moving in reciprocating directions of said first and second trays, for raising and lowering said reproducing unit between a reproducing position from a disk on a tray and a retreated position at which said first and second trays are allowed to be moved, wherein said unit actuating member includes:

a linear member which receives a driving force from said driving member by being in contact with said driving member composed of a rotating member, and a recessed intermediate support section for holding said unit actuating member at a stoppage position apart from said driving member while exchanging a tray after said reproducing unit is moved to the stand-by position, said linear member is formed along a reciprocating direction of said first tray, and said intermediate support member is formed on said linear member at an intermediate position in the reciprocating direction.

14. The disk reproducing apparatus as set forth in claim 13, wherein:

said linear member is a rack in mesh with said driving gear which constitutes said driving member, and said intermediate support section is an untoothed portion formed at a central portion of said rack.

15. The disk reproducing apparatus as set forth in claim 13, wherein:

said unit actuating member is provided so as to be moved on a base plate under said first and second trays, and a unit guide section is formed on the unit actuating member for moving said reproducing unit up and down.

16. The disk reproducing apparatus as set forth in claim 15, wherein:

a joint pin is formed on one end of said reproducing unit that is supported by said base plate so as to freely pivot about the other end, a unit guiding slot is formed in substantially V-shape, so as to be in mesh with said joint pin, and said reproducing unit freely pivot and is moved up and down between a reproducing position and a retreated position by moving said joint pin up and down along said unit guiding slot.

17. The disk reproducing apparatus as set forth in claim 13, further comprising:

a tray lock member capable of moving in a direction orthogonal to the reciprocating directions under said first tray, wherein said tray lock member is in mesh with said first tray set in said reproducing area or said stand-by area at respective limit positions of said tray lock member so as to prevent a movement of said first tray, wherein said tray lock member mates with said unit actuating member so that said tray lock member moves to a stoppage cancelling position with regard to said first tray when said reproducing unit is lowered by moving said unit actuating member.

18. The disk reproducing apparatus as set forth in claim 17, wherein:

a joint projecting portion composed of an elastic member is formed on said tray lock member, for holding said tray lock member at a joint cancelling position with regard to said first tray, and an intermediate position holding-use projection is formed on said base plate for holding said tray lock member at an intermediate position so as to be in mesh with said joint projecting portion.

19. The disk reproducing apparatus as set forth in claim 17, wherein:

said tray lock member is provided with a lock member joint section which contacts said driving member when said tray lock member is in the stoppage cancelling position, and receives a driving force from said driving member, and said tray lock member, the dominant tray and the unit actuating member are mutually interlocking so that a movement of the dominant tray from a position at which said unit actuating member becomes separated from the driving member and a movement of said unit actuating member until it is connected to the driving member after a tray interchanging operation is completed sequentially occur.

20. The disk reproducing apparatus as set forth in claim 19, wherein:

a tray joint cut-out including left and right oblique portions that form a 45 degree angle with respect to the reciprocation direction is formed on the back surface of said first tray, and a tray joint pin is inserted into said tray joint cut-out formed on said tray lock member.

21. The disk reproducing apparatus as set forth in claim 20, wherein:

a lever joint cut-out including left and right oblique portions that form a 45 degree angle with respect to the reciprocating direction is formed on said unit actuating member, and a lever joint pin that is to be inserted into said lever joint cut-out is formed on said tray lock member.

22. The disk reproducing apparatus as set forth in claim 19, wherein:

a switch composed of one circuit with two contacts is formed on said base plate for detecting respective limit positions of said unit actuating member, and a set tray interchanging direction and a completion of a tray interchanging operation are detected based on an output from said switch.

23. A disk reproducing apparatus, comprising:

a cabinet including a reproducing area and a stand-by area which are horizontally alined, a reproducing unit for reading recorded information from a disk being stored in said reproducing area; and first and second trays for placing thereon disks respectively, said first and second trays being interchangeable through reciprocation between said reproducing area and said stand-by area by moving said second tray above said first tray in mutually opposite directions, wherein disk pushing projections are formed on a lower surface of said second tray for correcting a displacement of a disk by centering the disk to be exactly on a disk receiving face of said first tray set said stand-by area by making in contact with a peripheral portion of the disk.

24. The disk reproducing apparatus as set forth in claim 23, wherein:

disk stoppage projections are further formed on the upper surface of said first tray for preventing a disk being pushed by disk pushing projections from moving outside the disk receiving face.

25. The disk reproducing apparatus as set forth in claim 24, wherein:

cabinet projections are formed on an inner surface of said cabinet, for guiding a disk, that is to be placed on said first tray in said stand-by area, onto said disk receiving face by said disk stoppage projection, said cabinet projections having an upper end face that slopes downward from the inner surface of said cabinet to said disk receiving face.

26. A disk reproducing apparatus comprising:

a reproducing unit for reading recorded information from a disk;

a cabinet including a reproducing area in which a reproducing position for reading recorded information from the disk by said reproducing unit is set substantially constant relative to the cabinet and a stand-by area in which a stand-by position for exchanging a disk is set substantially constant relative to the cabinet, said reproducing area and said stand-by area being horizontally aligned in said cabinet;

a first tray including a disk receiving face for placing thereon a disk, the disk receiving face being formed parallel to the horizontal direction, said first tray being capable of reciprocating between the reproducing position and the stand-by position;

a second tray including a disk receiving face for placing thereon a disk, the disk receiving face being formed parallel to the horizontal direction, said second tray being arranged such that when said first tray is selectively positioned at either one of the reproducing position and the stand-by position, said second tray is positioned at the other position, said second tray moving above said first tray, said first tray and said second tray moving simultaneously parallel to one another in mutually opposite horizontal directions when the trays are interchanged upon changing positions, said second tray overlapping said first tray at a predetermined height position with respect to the reproducing position; and reproducing position guide means for guiding a downward movement of said second tray from the predetermined height position to the reproducing position when said second tray is being moved from the stand-by position to the reproducing position;

wherein a height position of the disk receiving face of said first tray is substantially equal to a height position of the disk receiving face of said second tray when one of said first and second trays is set in said reproducing area and the other of said first and second trays is set in said stand-by area.

* * * * *